(12) United States Patent  
Dinan

(10) Patent No.: US 12,101,828 B2  
(45) Date of Patent: *Sep. 24, 2024

(54) MULTICARRIER SIGNAL TRANSMISSION IN WIRELESS COMMUNICATIONS

(71) Applicant: Comcast Cable Communications, LLC, Philadelphia, PA (US)

(72) Inventor: Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,384

(22) Filed: Aug. 23, 2023

(65) Prior Publication Data

US 2024/0049306 A1 Feb. 8, 2024

Related U.S. Application Data

(63) Continuation of application No. 16/105,171, filed on Aug. 20, 2018, now Pat. No. 11,800,570, which is a
(Continued)

(51) Int. Cl.
*H04W 74/0833* (2024.01)
*H04L 5/00* (2006.01)
(Continued)

(52) U.S. Cl.
CPC ......... *H04W 74/085* (2013.01); *H04L 5/0048* (2013.01); *H04W 52/04* (2013.01);
(Continued)

(58) Field of Classification Search
CPC . H04W 74/085; H04W 52/04; H04W 52/281; H04W 52/325; H04W 52/346;
(Continued)

(56) References Cited

U.S. PATENT DOCUMENTS 4,954,892 A 9/1990 Asai et al.
5,740,167 A 4/1998 Taketsugu et al.
(Continued)

FOREIGN PATENT DOCUMENTS

EP 2378820 A2 10/2011
EP 2640138 A1 9/2013
(Continued)

OTHER PUBLICATIONS

U.S. Appl. No. 16/746,568.
(Continued)

*Primary Examiner* — Kibrom T Hailu
(74) *Attorney, Agent, or Firm* — Banner & Witcoff, Ltd.

(57) ABSTRACT

Methods, systems, and apparatuses are described for wireless communications. Cells may be grouped into a plurality of cell groups. If a first signal is configured for transmission via a first cell of a first cell group in parallel with a transmission of a second signal via a second cell of a second cell group, a wireless device may drop, or adjust transmission power of, at least one of the first signal or the second signal.

52 Claims, 14 Drawing Sheets

Related U.S. Application Data continuation of application No. 15/682,025, filed on Aug. 21, 2017, now Pat. No. 10,085,288, which is a continuation of application No. 14/929,410, filed on Nov. 1, 2015, now Pat. No. 9,743,431, which is a continuation of application No. 14/552,005, filed on Nov. 24, 2014, now Pat. No. 9,179,454, which is a continuation of application No. 13/750,954, filed on Jan. 25, 2013, now Pat. No. 8,897,248.

(60) Provisional application No. 61/625,078, filed on Apr. 16, 2012, provisional application No. 61/618,830, filed on Apr. 1, 2012, provisional application No. 61/590,366, filed on Jan. 25, 2012.

(51) Int. Cl.
*H04W 52/04* (2009.01)
*H04W 52/28* (2009.01)
*H04W 52/32* (2009.01)
*H04W 52/34* (2009.01)
*H04W 52/50* (2009.01)
*H04W 56/00* (2009.01)
*H04W 72/0446* (2023.01)
*H04W 72/21* (2023.01)
*H04W 72/27* (2023.01)
*H04W 74/00* (2009.01)

(52) U.S. Cl.
CPC ....... *H04W 52/281* (2013.01); *H04W 52/325* (2013.01); *H04W 52/346* (2013.01); *H04W 52/50* (2013.01); *H04W 56/0005* (2013.01); *H04W 56/0045* (2013.01); *H04W 72/0446* (2013.01); *H04W 72/21* (2023.01); *H04W 72/27* (2023.01); *H04W 74/004* (2013.01); *H04W 74/006* (2013.01); *H04W 74/0833* (2013.01); *H04L 5/001* (2013.01)

(58) Field of Classification Search
CPC ............. H04W 52/50; H04W 56/0005; H04W 56/0045; H04W 72/0446; H04W 72/21; H04W 72/27; H04W 74/004; H04W 74/006; H04W 74/0833; H04L 5/0048; H04L 5/001
See application file for complete search history.

(56) References Cited

U.S. PATENT DOCUMENTS

| | | |
|---|---|---|
| 6,201,803 B1 | 3/2001 | Munday et al. |
| 6,714,784 B1 | 3/2004 | Forssell et al. |
| 6,804,212 B1 | 10/2004 | Vallstrom et al. |
| 7,352,714 B2 | 4/2008 | Balachandran et al. |
| 7,881,236 B2 | 2/2011 | Park et al. |
| 7,912,485 B2 | 3/2011 | Sinnarajah et al. |
| 8,031,662 B2 | 10/2011 | Lee et al. |
| 8,077,670 B2 | 12/2011 | Fan et al. |
| 8,131,295 B2 | 3/2012 | Wang et al. |
| 8,270,424 B2 | 9/2012 | Rao |
| 8,280,391 B2 | 10/2012 | Kim et al. |
| 8,289,922 B2 | 10/2012 | Ewe et al. |
| 8,315,641 B2 | 11/2012 | Chun et al. |
| 8,341,485 B2 | 12/2012 | Riess et al. |
| 8,391,129 B2 | 3/2013 | Dinan |
| 8,395,985 B2 | 3/2013 | Dinan |
| 8,396,475 B1 | 3/2013 | Bonner |
| 8,422,410 B2 | 4/2013 | Park et al. |
| 8,432,811 B2 | 4/2013 | Park et al. |
| 8,462,610 B1 | 6/2013 | Dinan |
| 8,462,688 B1 | 6/2013 | Dinan |
| 8,472,471 B2 | 6/2013 | Yang et al. |
| 8,493,917 B2 | 7/2013 | Meyer et al. |
| 8,503,322 B2 | 8/2013 | Krishnamurthy et al. |
| 8,520,497 B1 | 8/2013 | Dinan |
| 8,526,310 B2 | 9/2013 | Dinan |
| 8,526,389 B2 | 9/2013 | Dinan |
| 8,531,966 B1 | 9/2013 | Dinan |
| 8,537,739 B1 | 9/2013 | Dinan |
| 8,542,654 B2 | 9/2013 | Dinan |
| 8,547,929 B1 | 10/2013 | Dinan |
| 8,553,558 B1 | 10/2013 | Dinan |
| 8,553,574 B2 | 10/2013 | Hsu |
| 8,553,655 B1 | 10/2013 | Dinan |
| 8,553,671 B2 | 10/2013 | Kim et al. |
| 8,559,405 B2 | 10/2013 | Dinan |
| 8,565,142 B1 | 10/2013 | Dinan |
| 8,571,467 B2 | 10/2013 | Uusitalo et al. |
| 8,576,780 B2 | 11/2013 | Vujcic |
| 8,588,169 B2 | 11/2013 | Dinan |
| 8,599,785 B1 | 12/2013 | Dinan |
| 8,619,727 B1 | 12/2013 | Dinan |
| 8,625,404 B2 | 1/2014 | Dinan |
| 8,625,405 B2 | 1/2014 | Dinan |
| 8,625,524 B2 | 1/2014 | Dinan |
| 8,644,129 B2 | 2/2014 | Dinan |
| 8,687,541 B2 | 4/2014 | Lohr et al. |
| 8,699,317 B2 | 4/2014 | Dinan |
| 8,717,866 B2 | 5/2014 | Dinan |
| 8,761,047 B2 | 6/2014 | Kim et al. |
| 8,767,585 B2 | 7/2014 | Pelletier et al. |
| 8,774,819 B2 | 7/2014 | Zhang et al. |
| 8,780,784 B2 | 7/2014 | Chung et al. |
| 8,804,630 B2 | 8/2014 | Ito et al. |
| 8,804,668 B2 | 8/2014 | Dinan |
| 8,811,433 B2 | 8/2014 | Zhao et al. |
| 8,824,968 B2 | 9/2014 | Kim et al. |
| 8,831,615 B2 | 9/2014 | Wei |
| 8,837,304 B2 | 9/2014 | Yamada |
| 8,867,666 B2 | 10/2014 | Kim et al. |
| 8,873,443 B2 | 10/2014 | Haim et al. |
| 8,885,589 B2 | 11/2014 | Kim et al. |
| 8,897,248 B2 | 11/2014 | Dinan |
| 8,917,593 B2 | 12/2014 | Damnjanovic et al. |
| 8,917,605 B2 | 12/2014 | Pelletier et al. |
| 8,934,438 B2 | 1/2015 | Dinan |
| 8,934,459 B2 | 1/2015 | Marinier et al. |
| 8,958,342 B2 | 2/2015 | Dinan |
| 8,964,590 B2 | 2/2015 | Dinan |
| 8,964,593 B2 | 2/2015 | Dinan |
| 8,964,659 B2 | 2/2015 | Vujcic |
| 8,964,683 B2 | 2/2015 | Dinan |
| 8,964,780 B2 | 2/2015 | Dinan |
| 8,964,793 B2 | 2/2015 | Jang et al. |
| 8,971,280 B2 | 3/2015 | Dinan |
| 8,971,298 B2 | 3/2015 | Dinan |
| 8,976,765 B2 | 3/2015 | Dinan |
| 8,982,852 B2 | 3/2015 | Dinan |
| 8,989,128 B2 | 3/2015 | Dinan |
| 8,995,372 B2 | 3/2015 | Kwon et al. |
| 8,995,381 B2 | 3/2015 | Dinan |
| 8,995,405 B2 | 3/2015 | Dinan |
| 8,995,462 B2 | 3/2015 | Kim et al. |
| 9,001,780 B2 | 4/2015 | Chen et al. |
| 9,008,050 B2 | 4/2015 | Feuersanger et al. |
| 9,042,925 B2 | 5/2015 | Seo et al. |
| 9,054,835 B2 | 6/2015 | Kwon et al. |
| 9,054,841 B2 | 6/2015 | Ouchi et al. |
| 9,084,228 B2 | 7/2015 | Dinan |
| 9,084,270 B2 | 7/2015 | Dinan |
| 9,107,206 B2 | 8/2015 | Dinan |
| 9,113,387 B2 | 8/2015 | Dinan |
| 9,118,452 B2 | 8/2015 | Park et al. |
| 9,137,762 B2 | 9/2015 | Ahn et al. |
| 9,143,297 B2 | 9/2015 | Liang et al. |
| 9,154,215 B2 | 10/2015 | Noh et al. |
| 9,155,092 B2 | 10/2015 | Park et al. |
| 9,161,322 B2 | 10/2015 | Dinan |
| 9,161,323 B2 | 10/2015 | Dinan |
| 9,179,420 B2 | 11/2015 | Dinan |
| 9,179,425 B2 | 11/2015 | Dinan |
| 9,179,454 B2 | 11/2015 | Dinan |

(56) References Cited

U.S. PATENT DOCUMENTS

| | | |
|---|---|---|
| 9,179,457 B2 | 11/2015 | Dinan |
| 9,185,611 B2 | 11/2015 | Zeng et al. |
| 9,185,700 B2 | 11/2015 | Seo et al. |
| 9,204,406 B2 | 12/2015 | Dinan |
| 9,204,407 B2 | 12/2015 | Dinan |
| 9,210,619 B2 | 12/2015 | Dinan |
| 9,210,664 B2 | 12/2015 | Dinan |
| 9,210,665 B2 | 12/2015 | Dinan |
| 9,210,667 B2 | 12/2015 | Dinan |
| 9,210,675 B2 | 12/2015 | Dinan |
| 9,210,676 B2 | 12/2015 | Dinan |
| 9,215,051 B2 | 12/2015 | Dinan |
| 9,215,678 B2 | 12/2015 | Dinan |
| 9,220,116 B2 | 12/2015 | Dinan |
| 9,237,537 B2 | 1/2016 | Dinan |
| 9,241,326 B2 | 1/2016 | Dinan |
| 9,247,503 B2 | 1/2016 | Ahn et al. |
| 9,247,506 B2 | 1/2016 | Krishnamurthy et al. |
| 9,282,521 B2 | 3/2016 | Lim et al. |
| 9,307,539 B2 | 4/2016 | Krishnamurthy et al. |
| 9,319,194 B2 | 4/2016 | Dinan |
| 9,319,909 B2 | 4/2016 | Yamada |
| 9,326,314 B2 | 4/2016 | Kim et al. |
| 9,337,980 B2 | 5/2016 | Ahn et al. |
| 9,344,242 B2 | 5/2016 | Ahn et al. |
| 9,344,985 B2 | 5/2016 | Loehr et al. |
| 9,363,832 B2 | 6/2016 | Dinan |
| 9,374,211 B2 | 6/2016 | Kim et al. |
| 9,386,490 B2 | 7/2016 | Dinan |
| 9,386,604 B2 | 7/2016 | Dinan |
| 9,391,824 B2 | 7/2016 | Dinan |
| 9,392,623 B2 | 7/2016 | Dinan |
| 9,397,875 B2 | 7/2016 | Dinan |
| 9,402,255 B2 | 7/2016 | Löhr et al. |
| 9,408,162 B2 | 8/2016 | Ho et al. |
| 9,414,332 B2 | 8/2016 | Dinan |
| 9,414,340 B2 | 8/2016 | Dinan |
| 9,439,217 B2 | 9/2016 | Feuersaenger et al. |
| 9,456,424 B2 | 9/2016 | Seo et al. |
| 9,461,793 B2 | 10/2016 | Kim et al. |
| 9,461,797 B2 | 10/2016 | Ahn et al. |
| 9,491,782 B2 | 11/2016 | Kim et al. |
| 9,503,989 B2 | 11/2016 | Haim et al. |
| 9,516,650 B2 | 12/2016 | Ouchi et al. |
| 9,521,632 B2 | 12/2016 | Narasimha et al. |
| 9,521,693 B2 | 12/2016 | Li et al. |
| 9,578,616 B2 | 2/2017 | Etemad et al. |
| 9,585,164 B2 | 2/2017 | Fong et al. |
| 9,615,339 B2 | 4/2017 | Dinan |
| 9,642,098 B2 | 5/2017 | Dinan |
| 9,642,161 B2 | 5/2017 | Wu et al. |
| 9,648,643 B2 | 5/2017 | Dinan |
| 9,661,661 B2 | 5/2017 | Dinan |
| 9,667,398 B2 | 5/2017 | Ahn et al. |
| 9,681,399 B2 | 6/2017 | Dinan |
| 9,681,405 B2 | 6/2017 | Jang et al. |
| 9,706,454 B2 | 7/2017 | Dinan |
| 9,716,575 B2 | 7/2017 | Ahn et al. |
| 9,717,061 B2 | 7/2017 | Dinan |
| 9,717,084 B2 | 7/2017 | Nishikawa et al. |
| 9,736,795 B2 | 8/2017 | Dinan |
| 9,742,539 B2 | 8/2017 | Ahn et al. |
| 9,743,431 B2 | 8/2017 | Dinan |
| 9,749,968 B2 | 8/2017 | Stern-Berkowitz et al. |
| 9,756,581 B2 | 9/2017 | Zhang et al. |
| 9,763,203 B2 | 9/2017 | Dinan |
| 9,769,772 B2 | 9/2017 | Dinan |
| 9,794,887 B2 | 10/2017 | Ouchi et al. |
| 9,794,900 B2 | 10/2017 | Wu |
| 9,801,145 B2 | 10/2017 | Seo et al. |
| 9,801,211 B2 | 10/2017 | Dinan |
| 9,820,283 B2 | 11/2017 | Dinan |
| 9,832,732 B2 | 11/2017 | Ouchi et al. |
| 9,838,179 B2 | 12/2017 | Kim et al. |
| 9,838,990 B2 | 12/2017 | Xu et al. |
| 9,843,982 B2 | 12/2017 | Dinan |
| 9,844,006 B2 | 12/2017 | Dinan |
| 9,848,445 B2 | 12/2017 | Dinan |
| 9,854,608 B2 | 12/2017 | Pelletier et al. |
| 9,867,137 B2 | 1/2018 | Dinan |
| 9,872,280 B2 | 1/2018 | Dinan |
| 9,888,499 B2 | 2/2018 | Dinan |
| 9,894,640 B2 | 2/2018 | Dinan |
| 9,913,258 B2 | 3/2018 | Kim et al. |
| 9,949,221 B2 | 4/2018 | Yamada |
| 9,991,999 B2 | 6/2018 | Ahn et al. |
| 10,009,864 B2 | 6/2018 | Etemad et al. |
| 10,033,499 B2 | 7/2018 | Ahn et al. |
| 10,039,131 B2 | 7/2018 | Dinan |
| 10,064,191 B2 | 8/2018 | Dinan |
| 10,085,288 B2 | 9/2018 | Dinan |
| 10,098,070 B2 | 10/2018 | Haim et al. |
| 10,117,193 B2 | 10/2018 | Feuersaenger et al. |
| 10,123,288 B2 | 11/2018 | Dinan |
| 10,129,798 B2 | 11/2018 | Dinan |
| 10,154,500 B2 | 12/2018 | Dinan |
| 10,206,181 B2 | 2/2019 | Ekpenyong et al. |
| 10,250,368 B2 | 4/2019 | Ahn et al. |
| 10,278,134 B2 | 4/2019 | Dinan |
| 10,327,195 B2 | 6/2019 | Dinan |
| 10,349,361 B2 | 7/2019 | Feuersaenger et al. |
| 10,368,322 B2 | 7/2019 | Dinan |
| 10,375,655 B2 | 8/2019 | Dinan |
| 10,383,068 B2 | 8/2019 | Dinan |
| 10,397,957 B2 | 8/2019 | Dinan |
| 10,499,300 B2 | 12/2019 | Dinan |
| 10,523,389 B2 | 12/2019 | Dinan |
| 10,523,390 B2 | 12/2019 | Dinan |
| 10,524,222 B2 | 12/2019 | Dinan |
| 10,531,495 B2 | 1/2020 | Dinan |
| 10,536,910 B2 | 1/2020 | Gaal et al. |
| 10,555,290 B2 | 2/2020 | Dinan |
| 10,568,048 B2 | 2/2020 | Stern-Berkowitz et al. |
| 10,575,259 B2 | 2/2020 | Dinan |
| 10,588,154 B2 | 3/2020 | Pelletier et al. |
| 10,588,155 B2 | 3/2020 | Dinan |
| 10,652,928 B2 | 5/2020 | Dinan |
| 10,681,701 B2 | 6/2020 | Dinan |
| 10,687,364 B2 | 6/2020 | Dinan |
| 10,805,908 B2 | 10/2020 | Dinan |
| 10,820,278 B2 | 10/2020 | Dinan |
| 10,863,551 B2 | 12/2020 | Dinan |
| 10,869,278 B2 | 12/2020 | Haim et al. |
| 10,887,846 B2 | 1/2021 | Zhang et al. |
| 10,939,472 B2 | 3/2021 | Dinan |
| 11,013,011 B2 | 5/2021 | Dinan |
| 11,064,494 B2 | 7/2021 | Dinan |
| 11,076,392 B2 | 7/2021 | Dinan |
| 11,115,937 B2 | 9/2021 | Dinan |
| 11,147,034 B2 | 10/2021 | Dinan |
| 11,218,975 B2 | 1/2022 | Dinan |
| 11,252,679 B2 | 2/2022 | Dinan |
| 11,252,762 B2 | 2/2022 | Dinan |
| 11,277,241 B2 | 3/2022 | Dinan |
| 11,337,161 B2 | 5/2022 | Dinan |
| 11,395,348 B2 | 7/2022 | Dinan |
| 11,516,812 B2 | 11/2022 | Dinan |
| 11,558,855 B2 | 1/2023 | Dinan |
| 11,582,704 B2 | 2/2023 | Dinan |
| 11,622,372 B2 | 4/2023 | Dinan |
| 11,711,769 B2 | 7/2023 | Dinan |
| 11,743,853 B2 | 8/2023 | Dinan |
| 11,792,859 B2 | 10/2023 | Dinan |
| 11,800,570 B2 * | 10/2023 | Dinan .................. H04L 5/0048 |
| 11,825,419 B2 | 11/2023 | Dinan |
| 11,882,560 B2 | 1/2024 | Dinan |
| 11,895,594 B2 | 2/2024 | Dinan |
| 11,903,000 B2 | 2/2024 | Dinan |
| 11,943,813 B2 | 3/2024 | Dinan |
| 2003/0002482 A1 | 1/2003 | Kubler et al. |
| 2003/0087647 A1 | 5/2003 | Hurst |
| 2004/0001448 A1 | 1/2004 | Preston et al. |
| 2004/0202119 A1 | 10/2004 | Edge |
| 2005/0037786 A1 | 2/2005 | Edge |

(56) References Cited

U.S. PATENT DOCUMENTS

| | | |
|---|---|---|
| 2005/0063356 A1 | 3/2005 | Larsen et al. |
| 2005/0286409 A1 | 12/2005 | Yoon et al. |
| 2007/0002890 A1 | 1/2007 | Mangold et al. |
| 2007/0032255 A1 | 2/2007 | Koo et al. |
| 2007/0149196 A1 | 6/2007 | Choi et al. |
| 2007/0189205 A1 | 8/2007 | Terry et al. |
| 2007/0207828 A1 | 9/2007 | Cheng et al. |
| 2007/0248113 A1 | 10/2007 | Ko et al. |
| 2007/0293224 A1 | 12/2007 | Wang et al. |
| 2008/0039087 A1 | 2/2008 | Gallagher et al. |
| 2008/0069053 A1 | 3/2008 | Kim et al. |
| 2008/0084849 A1 | 4/2008 | Wang et al. |
| 2008/0102842 A1 | 5/2008 | Kim |
| 2008/0102896 A1 | 5/2008 | Wang et al. |
| 2008/0123576 A1 | 5/2008 | Son et al. |
| 2008/0130585 A1 | 6/2008 | Park et al. |
| 2008/0137632 A1 | 6/2008 | Choi et al. |
| 2008/0182579 A1 | 7/2008 | Wang et al. |
| 2008/0267127 A1 | 10/2008 | Narasimha et al. |
| 2009/0046629 A1 | 2/2009 | Jiang et al. |
| 2009/0109838 A1 | 4/2009 | Kuo |
| 2009/0161599 A1 | 6/2009 | Haartsen et al. |
| 2009/0181687 A1 | 7/2009 | Tiirola et al. |
| 2009/0186613 A1 | 7/2009 | Ahn et al. |
| 2009/0238121 A1 | 9/2009 | Kotecha |
| 2009/0239545 A1 | 9/2009 | Lee et al. |
| 2009/0276675 A1 | 11/2009 | Ojala et al. |
| 2009/0285193 A1 | 11/2009 | Kim et al. |
| 2009/0316637 A1 | 12/2009 | Yi et al. |
| 2009/0316678 A1 | 12/2009 | Yamada et al. |
| 2010/0008333 A1 | 1/2010 | Kim et al. |
| 2010/0020760 A1 | 1/2010 | Grandblaise et al. |
| 2010/0035581 A1 | 2/2010 | Park et al. |
| 2010/0056160 A1 | 3/2010 | Kim et al. |
| 2010/0067470 A1 | 3/2010 | Damnjanovic et al. |
| 2010/0069071 A1 | 3/2010 | Simonsson et al. |
| 2010/0091725 A1 | 4/2010 | Ishii |
| 2010/0098011 A1 | 4/2010 | Pelletier et al. |
| 2010/0113082 A1 | 5/2010 | Ishii et al. |
| 2010/0118730 A1 | 5/2010 | Tanaka et al. |
| 2010/0118788 A1 | 5/2010 | Ohta et al. |
| 2010/0128683 A1 | 5/2010 | Zangi et al. |
| 2010/0130137 A1 | 5/2010 | Pelletier et al. |
| 2010/0144353 A1 | 6/2010 | Chong et al. |
| 2010/0184446 A1 | 7/2010 | Moon et al. |
| 2010/0195532 A1 | 8/2010 | Pajukoski et al. |
| 2010/0195566 A1 | 8/2010 | Krishnamurthy et al. |
| 2010/0215004 A1 | 8/2010 | Yoo |
| 2010/0227569 A1 | 9/2010 | Bala et al. |
| 2010/0238872 A1 | 9/2010 | Kim et al. |
| 2010/0238908 A1 | 9/2010 | Wu |
| 2010/0246561 A1 | 9/2010 | Shin et al. |
| 2010/0254356 A1 | 10/2010 | Tynderfeldt et al. |
| 2010/0279695 A1 | 11/2010 | Amirijoo et al. |
| 2010/0290427 A1 | 11/2010 | Sebire et al. |
| 2010/0296465 A1 | 11/2010 | Hooli et al. |
| 2010/0302998 A1 | 12/2010 | Bao et al. |
| 2010/0303039 A1 | 12/2010 | Zhang et al. |
| 2010/0309877 A1 | 12/2010 | Damnjanovic et al. |
| 2010/0322115 A1 | 12/2010 | Wei et al. |
| 2011/0039568 A1 | 2/2011 | Zhang et al. |
| 2011/0039593 A1 | 2/2011 | Lee et al. |
| 2011/0044287 A1 | 2/2011 | Park et al. |
| 2011/0059777 A1 | 3/2011 | Rao |
| 2011/0081936 A1 | 4/2011 | Haim et al. |
| 2011/0085491 A1 | 4/2011 | Tynderfeldt et al. |
| 2011/0092219 A1 | 4/2011 | Damnjanovic et al. |
| 2011/0098054 A1 | 4/2011 | Gorokhov et al. |
| 2011/0105107 A1 | 5/2011 | Kwon et al. |
| 2011/0111749 A1 | 5/2011 | Kim et al. |
| 2011/0128935 A1 | 6/2011 | Jang et al. |
| 2011/0134774 A1 | 6/2011 | Pelletier et al. |
| 2011/0158116 A1 | 6/2011 | Tenny et al. |
| 2011/0158117 A1 | 6/2011 | Ho et al. |
| 2011/0170535 A1 | 7/2011 | Wang et al. |
| 2011/0194455 A1 | 8/2011 | Aminaka et al. |
| 2011/0194493 A1 | 8/2011 | Centonza et al. |
| 2011/0199944 A1 | 8/2011 | Chen et al. |
| 2011/0200014 A1 | 8/2011 | Lee et al. |
| 2011/0200032 A1 | 8/2011 | Lindstrom et al. |
| 2011/0201367 A1 | 8/2011 | Aminaka et al. |
| 2011/0218016 A1 | 9/2011 | Hirakawa et al. |
| 2011/0222428 A1 | 9/2011 | Charbit et al. |
| 2011/0222492 A1 | 9/2011 | Borsella et al. |
| 2011/0223932 A1 | 9/2011 | Hole et al. |
| 2011/0243102 A1 | 10/2011 | Sebire et al. |
| 2011/0243106 A1 | 10/2011 | Hsu et al. |
| 2011/0243111 A1 | 10/2011 | Andgart et al. |
| 2011/0249639 A1 | 10/2011 | Jen |
| 2011/0249641 A1 | 10/2011 | Kwon et al. |
| 2011/0250918 A1 | 10/2011 | Jen |
| 2011/0255431 A1 | 10/2011 | Wang et al. |
| 2011/0261776 A1 | 10/2011 | Ahn et al. |
| 2011/0268028 A1 | 11/2011 | Stern-Berkowitz et al. |
| 2011/0268032 A1 | 11/2011 | Kim et al. |
| 2011/0268087 A1 | 11/2011 | Kwon et al. |
| 2011/0269469 A1 | 11/2011 | Xiao et al. |
| 2011/0274063 A1 | 11/2011 | Li |
| 2011/0275335 A1 | 11/2011 | Luo et al. |
| 2011/0281581 A1 | 11/2011 | Brandt et al. |
| 2011/0286409 A1 | 11/2011 | Son et al. |
| 2011/0286411 A1 | 11/2011 | Kim et al. |
| 2011/0292917 A1 | 12/2011 | Fan et al. |
| 2011/0294474 A1 | 12/2011 | Barany et al. |
| 2011/0294508 A1 | 12/2011 | Min et al. |
| 2011/0299489 A1 | 12/2011 | Kim et al. |
| 2011/0300856 A1 | 12/2011 | Aminaka |
| 2011/0310845 A1 | 12/2011 | Jung et al. |
| 2011/0310851 A1 | 12/2011 | Klingenbrunn et al. |
| 2012/0002568 A1 | 1/2012 | Tiirola et al. |
| 2012/0002617 A1 | 1/2012 | Vujcic |
| 2012/0008524 A1 | 1/2012 | Amirijoo et al. |
| 2012/0008600 A1 | 1/2012 | Marinier et al. |
| 2012/0014371 A1 | 1/2012 | Weng et al. |
| 2012/0021693 A1 | 1/2012 | Wintzell et al. |
| 2012/0026972 A1 | 2/2012 | Miao et al. |
| 2012/0026976 A1 | 2/2012 | Chang et al. |
| 2012/0026977 A1 | 2/2012 | Kim et al. |
| 2012/0039273 A1 | 2/2012 | Nam et al. |
| 2012/0039284 A1 | 2/2012 | Barbieri et al. |
| 2012/0044815 A1 | 2/2012 | Geirhofer et al. |
| 2012/0044906 A1 | 2/2012 | Chen et al. |
| 2012/0057456 A1 | 3/2012 | Bogatin et al. |
| 2012/0063425 A1 | 3/2012 | Wang et al. |
| 2012/0076037 A1 | 3/2012 | Noh et al. |
| 2012/0076088 A1 | 3/2012 | Hwang et al. |
| 2012/0076103 A1 | 3/2012 | Dai et al. |
| 2012/0077484 A1 | 3/2012 | Ji |
| 2012/0082152 A1 | 4/2012 | Baldemair et al. |
| 2012/0093128 A1 | 4/2012 | Song et al. |
| 2012/0106471 A1 | 5/2012 | Behravan et al. |
| 2012/0106495 A1 | 5/2012 | Yang et al. |
| 2012/0106510 A1 | 5/2012 | Kuo |
| 2012/0106511 A1 | 5/2012 | Wu |
| 2012/0113883 A1 | 5/2012 | Osterling |
| 2012/0113914 A1 | 5/2012 | Zhao et al. |
| 2012/0113941 A1 | 5/2012 | Chung et al. |
| 2012/0113962 A1 | 5/2012 | Jen |
| 2012/0120944 A1 | 5/2012 | Yang et al. |
| 2012/0127931 A1 | 5/2012 | Gaal et al. |
| 2012/0140743 A1 | 6/2012 | Pelletier et al. |
| 2012/0170497 A1 | 7/2012 | Zhang et al. |
| 2012/0170570 A1 | 7/2012 | Chang et al. |
| 2012/0176967 A1 | 7/2012 | Kim et al. |
| 2012/0178456 A1 | 7/2012 | Peisa et al. |
| 2012/0178482 A1 | 7/2012 | Seo et al. |
| 2012/0184206 A1 | 7/2012 | Kim et al. |
| 2012/0188897 A1 | 7/2012 | Shen |
| 2012/0188961 A1 | 7/2012 | Suzuki et al. |
| 2012/0218987 A1 | 8/2012 | Zhao et al. |
| 2012/0218988 A1 | 8/2012 | Xu et al. |
| 2012/0224552 A1 | 9/2012 | Feuersanger et al. |
| 2012/0243498 A1 | 9/2012 | Kwon et al. |
| 2012/0243514 A1 | 9/2012 | Wu |

(56) References Cited

U.S. PATENT DOCUMENTS

| | | |
|---|---|---|
| 2012/0250520 A1 | 10/2012 | Chen et al. |
| 2012/0257510 A1 | 10/2012 | Jeong et al. |
| 2012/0257513 A1 | 10/2012 | Yamada |
| 2012/0257569 A1 | 10/2012 | Jang et al. |
| 2012/0257570 A1 | 10/2012 | Jang et al. |
| 2012/0257601 A1 | 10/2012 | Kim et al. |
| 2012/0275378 A1 | 11/2012 | Lee |
| 2012/0275390 A1 | 11/2012 | Korhonen et al. |
| 2012/0281680 A1 | 11/2012 | Bostrom et al. |
| 2012/0287865 A1 | 11/2012 | Wu et al. |
| 2012/0294163 A1 | 11/2012 | Turtinen et al. |
| 2012/0300715 A1* | 11/2012 | Pelletier ............ H04W 74/0891 370/329 |
| 2012/0300720 A1 | 11/2012 | Gou et al. |
| 2012/0300743 A1 | 11/2012 | Kim et al. |
| 2012/0300752 A1 | 11/2012 | Kwon et al. |
| 2012/0302245 A1 | 11/2012 | Huang |
| 2012/0307811 A1 | 12/2012 | Kwon et al. |
| 2012/0314652 A1 | 12/2012 | Ahn et al. |
| 2012/0314675 A1 | 12/2012 | Vujcic |
| 2012/0322453 A1 | 12/2012 | Weng et al. |
| 2012/0327804 A1 | 12/2012 | Park et al. |
| 2013/0010619 A1 | 1/2013 | Fong et al. |
| 2013/0010684 A1 | 1/2013 | Park et al. |
| 2013/0010704 A1 | 1/2013 | Kronquist et al. |
| 2013/0010711 A1 | 1/2013 | Larsson et al. |
| 2013/0010712 A1 | 1/2013 | Kim et al. |
| 2013/0010723 A1 | 1/2013 | Ouchi et al. |
| 2013/0021980 A1 | 1/2013 | Yang et al. |
| 2013/0028069 A1 | 1/2013 | Pelletier et al. |
| 2013/0028185 A1 | 1/2013 | Wu |
| 2013/0028198 A1 | 1/2013 | Yamada |
| 2013/0028236 A1 | 1/2013 | Jung et al. |
| 2013/0034085 A1 | 2/2013 | Bostrom et al. |
| 2013/0039294 A1 | 2/2013 | Wang |
| 2013/0044617 A1 | 2/2013 | Boixadera et al. |
| 2013/0044831 A1 | 2/2013 | Narasimha et al. |
| 2013/0044843 A1 | 2/2013 | Malkamaki et al. |
| 2013/0058309 A1 | 3/2013 | Kuo |
| 2013/0058315 A1 | 3/2013 | Feuersanger et al. |
| 2013/0064165 A1 | 3/2013 | Chen et al. |
| 2013/0064195 A1 | 3/2013 | Chang |
| 2013/0070726 A1 | 3/2013 | Zhang et al. |
| 2013/0072246 A1 | 3/2013 | Nobukiyo et al. |
| 2013/0078913 A1 | 3/2013 | Lee et al. |
| 2013/0083675 A1 | 4/2013 | Yamada |
| 2013/0083683 A1 | 4/2013 | Hwang et al. |
| 2013/0083747 A1 | 4/2013 | Narasimha et al. |
| 2013/0083753 A1 | 4/2013 | Lee et al. |
| 2013/0083769 A1 | 4/2013 | Qu et al. |
| 2013/0084913 A1 | 4/2013 | Gaal et al. |
| 2013/0094433 A1 | 4/2013 | Nagata et al. |
| 2013/0094466 A1 | 4/2013 | Kim et al. |
| 2013/0100938 A1 | 4/2013 | Kwon et al. |
| 2013/0114398 A1 | 5/2013 | Wang |
| 2013/0114505 A1 | 5/2013 | Haim et al. |
| 2013/0114574 A1 | 5/2013 | Ng et al. |
| 2013/0115952 A1 | 5/2013 | Wei |
| 2013/0115958 A1 | 5/2013 | Wei |
| 2013/0148535 A1 | 6/2013 | Baghel et al. |
| 2013/0148592 A1 | 6/2013 | Noh et al. |
| 2013/0155898 A1 | 6/2013 | Yin et al. |
| 2013/0156014 A1 | 6/2013 | Kim et al. |
| 2013/0157669 A1 | 6/2013 | Turtinen et al. |
| 2013/0163550 A1 | 6/2013 | Marinier et al. |
| 2013/0165124 A1 | 6/2013 | Liang et al. |
| 2013/0165126 A1 | 6/2013 | Wei |
| 2013/0176988 A1 | 7/2013 | Wang et al. |
| 2013/0183979 A1 | 7/2013 | Chen et al. |
| 2013/0188473 A1 | 7/2013 | Dinan |
| 2013/0188580 A1 | 7/2013 | Dinan |
| 2013/0188617 A1 | 7/2013 | Dinan |
| 2013/0188619 A1 | 7/2013 | Dinan |
| 2013/0188620 A1 | 7/2013 | Dinan |
| 2013/0189930 A1 | 7/2013 | Kinnunen et al. |
| 2013/0194908 A1 | 8/2013 | Gao et al. |
| 2013/0195048 A1 | 8/2013 | Ekpenyong et al. |
| 2013/0195084 A1 | 8/2013 | Chen et al. |
| 2013/0195086 A1 | 8/2013 | Xu et al. |
| 2013/0208601 A1 | 8/2013 | Cui et al. |
| 2013/0235807 A1 | 9/2013 | Lee et al. |
| 2013/0242892 A1 | 9/2013 | Ye |
| 2013/0242911 A1 | 9/2013 | Heo et al. |
| 2013/0250925 A1 | 9/2013 | Lohr et al. |
| 2013/0258957 A1 | 10/2013 | Dinan |
| 2013/0258958 A1 | 10/2013 | Dinan |
| 2013/0260741 A1 | 10/2013 | Yamada |
| 2013/0260821 A1 | 10/2013 | Deparis et al. |
| 2013/0272229 A1 | 10/2013 | Dinan |
| 2013/0279434 A1 | 10/2013 | Dinan |
| 2013/0279435 A1 | 10/2013 | Dinan |
| 2013/0279486 A1 | 10/2013 | Kato et al. |
| 2013/0315094 A1 | 11/2013 | Vannithamby et al. |
| 2013/0315214 A1 | 11/2013 | Bai et al. |
| 2013/0322397 A1 | 12/2013 | Lee et al. |
| 2013/0322409 A1 | 12/2013 | Takahashi et al. |
| 2013/0329675 A1 | 12/2013 | Dinan |
| 2013/0329711 A1 | 12/2013 | Seo et al. |
| 2013/0343358 A1 | 12/2013 | Kato et al. |
| 2014/0016559 A1 | 1/2014 | Jang et al. |
| 2014/0016593 A1 | 1/2014 | Park et al. |
| 2014/0023043 A1 | 1/2014 | Yang et al. |
| 2014/0029575 A1 | 1/2014 | Zeng et al. |
| 2014/0029586 A1 | 1/2014 | Loehr et al. |
| 2014/0050205 A1 | 2/2014 | Ahn et al. |
| 2014/0056244 A1 | 2/2014 | Frenne et al. |
| 2014/0056251 A1 | 2/2014 | Ahn et al. |
| 2014/0056271 A1 | 2/2014 | Ahn et al. |
| 2014/0064233 A1 | 3/2014 | Oizumi et al. |
| 2014/0079032 A1 | 3/2014 | Bergstrom et al. |
| 2014/0086182 A1 | 3/2014 | Shin et al. |
| 2014/0086213 A1 | 3/2014 | Kwon et al. |
| 2014/0086224 A1 | 3/2014 | Kwon et al. |
| 2014/0092812 A1 | 4/2014 | Jang et al. |
| 2014/0105192 A1 | 4/2014 | Park et al. |
| 2014/0112276 A1 | 4/2014 | Ahn et al. |
| 2014/0112308 A1 | 4/2014 | Kwon et al. |
| 2014/0126475 A1 | 5/2014 | Ahn et al. |
| 2014/0161089 A1 | 6/2014 | Ahn et al. |
| 2014/0185595 A1 | 7/2014 | Wu et al. |
| 2014/0192798 A1 | 7/2014 | Yang et al. |
| 2014/0198748 A1 | 7/2014 | Lee et al. |
| 2014/0213244 A1 | 7/2014 | Oh et al. |
| 2014/0219185 A1 | 8/2014 | Etemad et al. |
| 2014/0233542 A1 | 8/2014 | Bergstrom et al. |
| 2014/0293947 A1 | 10/2014 | Nishikawa et al. |
| 2014/0307670 A1 | 10/2014 | Kim et al. |
| 2014/0308956 A1 | 10/2014 | Zhang et al. |
| 2014/0321406 A1 | 10/2014 | Marinier et al. |
| 2014/0321442 A1 | 10/2014 | Kim et al. |
| 2014/0328326 A1 | 11/2014 | Gunnarsson et al. |
| 2014/0334448 A1 | 11/2014 | Langereis et al. |
| 2014/0341109 A1 | 11/2014 | Cartmell et al. |
| 2014/0348078 A1 | 11/2014 | Kim et al. |
| 2014/0349713 A1 | 11/2014 | Yamada |
| 2014/0369317 A1 | 12/2014 | Ye |
| 2014/0369322 A1 | 12/2014 | Fwu et al. |
| 2015/0031409 A1 | 1/2015 | Ahn et al. |
| 2015/0031410 A1 | 1/2015 | Lim et al. |
| 2015/0036601 A1 | 2/2015 | Kim et al. |
| 2015/0043524 A1 | 2/2015 | Kim et al. |
| 2015/0063245 A1 | 3/2015 | Gao et al. |
| 2015/0063262 A1 | 3/2015 | Ji et al. |
| 2015/0071236 A1 | 3/2015 | Baldemair et al. |
| 2015/0110086 A1 | 4/2015 | Li et al. |
| 2015/0208358 A1 | 7/2015 | Ahn et al. |
| 2015/0249527 A1 | 9/2015 | Hwang et al. |
| 2015/0296542 A1 | 10/2015 | Heo et al. |
| 2015/0327249 A1 | 11/2015 | Kitazoe et al. |
| 2016/0021629 A1 | 1/2016 | Jang et al. |
| 2016/0080126 A1 | 3/2016 | Dinan |
| 2016/0100372 A1 | 4/2016 | Dinan |
| 2016/0249299 A1 | 8/2016 | Ahn et al. |
| 2017/0099658 A1 | 4/2017 | Shattil |

(56) References Cited

U.S. PATENT DOCUMENTS

| | | |
|---|---|---|
| 2017/0208581 A1 | 7/2017 | Yang et al. |
| 2017/0353931 A1 | 12/2017 | Stern-Berkowitz et al. |
| 2020/0245257 A1 | 7/2020 | Pelletier et al. |
| 2021/0099960 A1 | 4/2021 | Haim et al. |

FOREIGN PATENT DOCUMENTS

| | | |
|---|---|---|
| WO | 2011016377 A1 | 2/2011 |
| WO | 2011023057 A1 | 3/2011 |
| WO | 2011050856 A1 | 5/2011 |
| WO | 2011085200 A1 | 7/2011 |
| WO | 2011120716 A1 | 10/2011 |
| WO | 2012036704 A1 | 3/2012 |
| WO | 2013025237 A1 | 2/2013 |
| WO | 2014085967 A1 | 6/2014 |

OTHER PUBLICATIONS

U.S. Appl. No. 17/087,275.
U.S. Appl. No. 17/711,463.
U.S. Appl. No. 18/150,631, filed Jan. 5, 2023.
U.S. Appl. No. 18/170,922.
U.S. Appl. No. 18/135,896, filed Apr. 18, 2023.
U.S. Appl. No. 18/218,907, filed Jul. 6, 2023.
U.S. Appl. No. 18/454,460, filed Aug. 23, 2023.
U.S. Appl. No. 18/487,402, filed Oct. 16, 2023.
U.S. Appl. No. 18/487,321, Cell Grouping for Wireless Communications, filed Oct. 16, 2023.
U.S. Appl. No. 18/396,170, Resource Allocation for Multicarrier Communications, filed Dec. 26, 2023.
U.S. Appl. No. 18/581,982, Cell Grouping for Wireless Communications, filed Feb. 20, 2024.
3GPP TSG RAN WG2 Meeting #77 R2-120732 Dresden, Germany, Feb. 6-10, 2012 Source: Fujitsu Title: Discussion on PHR for SCell in Rel-11.
3GPP TSG-RAN WG2 #77, R2-120218 Dresden, Germany, Feb. 6-10, 2012 Source: Sharp Title: TA group handling.
3GPP TSG RAN WG2 #69bis R2-102395 Beijing, China, Apr. 12-16, 2010 Source: Qualcomm Incorporated Title: UL and DL Component Carrier Linking.
3GPP TSG-RAN WG2 Meeting #75B R2-114966 Zhuhai, China, Oct. 10-14, 2011 Source: Potevio Title: Consideration on contention based random access.
3GPP TSG-RAN WG2 Meeting #75bis R2-114968 Oct. 10-14, 2011, Zhuhai, China Source: Panasonic Title: Message 2 reception in RA procedure for SCell.
3GPP TSG RAN WG2 #75bis R2-114977 Oct. 10-14, 2011, Zhuhai, China Source: Potevio Title: UE Behaviour on Multi-RA Procedures.
3GPP TSG-RAN WG2 Meeting #75bis R2-115042 Zhuhai China, Oct. 10-14, 2011 Source: Fujitsu Title: Remaining issues on SCell RA procedure.
3GPP TSG-RAN WG2 Meeting #75bis R2-115147 Zhuhai, China, Oct. 10-14, 2011 Source: Renesas Mobile Europe Ltd. Title: Open issues for RACH procedure.
3GPP TSG-RAN WG2 #75bis Tdoc R2-115156 Zhuhai, China, Oct. 10-14, 2011 Title: Random Access Response in multiple TA Source: Research in Motion, UK Limited.
3GPP TSG-RAN WG2#75bis R2-115174 Zhuhai, China, Oct. 10-14, 2011 Source: Sharp Title: A special SCell for CA enhancement.
3GPP TSG-RAN2#75bis R2-115302 Oct. 10-14, 2011, Zhuhai, China Source: New Postcom Title: Open issues of RACH on SCell.
TSG-RAN WG2#75bis R2-115338 Oct. 10-14, 2011, Zhuhai, China Title: RACH on SCell Source: Alcatel-Lucent, Alcatel-Lucent Shanghai Bell.
3GPP TSG-RAN2 Meeting #75bis R2-115399 Oct. 10-14, 2011, Zhuhai, China Source: LG Electronics Inc. Title: RACH applicability and TA group.

3GPP TSG-RAN WG2 #75bis Tdoc R2-115409 Zhuhai, China, Oct. 10-14, 2011 Source: InterDigital Communications Title: Prioritization between RACH Procedures in LTE CA.
3GPP TS 36.213 V10.3.0 (Sep. 2011), 3rd Generation Partnership Project; Technical Specification Group Radio Access Network; Evolved Universal Terrestrial Radio Access (E-UTRA); Physical layer procedures (Release 10).
3GPP TSG-RAN WG2 #77 R2-120229, Dresden, Germany, Feb. 6-10, 2012, Source: Acer Incorporated, Title: Changing of DL Timing Reference.
3GPP TSG RAN WG2 Meeting #77bis R2-121309, Jeju, South Korea, Mar. 26-30, 2012, Source: Pantech, Title: RAR MAC CE with C-RNTI.
3GPP TSG-RAN WG2 Meeting #77bis R2-121368, Jeju, Korea, Mar. 26-30, 2012, Source: LG Electronics Inc., Title: Performing RA procedure on cell other than the timing reference cell.
3GPP TSG-RAN WG2#77bis meeting R2-121712, Jeju, Korea, Mar. 26-30, 2012, Source: Samsung, Title: Timing reference for sTAG.
3GPP TSG RAN WG2 Meeting #77bis R2-121190 Jeju Island, Korea, Mar. 26-30, 2012 Source: New Postcom Title: Considerations on TAG change procedure.
3GPP TSG RAN WG2 Meeting #75-bis R2-115449 Zhuhai, China, Oct. 10-14, 2011 Source: NTT Docomo, Inc. (Email discussion rapporteur) Title: Summary of email discussion [75#33]—LTE: Carrier Aggregation scenarios and resulting requirements.
3GPP TSG-RAN WG2 #75bis Tdoc R2-115463 Zhuhai, China, Oct. 10-14, 2011 Source: Ericsson, ST Ericsson Title: SCell Random Access Prioritization.
3GPP TSG-RAN WG2 #76 Tdoc R2-115743 San Francisco, United States, Nov. 14-18, 2011 Source: Ericsson, ST Ericsson Title: Random Access Response on an SCell.
3GPP TSG-RAN WG2 Meeting #76 R2-115754 San Francisco, United States, Nov. 14-18, 2011 Source: ZTE Title: MSG2 Position for MTA RA.
3GPP TSG-RAN WG2 Meeting #76 R2-115782 San Francisco, USA, Nov. 14-18, 2011 Source: Renesas Mobile Europe Ltd. Title: RACH procedure on SCell.
3GPP TSG-RAN WG2 Meeting #76 R2-115890 Nov. 14-18, 2011, San Francisco, USA Source: HT mMobile Inc. Title: Initiating RA procedure on SCell.
3GPP TSG-RAN WG2 #76 Tdoc R2-116111 San Francisco, USA, Nov. 14-18, 2011 Source: InterDigital Communications Title: MSG1 Transmission for RACH Procedure for SCells.
3GPP TSG-RAN2 Meeting #76 R2-116225 Nov. 14-18, 2011, San Francisco, USA Source: LG Electronics Inc. Title: SCell RACH trigger.
3GPP TSG-RAN2 Meeting #76 R2-116228 Nov. 14-18, 2011, San Francisco, USA Source: LG Electronics Inc. Title: RACH applicability and TA group.
3GPP TSG-RAN WG2 Meeting #76 R2-16309 San Francisco, USA, Nov. 14-18, 2011 Source: Fujitsu Title: Trigger of RA procedure on SCell(s).
3GPP TSG-WG2 Meeting #76 R2-116503 San Francisco, USA, Nov. 14-18, 2011 Updates of Carrier Aggregation agreements (WI R2-111115) Rapporteur (Nokia Corporation).
3GPP TSG-RAN WG2 Meeting #73bis R2-111880 Shanghai, China, Apr. 11-15, 2011 Title: Corrections to CA related IE descriptions Source to WG: Potevio.
3GPP TSG-RAN WG2 #74 Tdoc R2-113255 Barcelona, Spain, May 9-13, 2011 Source: InterDigital Communications Title: Support for multiple Timing Advance in LTE CA.
3GPP TSG-RAN WG1 Meeting #65 R1-111577 Barcelona, Spain, May 9-13, 2011 Source: Panasonic Title: Simultaneous SRS transmission on multiple component carriers.
3GPP TSG-RAN1 Meeting #65 R1-111893 Barcelona, Spain, May 8-13, 2011 Title: Correction to simultaneous transmission of SRS and PUCCH format 2/2a/2b Source: ZTE, Qualcomm Inc.
3GPP TSG-RAN2 Meeting #77bis, R2-121899, Jeju, Korea, Mar. 26-30, 2012 Change Request 36.300.
3GPP TSG RAN WG1 #68bis, R1-121425 Jeju, Korea, Mar. 26-30, 2012 Source: LG Electronics Title: SRS transmissions in multiple TA.

(56) References Cited

OTHER PUBLICATIONS

3GPP TSG-RAN WG1 Meeting #68 R1-120712 Dresden, Germany, Feb. 6-10, 2012 Source: Nokia Siemens Networks, Nokia Title: On Multiple Timing Advance in RAN1.
3GPP TSG RAN WG2 Meeting #76 R2-115738 San Francisco, USA, Nov. 14-18, 2011 Source: New Postcom Title: Considerations on TA group (re)configuration.
3GPP TSG-RAN WG2 Meeting #76 R2-115756 Nov. 4-18, 2011, San Francisco, USA Source: ZTE Title: TA Group management.
3GPP TSG-RAN WG2 Meeting #76 R2-115805 San Francisco, USA, Nov. 14-18, 2011 Source: Nokia Siemens Networks, Nokia Corporation Title: TA group signalling.
3GPP TSG-RAN WG2 Meeting #76 R2-115827 San Francisco, USA, Nov. 14-18, 2011 Source: Huawei, HiSilicon Title: Signalling for the TA Group Management.
3GPP TSG-RAN2#76 meeting Tdoc R2-116340 San Francisco. USA, Nov. 14-18, 2011, Source: HTC Title: TA group configuration and reconfiguration.
3GPP TSG RAN WG2 Meeting #77 R2-120266 Feb. 6-10, 2012, Dresden, Germany Source: Intel Corporation Title: CA Signaling Enhancements for HetNet Type Deployments.
3GPP TSG RAN WG2 Meeting #77 R2-120731 Dresden, Germany, Feb. 6-10, 2012 Source: Fujitsu Title: Further consideration on the TAG change procedure.
3GPP TSG-RAN2 Meeting #77bis R2-121233 Jeju, Korea, Mar. 26-30, 2012 Source: Panasonic Title: TAG Composition and related aspects.
3GPP TSG RAN WG2 Meeting #77bis R2-121798 Jeju, Korea, Mar. 26-30, 2012 Source: Fujitsu Title: Further consideration on the TAG change procedure.
3GPP TSG RAN WG2 Meeting #78 R2-122173 Prague, Czech Republic, May 21-25, 2012 Source: CATT Title: Detail on TAG Configuration.
3GPP TSG-RAN2#78 meeting Tdoc R2-122240 May 21-25, 2012, Prague, Czech Republic Source: ZTE Corporation Title: UE capability report for MTA.
3GPP TSG RAN WG2 Meeting #78 R2-122264 Prague, Czech Republic, May 21-25, 2012 Source: New Postcom Title: Remaining issued of TAG configuration.
3GPP TSG RAN WG1 #68 R1-110424 Dresden, Germany, Feb. 6-10, 2012 Source: LG Electronics Title: Simultaneous transmissions in multiple TA groups.
3GPP TSG RAN WG1 #68 R1-120462 Dresden, Germany, Feb. 6-10, 2012 Source: Texas Instruments Title: Physical layer aspects of multiple timing advance commands.
3GPP TSG RAN WG1 Meeting #68 R1-120486 Dresden, Germany, Feb. 6-10, 2012 Source: Alcatel-Lucent, Alcatel-Lucent Shanghai Bell Title: Power scaling for simultaneous transmissions of multiple UL channels with multiple TA groups.
3GPP TSG RAN WG1 #68 R1-120539 Feb. 6-10, 2012, Dresden, Germany Source: Qualcomm Incorporated Title: SRS operation in multiple TA offset CA.
3GPP TSG RAN WG1 #68 R1-120540 Feb. 6-10, 2012, Dresden, Germany Source: Qualcomm Incorporated Title: Power control aspects of multiple TA operation.
3GPP TSG RAN WG1 Meeting #68 R1-120915 Dresden, Germany, Feb. 6-10, 2012 Title: [Draft] LS on simultaneous transmission of PUSCH/PUCCH/SRS for multiple TA Source: Panasonic [TSG RAN WG1].
3GPP TSG RAN WG1 #68 R1-120918 Dresden, Germany, Feb. 6-10, 2012 Proposal on PUSCH/PUCCH transmission with multiple TA LG Electronics, Panasonic, Ericsson, ST-Ericsson, Pantech, Texas Instruments.
3GPP TSG RAN WG1 #68 R1-120919 Dresden, Germany, Feb. 6-10, 2012 proposal on SRS transmission with multiple TA LG Electronics, ZTE, Pantech, CATT.
3GPP TSG RAN WG1 Meeting #68 R1-120946 Dresden, Germany, Feb. 6-10, 2012 Title: LS on simultaneous transmission of PUSCH/PUCCH/SRS for multiple TA Source: TSG RAN WG1.
Adaptive Video Coding for Mobile Wireless Networks by Benjamin Belzer, Judy Liao, John D. Villasenor, IEEE Compt. Soc. Press (1994).
3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TSG RAN WG1 Meeting #68bis R1-121142 Jeju, Korea, Mar. 26-30, 2012 Source: Panasonic Title: SCell PRACH transmission timing.
3GPP TSG-RAN2 #73bis meeting Tdoc R2-113102 Barcelona, Spain, May 9-13, 2011 Source: MediaTek Title: Transmission of SCell RACH.
3GPP TSG-RAN WG2 Meeting #77bis R2-121130 Jeju, South Korea, Mar. 26-30, 2012 Agenda item: 7.1.2.3 Source: Qualcomm Incorporated Title: UE indication of UL timing loss for secondary TA group.
3GPP TSG RAN WG2 Meeting #77bis R2-121139 Jeju, Korea, Mar. 26-30, 2012 Source: CATT Title: RACH Configuration in sTAG.
3GPP TSG-RAN WG2 Meeting #77bis R2-121181 Jeju, South Korea, Mar. 26-30, 2012 (Resubmission of R2-120089) Source: Nokia Siemens Networks, Nokia Corporation Title: RLM on SCells.
3GPP TSG RAN WG2 Meeting #77bis R2-121189 Jeju, Korea, Mar. 26-30, 2012 Source: New Postcom Title: Considerations on RACH failure handling on SCell.
3GPP TSG-RAN2#77bis R2-121193 Jeju, South Korea, Mar. 26-30, 2012 Source: NTT Docomo, Inc. Title: Radio link monitoring for SCell in Rel-11.
3GPP TS 36.321 V11.0.0 (Sep. 2012), 3rd Generation Partnership Project; Technical Specification Group Radio Access Network; Evolved Universal Terrestrial Radio Access (E-UTRA); Medium Access Control (MAC) protocol specification (Release 11).
3GPP TSG-RAN WG2 Meeting #77bis R2-121232 Mar. 26-30, 2012, Jeju, Korea, resubmission of R2-120246 Source: Panasonic Title: Issues on exceeding maximum timing difference of aggregated cells.
3GPP TS 36.321 V10.4.0 (Dec. 2011), 3rd Generation Partnership Project; Technical Specification Group Radio Access Network; Evolved Universal Terrestrial Radio Access (E-UTRA); Medium Access Control (MAC) protocol specification (Release 10).
3GPP TSG-RAN WG2 #77bis Tdoc R2-121278 Jeju, South Korea, Mar. 26-30, 2012 Title: Random Access Response in multiple TA Source: Research in Motion, UK Limited.
3GPP TSG-RAN2 #77bis Meeting Tdoc R2-121347 Jeju, Korea, Mar. 26-30, 2012 Source: MediaTek Inc. Title: Discussions on SCell RA procedure when reaching PREAMBLE_TRAN_MAX.
3GPP TSG-RAN2 Meeting #77bis R2-121377 Mar. 26-30, 2012, Jeju, Korea Source: LG Electronics Inc. Title: Handling of SCell RACH Problem.
3GPP TSG-RAN WG2#77bis R2-121384 Jeju, Korea, Mar. 26-30, 2012 Source: Sharp Title: Remaining Issues of TA group handling.
3GPP TSG RAN WG2#77bis R2-121404 Jeju Island, Korea, Mar. 26-30, 2012 Source: Samsung Title: Remaining issue on random access failure for SCell.
3GPP TSG-RAN WG2 #77b R2-121409 Jeju, Korea, Mar. 26-30, 2012 Source: Acer Incorporated Title: Analysis of RA failure Handling.
3GPP TSG RAN WG2 #77 bis R2-121529 Jeju, Korea, Mar. 26-30, 2012 Source: ITRI Title: Discussion on whether to stop RA procedure when RA failure occurs.
3GPP TSG-RAN WG2 Meeting #77bis R2-121711 Jeju, Korea, Mar. 26-30, 2012 Source: Potevio Title: Random Access Failures Handling on SCells.
3GPP TSG RAN WG2 #77bis R2-121721 Mar. 26-30, 2012, Jeju, Korea Source: Intel Corporation Title: Further discussion on the open issues of RACH on SCell.
3GPP TSG-RAN WG2 Meeting #77bis R2-121799 Jeju, Korea, Mar. 26-30, 2012 Source: Fujitsu Title: Reaching PREAMBLE_TRANS_MAX.
3GPP TSG-RAN2 Meeting #77bis R2-121869 Jeju, Korea, Mar. 26-30, 2012 Source: Ericsson Title: Introduction of CA Enhancements in MAC.

(56) References Cited

OTHER PUBLICATIONS

3GPP TSG RAN WG2 Meeting #78, R2-123022 Prague, Czech Republic, May 25, 2011, Title: Introduction of Carrier Aggregation enhancements.
European Final Rejection—EP Appl. 13702187.9—dated Nov. 28, 2016.
"MAC Downlink Signalling for Multiple TA"; Nokia Siemens Network et al.: 3GPP Draft; R2-115747 Downlink Signalling for Multiple TA, 3rd Generation Partnership Project (3GPP), Mobile Competence Centre ; 650, Route Des Lucioles ; F-06921 Sophia-Antipolis Cedex; France, vol. RAN WG2, No. San Francisco, USA; Nov. 14, 2011-Nov. 18, 2011, Nov. 7, 2011 (Nov. 7, 2011), XP050564143.
3GPP TS 36.331 V9.10.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 9).
Sep. 19, 2017—European Search Report—EP 17153540.4.
Mar. 28, 2018—European Office Action—EP 13703256.1.
3GPP TSG RAN WG2 Meeting #80 R2-125578 New Orleans, USA, Nov 12-Nov. 16, 2012 Source: CATT Title: Multi-TA Capability.
3GPP TSG RAN WG2 Meeting #77bis R2-124764 Bratislava, Slovakia, Oct. 8-12, 2012 Source: CATT Title: Consideration on Multi-TA Capability.
3GPP TSG-RAN WG2 Meeting #77bis R2-121456 Jeju, Korea, Mar. 26-30, 2012 Source: Huawei, HiSilicon Title: Parallel transmission in the same TAG.
Apr. 20, 2018—European Search Report—EP 17189302.7.
Feb. 8, 2019—European Office Action—EP 15165499.3.
3GPP TSG RAN WG2 #76, R2-115743 San Francisco, USA, Nov. 14-18, 2011, Title: Random Access Response on an SCell.
3GPP TSG RAN WG1 Meeting #67, R1-113721, Nov. 14-18, 2011, San Francisco, USA Source: CATT Title: Simultaneous transmission of multiple uplink channels in LTE-A Rel-11.
3GPP TSG-RAN WG1 Meeting #66bis, R1-113115, Oct. 10-14, 2011, Zhuhai, China Source: Panasonic Title: Uplink signaling for carrier aggregation enhancement.
3GPP TSG RAN WG1 Meeting #67 R1-114069, Nov. 14-18, 2011, San Francisco, USA Source: NTT Docomo Title: Views on CSI Reporting for Rel-11 Carrier Aggregation.
3GPP TSG RAN WG1 Meeting #67 R1-114086, Nov. 14-18, 2011, San Francisco, USA Source: Huawei, HiSilicon Title: Simultaneous transmission of SRS and PUCCH.
Jun. 18, 2020—European Office Action—EP 17189302.7.
Jul. 7, 2020—European Office Action—EP 15165499.3.
3GPP TSG RAN WG2 Meeting #78 R2-122267 Prague, Czech Republic, May 21-25, 2012 Source: New Postcom Title: Considerations on remaining issues of TAG change.
3GPP TSG-RAN WG2 Meeting #78 R2-122313 Prague, Czech Republic, May 21-25, 2012 Source: Huawei, HiSilicon Title: TAG change procedure for the SCell.
3GPP TSG-RAN WG2 Meeting #78 R2-122385 Prague, Czech Republic, May 21-25, 2012 Source: LG Electronics Inc. Title: TAG Re-association Procedure in CA.
3GPP TSG-RAN2#78 R2-122386 Prague, Czech Republic, May 21-25, 2012 Source: NTT Docomo, Inc. Title: SCell status at TAG change.
3GPP TSG-RAN WG2#78 R2-122454 Prague, Czech Republic, May 21-25, 2012 Source: Sharp Title: Remaining issues of TA group handling.
TSG-RAN WG2#78 R2-1212738 Prague, Czech Republic, May 21-25, 2012 Title: TAG related signalling Source: Alcatel-Lucent, Alcatel-Lucent Shanghai Bell.
3GPP TSG RAN WG2 Meeting #78 R2-122852 Prague, Czech Republic, May 21-25, 2012 Source: Fujitsu Title: On the TAG change procedure.
3GPP TSG RAN WG2 Meeting #78 R2-122908 Prague, Czech, May 21-25, 2012 Source: Pantech Title: Considerations on Multiple TA capability.

3GPP TSG-RAN2 Meeting #78 R2-123022 Prague, Czech Republic, May 21-25, 2012 Change Request: 36300 CR 438 rev 1 Current version: 11.1.0 Title: Introduction of Carrier aggregation enhancements Source to WG: Rapporteur (Nokia Corporation).
3GPP TS 36.212 V10.0.0 (Dec. 2010), 3rd Generation Partnership Project; Technical Specification Group Radio Access Network; Evolved Universal Terrestrial Radio Access (E-UTRA); Multiplexing and channel coding (Release 10).
3GPP TSG RAN WG1 Meeting #66bis R1-113187 Zhuhai, China, Oct. 10-14, 2011 Source: LG Electronics Title: Discussion on Simultaneous Uplink Channel Transmission in Rel-11.
3GPP TSG RAN WG1 Meeting #66bis R1-113314 Zhuhai, China, Oct. 10-14, 2011 Source: Alcatel-Lucent, Alcatel- Lucent Shanghai Bell Title: Multiple Timing Advances for Carrier Aggregation.
3GPP TSG RAN WG1 Meeting #67 R1-113910 San Francisco, USA, Nov. 14-18, 2011 Source: LG Electronics Title: Aspect on Simultaneous Transmission of PRACH and UL Channels considering Multiple Timing Advance.
3GPP TSG RAN WG1 Meeting #67 R1-114093 San Francisco, USA, Nov. 14-18, 2011 Source: Huawei, HiSilicon Title: RACH based multiple timing advances.
3GPP TSG RAN WG1 Meeting #68bis R1-120974 Jeju, Korea, Mar. 26-30, 2012 Source: Huawei, HiSilicon Title: Consideration on simultaneous transmission for UL channels in case of MTA.
3GPP TSG-RAN WG1 #68bis R1-121020 Jeju Island, Korea, Mar. 26-30, 2012 Source: Ericsson, ST-Ericsson Title: Channel Prioritization due to Multiple TA.
3GPP TSG RAN WG1 Meeting #68 bis R1-121064 Jeju, Korea, Mar. 26-30, 2012 Source: ZTE Title: Consideration on remaining issues related to multiple TA.
3GPP TSG RAN WG1 Meeting #68bis R1-121084 Jeju, Korea, Mar. 26-30, 2012 Source: CATT Title: UL transmission method with multiple timing advances in Rel-11.
3GPP TSG-RAN WG1 Meeting #68bis R1-121141 Jeju, Korea, Mar. 26-30, 2012 Source: Panasonic Title: UE behavior for power limitation in multiple TA.
3GPP TSG RAN WG1 #68bis R1-121426 Jeju, Korea, Mar. 26-30, 2012 Source: LG Electronics Title: Power limitation in multiple TA.
3GPP TSG RAN WG1 Meeting #68bis R1-121467 Jeju, Korea, Mar. 26-30, 2012 Source: NTT Docomo Title: UL Transmissions in Case of Power Limitation for Multiple TA.
3GPP TSG-RAN WG1 #68bis R1-121551 Jeju, Korea, Mar. 24-30, 2012 Source: Qualcomm Incorporated Title: Power control aspects of multiple TA operation.
3GPP TSG RAN WG1 #68bis R1-121896 Jeju, Korea, Mar. 26-30, 2012 Joint proposal on SRS transmission with multiple TA—full overlap case LG Electronics. CATT, Pantech, Panasonic, Ericsson, ST-Ericsson.
3GPP TSG-RAN WG2 Meeting #76 R2-115755 San Francisco, U.S., Nov. 14-18, 2011 Source: ZTE Title: Discussion on RACH collide with other UL transmission.
3GPP TSG-RAN WG2 Meeting #76 R2-115882 Nov. 14-18, 2011, San Francisco, USA Source: Panasonic Title: Parallel PRACH and PUSCH/PUCCH transmission.
3GPP TSG-RAN WG2 #76 Tdoc R2-115932 San Francisco, United States, Nov. 14-18, 2011 Source: Ericsson, ST Ericsson Title: Parallel Transmission of Preamble and UL Data.
TSG-RAN WG2#76 R2-116184 Nov. 14-18, 2011, San Francisco, USA Title: Simultaneous transmissions of RACH and PUCCH/PUSCH/SRS Source: Alcatel-Lucent, Alcatel-Lucent Shanghai Bell.
3GPP TSG-RAN WG2 Meeting #76 R2-116311 San Francisco, USA, Nov. 14-18, 2011 Source: Fujitsu Title: Collision between PUCCH and SCell PRACH.
3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
3GPP TSG-RAN WG2 Meeting #74 R2-112806 May 9-13, 2011, Barcelona, Spain Source: Panasonic Title: RACH on SCell for supporting Multiple Timing Advance.
3GPP TSG RAN WG2 Meeting #74 R2-112815 Barcelona, Spain, May 9-13, 2011 Source: CATT Title: RA Procedure for Multi-TA.

(56) References Cited

OTHER PUBLICATIONS

3GPP TSG-RAN WG2 Meeting #74 R2-112876 Barcelona, Spain, May 9-13, 2011 Source: ZTE Title: Group Model in Multiple TA.
3GPP TSG RAN WG2 #74 R2-112878 Barcelona, Spain, May 9-13, 2011 Source: ZTE Title: Potential PHY Impact of RACH on SCell for MTA.
3GPP TSG RAN WG2 Meeting #74 R2-112925 Barcelona, Spain, May 9-13, 2011 Source: New Postcom Title: Analysis of PCell change on single and multiple TA scenarios.
3GPP TSG-RAN WG2#74 R2-113050 Barcelona, Spain, May 9-13, 2011 Source: Sharp Title: Considerations for RACH initiation on SCell.
3GPP TSG-RAN WG2 meeting #74 R2-113063 Barcelona, Spain, May 9-13, 2011 Source: Qualcomm Incorporated Title: Consideration on multiple TA.
3GPP TSG-RAN WG2 Meeting #74 R2-113067 Barcelona, Spain, May 9-13, 2011 Source: Potevio Title: Random Access on SCell for Supporting Multi-TA.
3GPP TSG-RAN2 #73bis meeting Tdoc R2-113101 Barcelona, Spain, May 9-13, 2011 Source: MediaTek Title: Grouping of multi-TA.
3GPP TSG-RAN2#74 meeting R2-113124 Barcelona, Spain, May 9-13, 2011 Source: Samsung Title: Further discussions of Issues with Multiple-TA.
3GPP TSG RAN WG2 #74 R2-113192 Barcelona, Spain, May 9-13, 2011 Source: ITRI Title: Considerations on Random Access on SCell.
3GPP TSG RAN2#74 meeting R2-113215 Barcelona, Spain, May 9-13, 2011 Source: Intel Corporation Title: Configuration of multiple TA in Rel-11 CA.
TSG-RAN WG2#74 R2-113235 May 9-13, 2011, Barcelona, Spain Title: Initiating timing alignment for SCell in multiple TA Source: Alcatel-Lucent, Alcatel-Lucent Shanghai Bell.
3GPP TSG-RAN WG2#74 R2-113241 May 9-13, 2011, Barcelona, Spain Source: Motorola Mobility Title: Considerations for Supporting Multiple Timing Advances.
3GPP TSG-RAN WG1 #68 R1-120075 Dresden, Germany, Feb. 6-10, 2012 Source: Ericsson, ST-Ericsson Title: Power scaling due to multiple TA values.
3GPP TSG RAN WG1 Meeting #68 R1-120093 Dresden, Germany, Feb. 6-10, 2012 Source: CATT Title: UL power control with multiple timing advances in Rel-11.
3GPP TSG RAN WG1 Meeting #68 R1-120123 Dresden, Germany, Feb. 6-10, 2012 Source: Huawei, HiSilicon Title: Discussion on UL control signalling transmission with multiple TAs.
3GPP TSG-RAN WG1 Meeting #68 R1-120130 Dresden, Germany, Feb. 6-10, 2012 Source: InterDigital Communications, LLC Title: Simultaneous UL transmissions in presence of R11 Multiple TA.
3GPP TSG-RAN WG1 Meeting #68 R1-120221 Dresden, Germany, Feb. 6-10, 2012 Source: Panasonic Title: Simultaneous transmissions in multiple TA.
3GPP TSG RAN WG1 Meeting #68 R1-120286 Dresden, Germany, Feb. 6-10, 2012 Source: ZTE Title: Consideration on issues related to multiple TA.
3GPP TSG RAN WG1 Meeting #68 R1-120317 Dresden, Germany, Feb. 6-10, 2012 Source: Pantech Title: Issues on parallel transmission in multiple TA environments.
Jul. 29, 2020—European Office Action—EP 17153540.4.
U.S. Appl. No. 61/554,493, Joonkui Ahn, "Method of Multiple Channel Transmission for Multiple Timing—Advance", Nov. 1, 2011 (Section 3.1-3.1.1, pp. 22-25) (Year: 2011).
Jun. 17, 2021—European Search Report—EP 20212147.1.
Y. Zhang and F. Chen, "Interference between Sounding Reference Signal and Random Access Preamble Based on LTE Uplink," 2009 WASE International Conference on Information Engineering, Taiyuan, China, 2009, pp. 286-289 (Year:2009).
3GPP TSG-RAN WG2 Meeting #76, R2-115758 San Francisco, USA, Nov. 14-18, 2011; Source: ZTE, Title: "Pathloss and DL timing reference for MTA".
3GPP TSG-RAN WG2 Meeting #72, R2-106856, Jacksonville, USA; Nov. 15-19, 2010; Source: Rapporteur (Samsung), Title: "Introduction of Carrier Aggregation and UL/DL MIMO".
3GPP TS 36.321, V10.4.0, Dec. 20, 2011 "3rd Generation Partnership Project; Technical Specification Group Radio Access Network; Evolved Universal Terrestrial Radio Access (E-UTRA); Medium Access Control (MAC) protocol specification (Release 10)",3GPP Standard.
Jan. 11, 2022—European Search Report—EP 21191532.7.
3GPP TSG RAN WG2 Meeting #77 R2-120129, Feb. 6-10, 2012, Dresden, Germany Source: Renesas Mobile Europe Title: Design of TA command for multiple timing advances.
Jul. 4, 2022—EP Search Report—EP App. No. 21193754.5.
Aug. 2, 2022—EP Office Action—EP App. No. 15165499.3.
U.S. Appl. No. 61/532,116, "Method for Handling Random Access Channel Procedure on a SCell When PCell TA Timer Expires", 2011.
3GPP TSG-RAN WG2 Meeting #75, R2-113784, Athens, Greece, Aug. 22-26, 2011; Title: "Time Alignment for multiple TA".
3GPP TSG-RAN WG2 Meeting #75, R2-113829, Athens, Greece, Aug. 22-26, 2011; Title: "Random Access procedure for multiple TA".
3GPP TSG RAN WG2 Meeting #76, R2-115791 San Francisco, USA, Nov. 14-18, 2011 Source: CATT Title: Signaling for TAG configuration.
3GPP TSG-RAN WG2 Meeting #74 R2-113014 Barcelona, Spain, May 9-13, 2011 Source: Renesas Mobile Europe Title: Multiple timing advance using multiple RACH.
3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.
3GPP TSG-RAN WG2 Meeting #72bis, Tdoc R2-110356 Dublin, Ireland, Jan. 17-21, 2011 Source: ITRI Title: RF Receiver Information in UE Capability Signalling.
3GPP TSG RAN WG2 Meeting #77bis R2-121140 Jeju, Korea, Mar. 26-30, 2012 Source: CATT Title: Consideration on Multi-TA Capability.
3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.
3GPP TSG-RAN WG2 #74 Tdoc R2-113258 Barcelona, Spain, May 9-13, 2011 Source: InterDigital Communications Title: Support for RACH on SCells in LTE CA.
3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TSG RAN WG1 Meeting #67 R1-113727 San Francisco, USA, Nov. 14-18, 2011 Source: CATT Title: Support of multiple timing advances in LTE-A Rel-11 with CA.
3GPP TSG RAN WG1 Meeting #67 R1-113961 San Francisco, USA, Nov. 14-18, 2011 Title: RACH Procedure for Multiple Timing Advances Source: Research in Motion, UK Limited.
3GPP TSG RAN WG1 #67 R1-113975 San Francisco, USA, Nov. 14-18, 2011 Source: LG Electronics Title: RAN1 issues in supporting multiple timing advances.
3GPP TSG RAN WG2 Meeting #76 R2-115789 San Francisco, USA, Nov. 14 -18, 2011 Source: CATT Title: CBRA on SCell.
3GPP TSG-RAN WG2 Meeting #76 R2-115804 San Francisco, USA, Nov. 14-18, 2011 Source: Nokia Siemens Networks, Nokia Corporation Title: RA procedure on SCell.
3GPP TSG-RAN WG2 Meeting #76 R2-115817 San Francisco, USA, Nov. 14-18, 2011 Source: Potevio Title: Considerations on CBRA on SCell and Msg2 for SCell RA.
3GPP TSG-RAN WG2 Meeting #76 R2-116310 San Francisco, USA, Nov. 14-18, 2011 Source: Fujitsu Title: Remaining issues on SCell RA procedure.

(56) References Cited

OTHER PUBLICATIONS

3GPP TS 36.211 V10.0.0 (Dec. 2010), 3rd Generation Partnership Project; Technical Specification Group Radio Access Network; Evolved Universal Terrestrial Radio Access (E-UTRA); Physical channels and modulation (Release 10).
3GPP TSG-RAN WG2 Meeting #77 R2-120076 Dresden, Germany, Feb. 6-10, 2012 Source: ASUSTek Title: Further consideration on timing reference for sTAG.
3GPP TSG-RAN WG2 Meeting #77 R2-120086 Dresden, Germany, Feb. 6-10, 2012 Source: Nokia Siemens Networks, Nokia Corporation Title: Timing Reference for sTAG.
3GPP TSG-RAN WG2 Meeting #77 R2-120087 Dresden, Germany, Feb. 6-10, 2012 Source: NSN Title: [Draft] LS on timing reference for sTAG.
3GPP TSG-RAN WG2 Meeting #77 R2-120088 Dresden, Germany, Feb. 6-10, 2012 Source: Nokia Siemens Networks, Nokia Corporation Title: Pathloss Reference for sTAG.
3GPP TSG-RAN WG2 Meeting #77 R2-120127 Dresden, Germany, Feb. 6-10, 2012 Source: Renesas Mobile Europe Title: Further analysis on timing reference for sTAG.
3GPP TSG-RAN WG2 Meeting #77 Tdoc R2-120166 Feb. 6-10, 2012, Dresden, Germany Source: ITRI Title: Deactivation of DL Timing Reference in sTAG.
3GPP TSG RAN WG2 #77 R2-120168 Dresden, Germany, Feb. 6-10, 2012 Source: ITRI Title: Consideration on FFS of pathloss reference configuration.
3GPP TSG-RAN2 #77 meeting Tdoc R2-120221 Dresden, Germany, Feb. 6-10, 2012 Source: MediaTek Title: Discussion on timing reference in sTAG.
3GPP TSG RAN WG2 Meeting #77 R2-120252 Dresden, Germany, Feb. 6-10, 2012 Source: CATT Title: Timing Reference Change.
3GPP TSG-RAN WG2 #77 R2-120264 Feb. 6-10, 2012, Dresden, Germany Source: Intel Corporation Title: Remaining open issues on timing and pathloss reference for sTAG.
TSG-RAN WG2#77 R2-120604 Dresden, Germany, Feb. 6-10, 2012 Title: Pathloss reference for SCell TA group and need of RLM Source: Alcatel-Lucent, Alcatel-Lucent Shanghai Bell.
TSG-RAN WG2#77 R2-120605 Feb. 6-10, 2012, Dresden, Germany Title: Timing reference for SCell TA group Source: Alcatel-Lucent, Alcatel-Lucent Shanghai Bell.
3GPP TSG RAN WG2 Meeting #77 R2-120799 Dresden, Germany, Feb. 6-10, 2012 Source: CATT Title: Timing Reference Change.
3GPP TSG-RAN WG2 #77 R2-120821 Feb. 6-10, 2012, Dresden, Germany Source: Intel Corporation Title: Remaining open issues on timing and pathloss reference for sTAG.
3GPP TSG-RAN WG2 meeting #77bis R2-121178 Jeju, South Korea, Mar. 26-30, 2012 Source: Qualcomm Incorporated Title: Timing reference cell for secondary TA group.
3GPP TSG-RAN WG2 Meeting #77bis R2-121182 Jeju, South Korea, Mar. 26-30, 2012 (Resubmission of R2-120088) Source: Nokia Siemens Networks, Nokia Corporation Title: Pathloss Reference for sTAG.
3GPP TSG RAN WG2 Meeting #77bis R2-121192 Jeju, Korea, Mar. 26-30, 2012 Source: New Postcom Title: Pathloss reference and RLM on SCell.
3GPP TSG-RAN WG2 Meeting #77bis R2-121230 Mar. 26-30, 2012, Jeju, Korea (update of R2-120247) Source: Panasonic Title: Handling loss of Timing/ Pathloss Reference Cell.
3GPP TSG-RAN WG2 Meeting #77Bis R2-121241 Jeju Island, Korea, Mar. 26-30, 2012 Source: ZTE Corporation Title: Pathloss and RLM for MTA.
3GPP TSG RAN WG2 Meeting #77bis R2-121307 Jeju, South Korea, Mar. 26-30, 2012 Source: Pantech Title: Deactivation of Timing Reference Cell.
3GPP TSG-RAN2 #77bis Meeting R2-121338 Jeju, Korea, Mar. 26-30, 2012 Source: MediaTek Inc. Title: Error case for timing reference.
3GPP TSG-RAN WG2 Meeting #77bis R2-121366 Jeju, South Korea, Mar. 26-30, 2012 Source: LG Electronics Inc. Title: Handling of the Timing Reference SCell Deactivation.
3GPP TSG RAN WG2#77bis R2-121398 Jeju Island, Korea, Mar. 26-30, 2012 Source: Samsung Title: Whether to allow configurable pathloss reference in sTAG ?.
3GPP TSG-RAN WG2 Meeting #77bis R2-121403 Jeju, Korea, Mar. 26-30, 2012 Source: Renesas Mobile Europe Title: Discussion on error case handling of the timing reference of sTAG.
3GPP TSG-RAN WG2 Meeting #77bis R2-121428 Jeju, Korea, Mar. 26-30, 2012 Source: Huawei, HiSilicon Title: Pathloss reference for sTAG.
3GPP TSG RAN WG2 Meeting #77bis R2-121493 Jeju, South Korea, Mar. 26-30, 2012 Source: New Postcom Title: Considerations on Downlink Timing reference in sTAG.
3GPP TSG RAN WG2 #77 bis R2-121528 Jeju, Korea, Mar. 26-30, 2012 revised from R2-120168 Source: ITRI Title: Pathloss reference configuration.
3GPP TSG-RAN WG2 Meeting #77bis Tdoc R2-121530 Mar. 26-30, 2012, Jeju, Korea Source: ITRI Title: Deactivation of Timing Reference SCell in sTAG.
3GPP TSG-RAN WG2 #77bis Tdoc R2-121557 Jeju, Korea, Mar. 26-30, 2012 Source: Ericsson Title: Summary of e-mail discussion [77#26] LTE: CA: Timing reference for SCell-only TA groups.
3GPP TSG-RAN WG2 #77bis Tdoc R2-121559 Jeju, South Korea, Mar. 26-30, 2012 Source: Ericsson, ST Ericsson Title: Timing reference for SCells.
TSG-RAN WG2#77bis R2-121690 Mar. 26-30, 2012 Jeju, Korea Title: Timing reference for SCell TA group Source: Alcatel-Lucent, Alcatel-Lucent Shanghai Bell.
3GPP TSG-RAN WG2 Meeting #77bis R2-121713 Jeju, Korea, Mar. 26-30, 2012 Source: Potevio Title: Considerations on timing reference change for sTAG.
3GPP TSG RAN WG2 #77bis R2-121724 Jeju, Korea, Mar. 26-30, 2012 Source: Intel Corporation Title: Remaining issues on timing reference for sTAG.

* cited by examiner (a)

(b)

MULTICARRIER SIGNAL TRANSMISSION IN WIRELESS COMMUNICATIONS

CROSS-REFERENCE TO RELATED APPLICATIONS

This application is a continuation of and claims priority to U.S. patent application Ser. No. 16/105,171 filed on Aug. 20, 2018, which is a continuation of U.S. patent application Ser. No. 15/682,025 filed on Aug. 21, 2017 (now U.S. Pat. No. 10,085,288), which is a continuation of U.S. patent application Ser. No. 14/929,410 filed on Nov. 1, 2015 (now U.S. Pat. No. 9,743,431), which is a continuation of U.S. patent application Ser. No. 14/552,005 filed on Nov. 24, 2014 (now U.S. Pat. No. 9,179,454), which is a continuation of U.S. patent application Ser. No. 13/750,954 filed on Jan. 25, 2013 (now U.S. Pat. No. 8,897,248), which claims the benefit of U.S. Provisional Application No. 61/625,078 filed on Apr. 16, 2012, U.S. Provisional Application No. 61/618,830 filed on Apr. 1, 2012, and U.S. Provisional Application No. 61/590,366 filed on Jan. 25, 2012, each of which is hereby incorporated by reference in its entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable operation of multiple timing advance groups. Embodiments of the technology disclosed herein may be employed in the technical field of multicarrier communication systems. More particularly, the embodiments of the technology disclosed herein may relate to operation of multiple timing advance groups.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
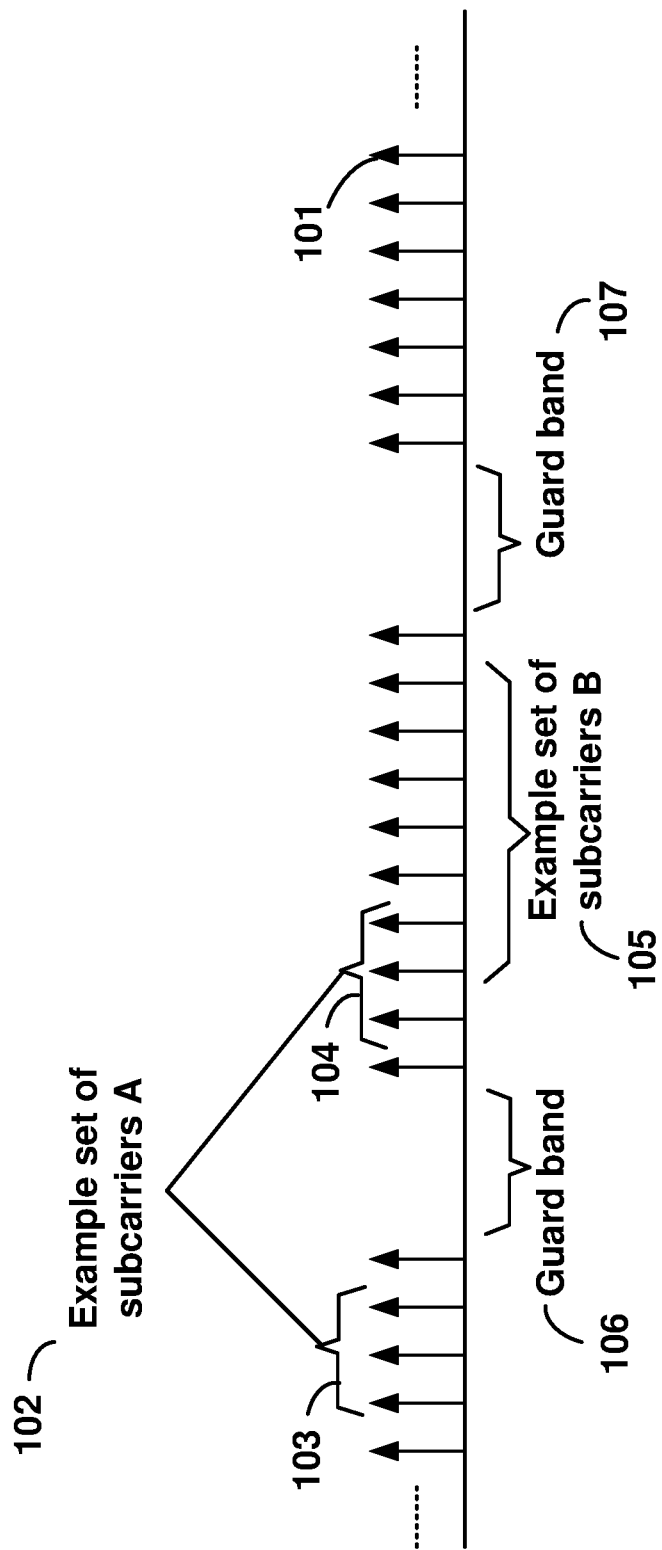
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
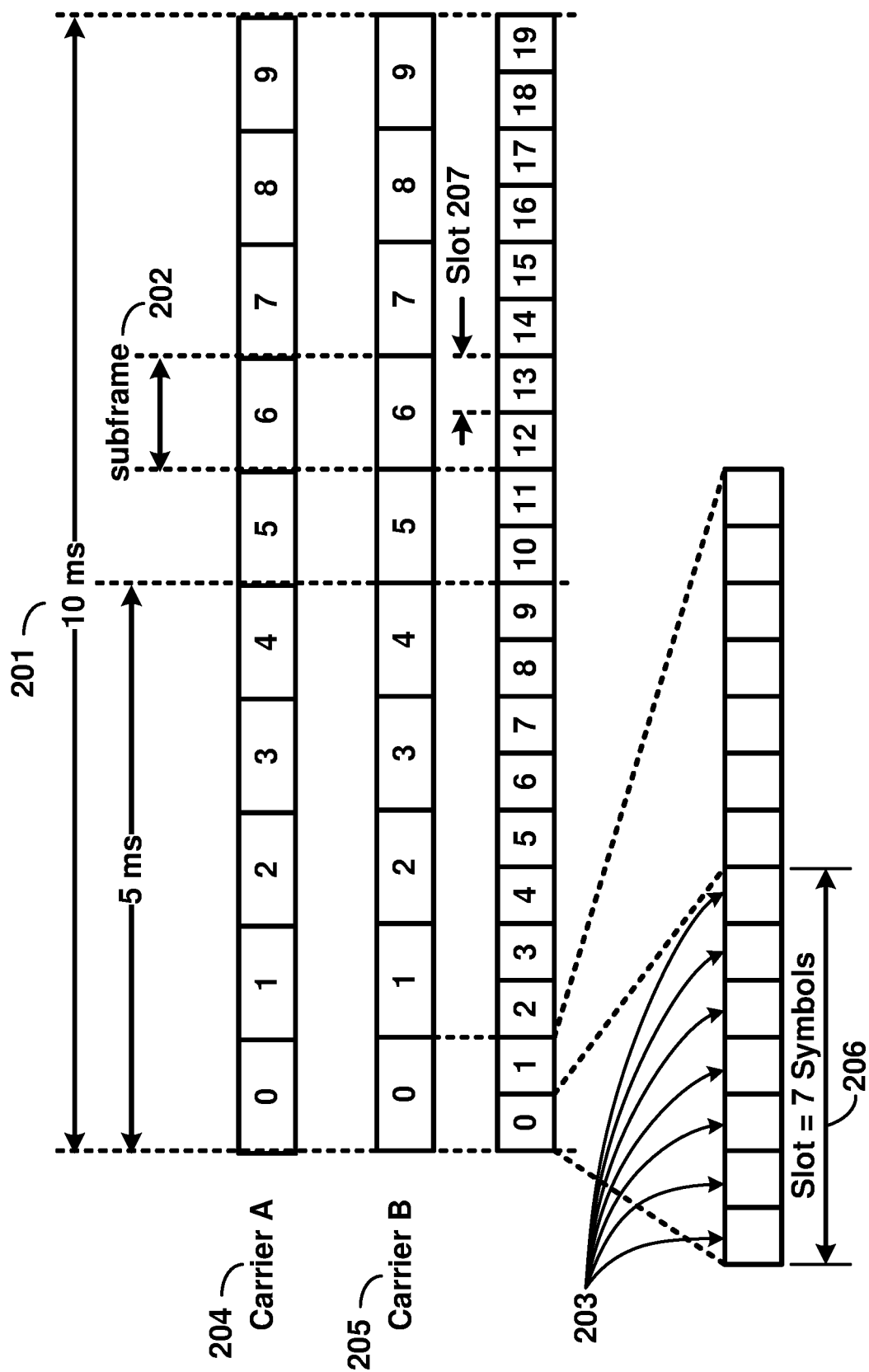
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized sub-frames 202. Other subframe durations such as including 0.5 msec, 1 msec, 2 msec, and 5 msec may also be supported. Sub-frame(s) may consist of two or more slots 206. For the example of FDD, 10 subframes may be available for downlink transmission and 10 subframes may be available for uplink transmissions in each 10 msec interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
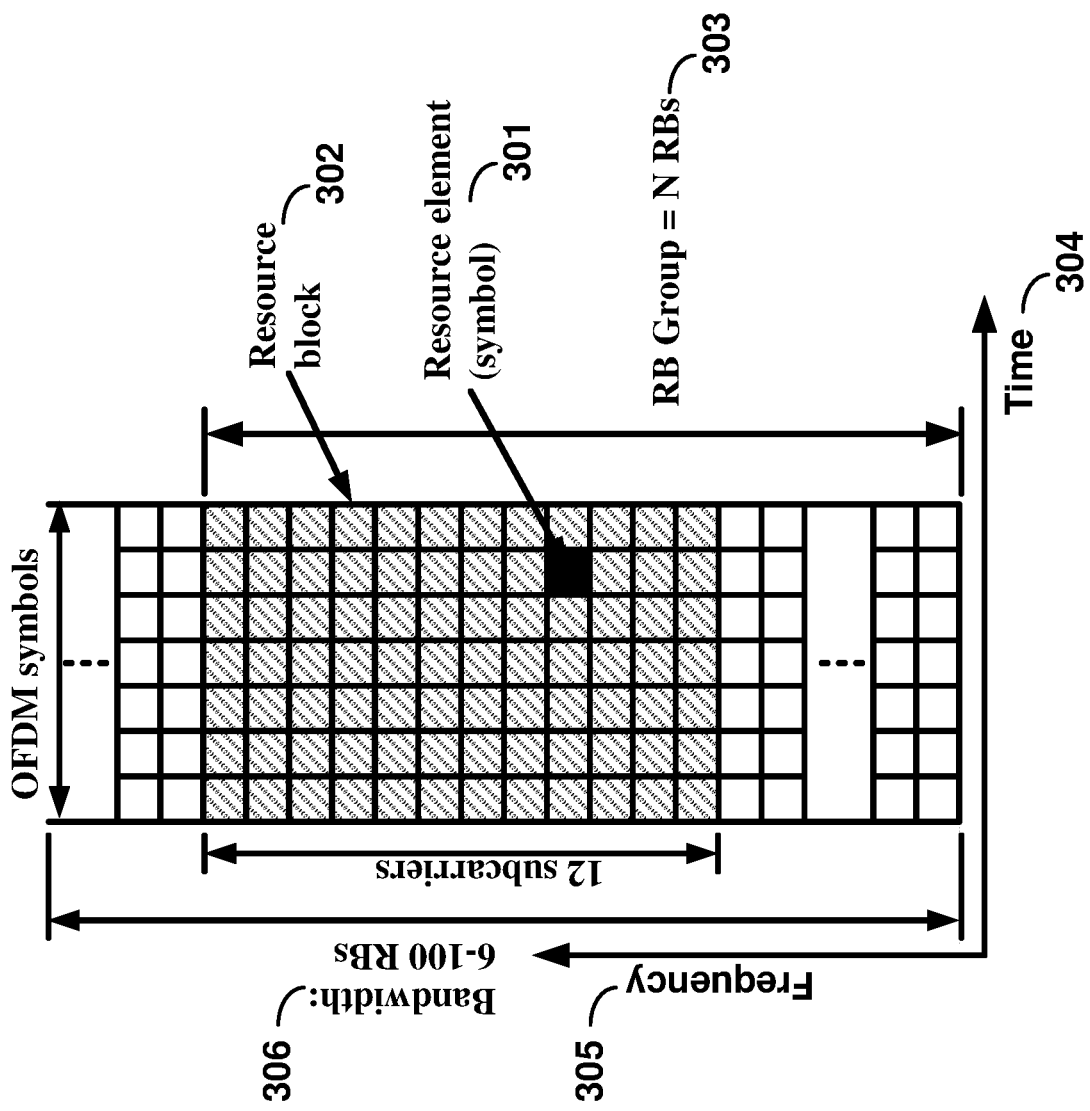
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RB s) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 kHz subcarrier bandwidth and 12 subcarriers).

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
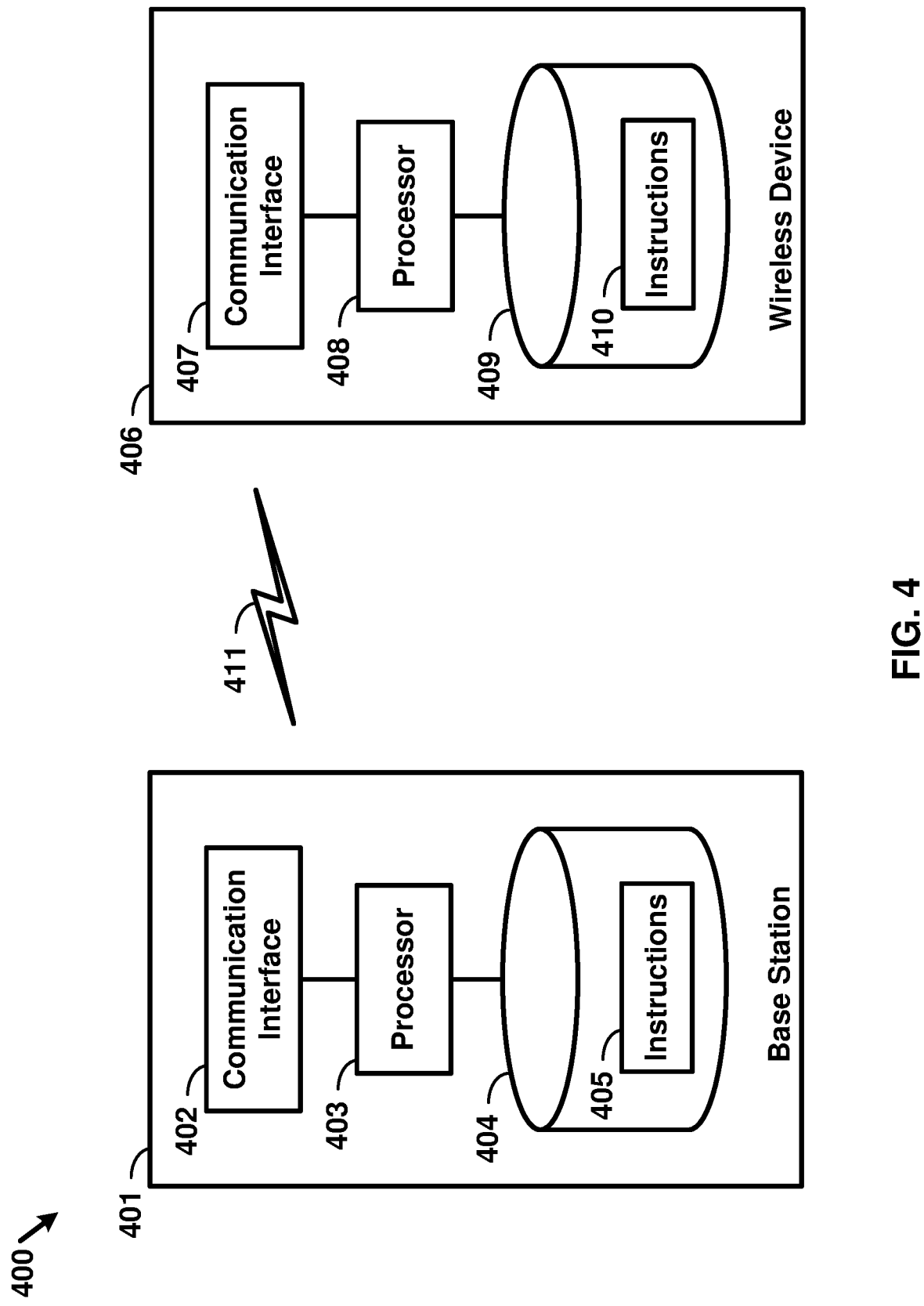
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated in FIG. 1, FIG. 2, and FIG. 3, and associated text.

Figure 5:
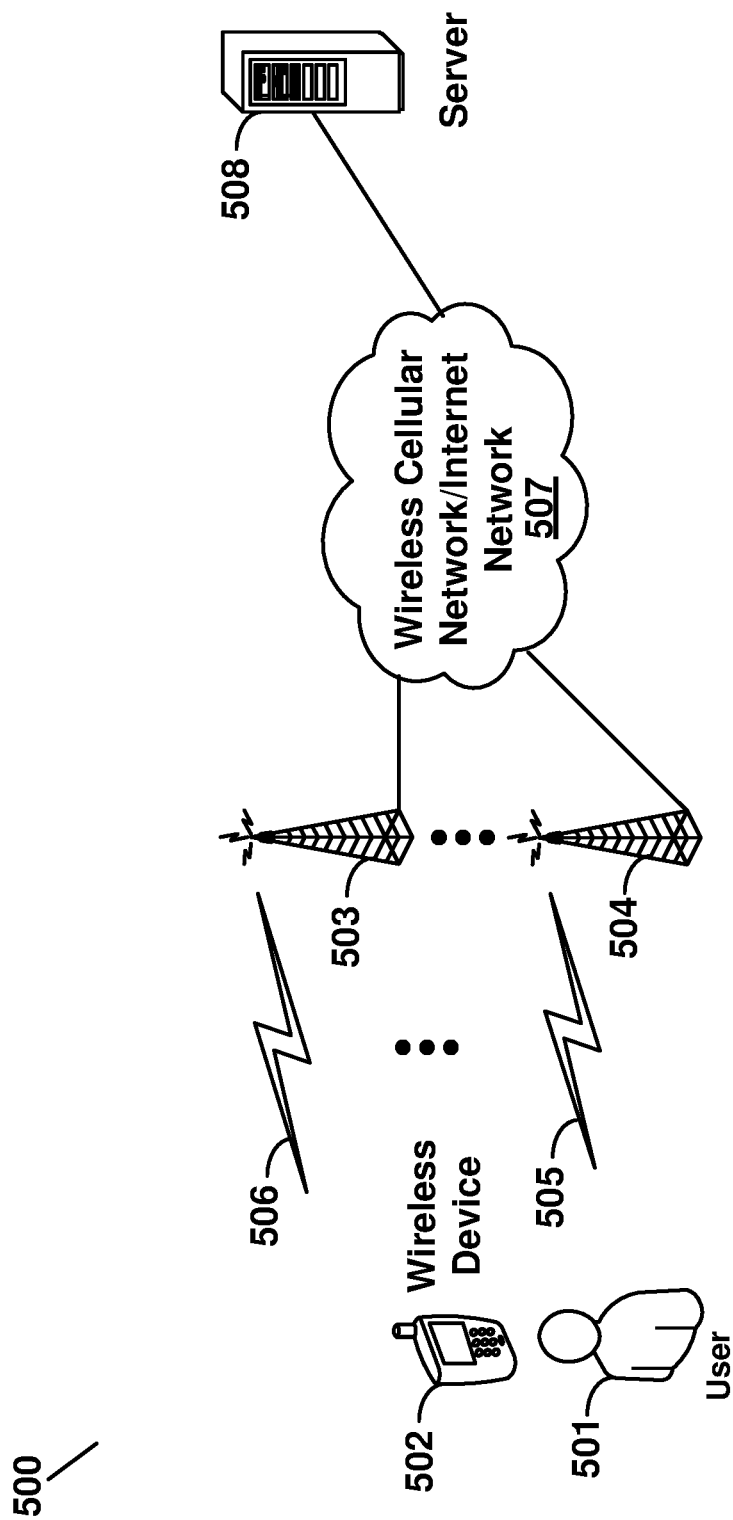
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Figure 6:
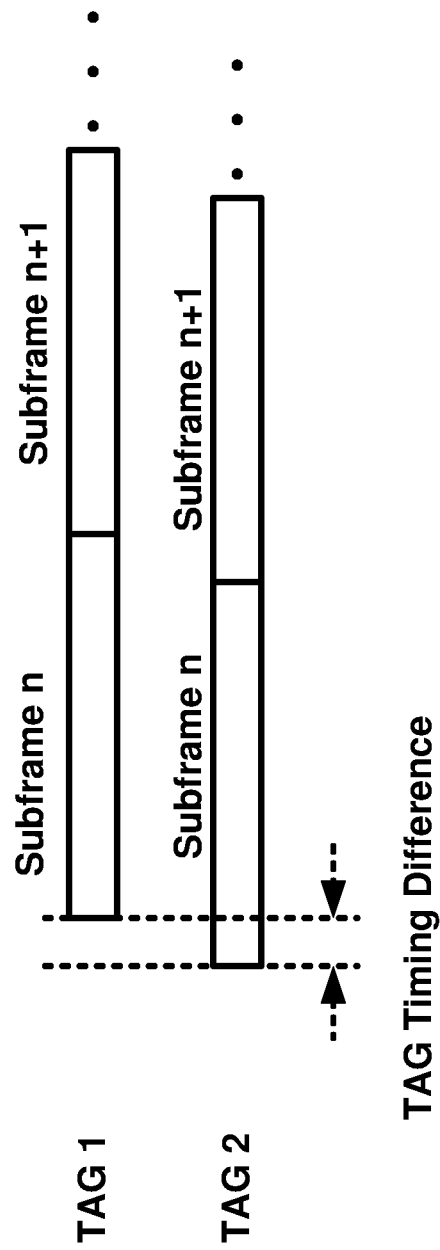
FIG. 6 is a diagram depicting uplink transmission timing of one or more cells in a first timing advance group (TAG) and a second TAG as per an aspect of an embodiment of the present invention.

FIG. 6 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 6 may be the difference in UE uplink transmission timing for uplink carriers in TAG1 and TAG2. The timing difference may range between, for example, sub micro-seconds to about 30 micro-seconds.

Example embodiments of the invention may enable operation of multiple timing advance groups. Other example embodiments may comprise a non-transitory tangible computer readable media comprising instructions executable by one or more processors to cause operation of multiple timing advance groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multiple timing advance groups. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, serving cells having an uplink to which the same time alignment (TA) applies may be grouped in a TA group (TAG). Serving cells in one TAG may use the same timing reference. For a given TAG, a user equipment (UE) may use one downlink carrier as the timing reference at a given time. The UE may use a downlink carrier in a TAG as the timing reference for that TAG. For a given TAG, a UE may synchronize uplink subframe and frame transmission timing of the uplink carriers belonging to the same TAG. According to some of the various aspects of embodiments, serving cells having an uplink to which the same TA applies may correspond to the serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. In this disclosure, timing advance group, time alignment group, and cell group have the same meaning. Further, time alignment command and timing advance command have the same meaning.

FIG. 6 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 6 may be the difference in UE uplink transmission timing for uplink carriers in TAG1 and TAG2. The timing difference may range between, for example, sub micro-seconds to about 30 micro-seconds.

Figure 8:
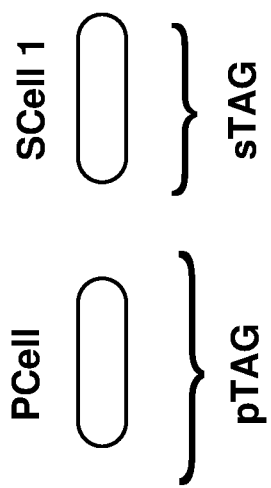
FIG. 8 shows example TAG configurations as per an aspect of an embodiment of the present invention.
Figure 8:
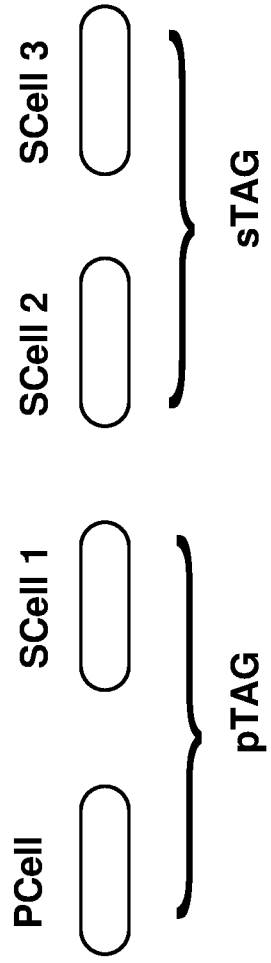
Figure 8:
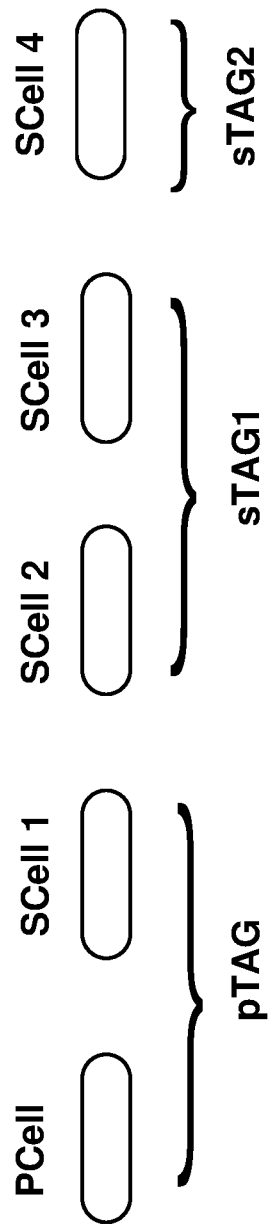

FIG. 8 shows example TAG configurations as per an aspect of an embodiment of the present invention. In Example 1, pTAG include PCell, and sTAG includes SCell1. In Example 2, pTAG includes PCell and SCell1, and sTAG includes SCell2 and SCell3. In Example 3, pTAG includes PCell and SCell1, and sTAG1 includes SCell2 and SCell3, and sTAG2 includes SCell4. Up to four TAGs may be supported and other example TAG configurations may also be provided. In many examples of this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and the timing reference for pTAG may follow LTE release 10 principles. The UE may need to measure downlink pathloss to calculate the uplink transmit power. The pathloss reference may be used for uplink power control and/or transmission of random access preamble(s). A UE may measure downlink pathloss using the signals received on the pathloss reference cell. The pathloss reference downlink cell and the corresponding uplink cell may be configured to be in the same frequency band due to the required accuracy of pathloss estimation. For SCell(s) in a pTAG, the choice of pathloss reference for cells may be selected from and be limited to the following two options: a) the downlink SCell linked to an uplink SCell using the system information block 2 (SIB2), and b) the downlink PCell. The pathloss reference for SCells in pTAG may be configurable using RRC message(s) as a part of SCell initial configuration and/or reconfiguration. According to some of the various aspects of embodiments, PhysicalConfigDedicatedSCell information element (IE) of an SCell configuration may include the pathloss reference SCell (downlink carrier) for an SCell in pTAG.

The downlink SCell linked to an uplink SCell using the system information block 2 (SIB2) may be referred to as the SIB2 linked downlink of the SCell. Different TAGs may operate in different bands. In another example, the signals in different TAGs may travel through different repeaters, or the signal of one SCell in an sTAG may travel through a repeater while the signal of another TAG may not go through the repeater. Having flexibility in SCell pathloss reference configuration for SCells belonging to an sTAG may result in pathloss estimation errors due to mobility of wireless device. The wireless device may autonomously change a timing reference SCell in an sTAG, but changing pathloss reference autonomously may result in confusion in the serving eNB, specially that different cells may have different transmit power. Therefore, both eNB configuration flexibility and autonomous UE pathloss selection for an SCell in sTAG may result in errors in pathloss estimation. For an uplink carrier in an sTAG, the pathloss reference may be only configurable to the downlink SCell linked to an uplink SCell using the system information block 2 (SIB2) of the SCell. No other downlink carrier may be configured as the pathloss reference for an SCell in an sTAG. This configuration may introduce accuracy in pathloss estimation.

According to some of the various aspects of embodiments, a UE may successfully complete a random access procedure from the reception of a random access response (RAR) message within the random access (RA) response window using a random access radio network temporary identifier (RA-RNTI). The UE may decode scheduling information for uplink transmission in the PDCCH common search space (CSS) with RA-RNTI. According to some of the various aspects of embodiments, in addition to the time alignment command (TAC) field, RAR for a PCell and/or SCell may contain at least one of the following: a Random Access Preamble Identifier (RAPID), a UL grant, a Temporary C-RNTI, a Backoff Indicator (BI), and/or the like. RAPID may be used to confirm the association between RAR and the transmitted preamble. The UL grant may be employed for uplink transmission on the cell that the preamble was transmitted. Temporary C-RNTI may be used for contention resolution in case of contention based random access (CBRA). A backoff Indicator (BI) may be used in case of collisions and/or high load on PRACH.

To obtain initial uplink (UL) time alignment for an sTAG, eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. TAT for TAGs may be configured with different values. When the TAT associated with the pTAG expires: all TATs may be considered as expired, the UE may flush all HARQ buffers of all serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with sTAG expires: a) SRS transmissions may be stopped on the corresponding SCells, b) SRS RRC configuration may be released, c) CSI reporting configuration for the corresponding SCells may be maintained, and/or d) the MAC in the UE may flush the uplink HARQ buffers of the corresponding SCells.

Upon deactivation of the last SCell in an sTAG, the UE may not stop TAT of the sTAG. In an implementation, upon removal of the last SCell in an sTAG, TAT of the TA group may not be running. RA procedures in parallel may not be supported for a UE. If a new RA procedure is requested (either by UE or network) while another RA procedure is already ongoing, it may be up to the UE implementation whether to continue with the ongoing procedure or start with the new procedure. The eNB may initiate the RA procedure via a PDCCH order for an activated SCell. This PDCCH order may be sent on the scheduling cell of this SCell. When cross carrier scheduling is configured for a cell, the scheduling cell may be different than the cell that is employed for preamble transmission, and the PDCCH order may include the SCell index. At least a non-contention based RA procedure may be supported for SCell(s) assigned to sTAG(s). Upon new UL data arrival, the UE may not trigger an RA procedure on an SCell. PDCCH order for preamble transmission may be sent on a different serving cell than the SCell in which the preamble is sent. TA grouping may be performed without requiring any additional UE assisted information.

Figure 7:
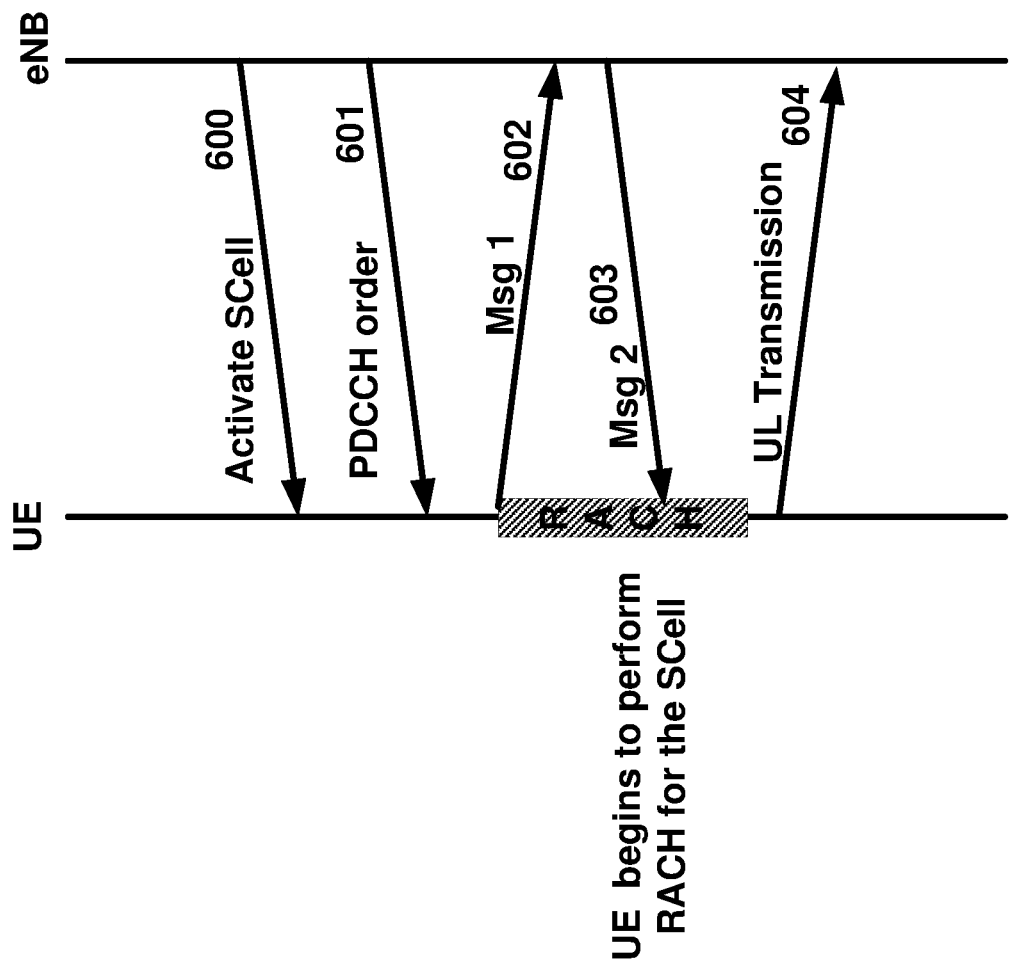
FIG. 7 is an example message flow in a random access process in a secondary TAG as per an aspect of an embodiment of the present invention.

FIG. 7 is an example message flow in a random access process in a secondary TAG as per an aspect of an embodiment of the present invention. eNB transmits an activation command 600 to activate an SCell. A preamble 602 (Msg1) may be sent by a UE in response to the PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on SCell may be addressed to RA-CRNTI in PCell common search space (CSS). Uplink packets 604 may be transmitted on the SCell, in which the preamble was transmitted.

According to some of the various aspects of embodiments, initial timing alignment may be achieved through a random access procedure. This may involve the UE transmitting a random access preamble and the eNB responding to an initial TA command $N_{TA}$ (amount of time alignment) within the random access response window. The start of the random access preamble may be aligned with the start of the corresponding uplink subframe at the UE assuming $N_{TA}=0$. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

PDCCH order may be used to trigger RACH for an activated SCell. For a newly configured SCell or a configured but deactivated SCell, eNB may need to firstly activate the corresponding SCell and then trigger a RA on it. In an example embodiment, with no retransmission of an activation/deactivation command, activation of an SCell may need at least 8 ms, which may be an extra delay for UE to acquire the valid TA value on an SCell compared to the procedure on an already activated SCell. For a newly configured SCell or a deactivated SCell, 8 ms may be required for SCell activation, and at least 6 msec may be required for preamble transmission, and at least 4 ms may be required to receive the random access response. At least 18 ms may be required for a UE to get a valid TA. The possible delay caused by retransmission or other configured parameters may need to be considered (e.g. the possible retransmission of an activation/deactivation command, and/or the time gap between when a RA is triggered and when a preamble is transmitted (equal or larger than 6 msec)). The RAR may be transmitted within the RAR window (for example, 2 msec, 10 msec, 50 msec), and possible retransmission of the preamble may be considered. The delay for such a case may be more than 20 msec or even 30 msec if retransmissions are considered.

A base station may communicate with a mix of wireless devices. Wireless devices may support multiple technologies, or multiple releases of the same technology, have some specific capability depending on the wireless device category and/or capability. A base station may comprise multiple sectors. When this disclosure refers to a base station communicating with a plurality of wireless devices, this disclosure may refer to a subset of the total wireless devices in the coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in the coverage area, which perform according to the disclosed methods, and/or the like. There may be many wireless devices in the coverage area that may not comply with the disclosed methods, for example, because those wireless devices perform based on older releases of LTE technology. A time alignment command MAC control element may be a unicast MAC command transmitted to a wireless device. A wireless device may receive its own time alignment commands.

According to some of the various aspects of various embodiments, the base station or wireless device may group cells into a plurality of cell groups. The term "cell group" may refer to a timing advance group (TAG) or a timing alignment group or a time alignment group. A cell group may include at least one cell. A MAC TA command may correspond to a TAG. A group may explicitly or implicitly be identified by a TAG index. Cells in the same band may belong to the same cell group. A first cell's frame timing may be tied to a second cell's frame timing in a TAG. When a time alignment command is received for the second cell, the frame timing of both first cell and second cell may be adjusted. Base station(s) may provide TAG configuration information to the wireless device(s) by RRC configuration message(s).

According to some of the various aspects of some embodiments, the number of time alignment commands transmitted by the base station to a wireless device in a given period may depend, at least in part, on many parameters including at least one of: a) the speed that the wireless device moves in the coverage area, b) the direction that the wireless device moves in the coverage area, c) the coverage radius, and/or d) the number of active wireless devices in the coverage area. A base station may transmit at least two types of time alignment commands. A first type command may be transmitted to a first category of wireless devices. The first category may include devices compatible with at least release 8, 9, or 10 of the LTE standard. A second type command may be transmitted to a second category of devices. The second category may include devices with multi-time alignment group (MTG) capability and compatible with release 11 or beyond of the LTE standard. The time alignment may be transmitted to wireless devices that are in connected mode and are applicable to active cells.

A UE may transmit a Scheduling Request (SR) and/or a buffer status report (BSR) due to uplink data arrival in the UE. A UE may transmit a scheduling request on PUCCH when the UE has data for uplink transmission and UE do not have uplink grants for transmission of a buffer status report. The UE may receive uplink grant in response to a SR. A base station scheduler may also provide an uplink grant to a UE for some other reasons, for example, based on a previous BSR. The UE may transmit a MAC BSR in the uplink resources identified in an uplink grant to inform the base station about the size of the uplink transmission buffer(s). A UE BSR may be transmitted in an uplink resource identified in a received uplink grant. BSR indicates the amount of data in one or more logical channel buffers. Base station may determine the radio resources required for the UE in the uplink employing the received BSR and other parameters, e.g. link quality, interference, UE category, and/or the like. If the base station determines that radio resources of a first SCell which is uplink unsynchronized is required (the SCell may be in-active or may not be even configured yet), the base station may trigger an sTAG sync process to uplink synchronize the sTAG and the first SCell associated with the sTAG. The SCell should be in configured (e.g. using RRC messages) and be in active state (e.g. using MAC activate commands). An SCell is considered out-of-sync if it belongs to or will belong to (after RRC configuration) to an out-of-sync sTAG.

The sTAG sync process may also selectively be started by the base station if a GBR bit rate bearer with required uplink resources has been established. The base station may determine the radio resources required for the UE in the uplink employing the received bit rate, QoS and priority requirements of the GBR bearer and other parameters, e.g. link quality, interference, UE category, and/or the like. If the base station determines that radio resources of a first SCell which is uplink unsynchronized is required (the SCell may be in-active or may not be even configured yet), the base station may trigger an sTAG sync process to uplink synchronize the sTAG and the first SCell associated with the sTAG. The SCell should be in configured (e.g. using RRC messages) and be in active state (e.g. using MAC activate commands) before uplink transmission starts.

eNB may select to synchronize the sTAG and then activate/configure the SCell. eNB may select to first configure/activate SCell and then to uplink synchronize it. For example, if an SCell is added and assigned to a synchronized sTAG, it will be synchronize upon its (re)configuration/addition. In another example, the SCell may be configured, then the sTAG may be synchronized using another SCell in the sTAG, and then the SCell may be activated. In another example, the SCell may be configured/activated, and then sTAG synchronization may start. Different embodiments with different orders in tasks may be implemented. Random access process for an SCell can only be initiated on configured and active SCells assigned to an sTAG.

In an example embodiment, in the sTAG sync process the base station may trigger random access preamble transmission on an SCell of the sTAG that the SCell belongs, or on the first SCell in which its uplink resources are required. In this example, the first SCell belongs to an sTAG which is uplink out-of-sync. In response to receiving a BSR and/or GBR bearer establishment, the eNB may, selectively and depending on a plurality of criteria, transmit a PDCCH order to the UE and may cause the UE to start a RA procedure on an SCell in the sTAG (in case of carrier aggregation). A PDCCH order may be triggered by the BSR reception due to the UL data arrival in the UE or by the establishment of GBR bearer with uplink resource requirements. Preamble transmission may be triggered in the case of UL data arrival, meaning that preamble transmission may be triggered by the BSR reception in the eNB and/or establishment of a non GBR bearer with uplink data. Upon new UL data arrival, the UE may not trigger an RA procedure on an SCell. The eNB may, selectively, trigger the RA procedure based on the BSR reception due to UL data arrival in the UE. eNB may consider many parameters in triggering an RA on an SCell. For example, parameters may include current eNB load, UE buffer size(s) in BSR report(s), UE category, UE capability, QoS requirements, GBR bearer requirements and/or the like. UE may determine that radio resources of the out-of-sync SCell may be required for uplink data transmission.

In a second embodiment, in the sTAG sync process base station may transmit a MAC timing advance command with a TAG index of the out-of-sync sTAG. The UE may use an stored value of N_TA for the out of sync sTAG and apply the timing advance value in the MAC timing advance command to the stored N_TA of the sTAG. A UE may store or maintains N_TA (current timing advance value of an sTAG) upon expiry of associated time Alignment Timer of the sTAG. The UE may apply the received timing advance command MAC control element and starts associated time Alignment Timer. This process may practically put the sTAG in an in-sync state. The base station may transmit one or more MAC timing advance commands upon receiving uplink packets from the UE on the sTAG to align UE uplink transmissions in the sTAG. It is up to eNB to select the first or second embodiment for synchronizing the uplink of first SCell. For example, the eNB may operate in the second embodiment, if the SCell has not been in-sync for a long time, or the sTAG has not been in-Sync since it has been configured. In another example, the eNB may operate in the first embodiment if the sTAG has recently entered an out-of-sync state. In another example, the eNB may operate in the second embodiment if the eNB-UE distance is relatively short, for example in the range of tens or hundreds of meters.

The mapping of a serving cell to a TAG may be configured by the serving eNB with RRC signaling. The mechanism for TAG configuration and reconfiguration may be based on RRC signalling. When needed, the mapping between an SCell and a TA group may be reconfigured with RRC signaling. In an example implementation, the mapping between an SCell and a TAG may not be reconfigured with RRC while the SCell is configured. For example if there is a need to move an SCell from an sTAG to a pTAG, at least one RRC message, for example, at least one RRC reconfiguration message, may be send to the UE to reconfigure TAG configurations. The PCell may not change its TA group and may always be a member of the pTAG.

According to some of the various aspects of embodiments, when an eNB performs SCell addition configuration, the related TAG configuration may be configured for the SCell. In an example embodiment, eNB may modify the TAG configuration of an SCell by removing (releasing) the SCell and adding a new SCell (with the same physical cell ID and frequency) with an updated TAG ID. The new SCell with the updated TAG ID may be initially inactive subsequent to joining the updated TAG ID. eNB may activate the updated new SCell and then start scheduling packets on the activated SCell. In an example implementation, it may not be possible to change the TAG associated with an SCell, but rather, the SCell may need to be removed and a new SCell may need to be added with another TAG. This may not require employing mobilityControlInfo in the RRC reconfiguration message.

An eNB may perform initial configuration based on initial configuration parameters received from a network node (for example a management platform), an initial eNB configuration, a UE location, a UE type, UE CSI feedback, UE uplink transmissions (for example, data, SRS, and/or the like), a combination of the above, and/or the like. For example, initial configuration may be based on UE channel state measurements. For example, depending on the signal strength received from a UE on various SCells downlink carrier or by determination of UE being in a repeater coverage area, or a combination of both, an eNB may determine the initial configuration of sTAGs and membership of SCells to sTAGs.

In an example implementation, the TA value of a serving cell may change, for example due to UE's mobility from a macro-cell to a repeater or an RRH (remote radio head) coverage area. The signal delay for that SCell may become different from the original value and different from other serving cells in the same TAG. In this scenario, eNB may relocate this TA-changed serving cell to another existing TAG. Or alternatively, the eNB may create a new TAG for the SCell based on the updated TA value. The TA value may be derived, for example, through eNB measurement(s) of signal reception timing, a RA mechanism, or other standard or proprietary processes. An eNB may realize that the TA value of a serving cell is no longer consistent with its current TAG. There may be many other scenarios which require eNB to reconfigure TAGs. During reconfiguration, the eNB may need to move the reference SCell belonging to an sTAG to another TAG. In this scenario, the sTAG would require a new reference SCell. In an example embodiment, the UE may select an active SCell in the sTAG as the reference timing SCell.

eNB may consider UE's capability in configuring multiple TAGs for a UE. UE may be configured with a configuration that is compatible with UE capability. Multiple TAG capability may be an optional feature and per band combination Multiple TAG capability may be introduced. UE may transmit its multiple TAG capability to eNB via an RRC message and eNB may consider UE capability in configuring TAG configuration(s).

The purpose of an RRC connection reconfiguration procedure may be to modify an RRC connection, (e.g. to establish, modify and/or release RBs, to perform handover, to setup, modify, and/or release measurements, to add, modify, and/or release SCells). As part of the procedure, NAS dedicated information may be transferred from E-UTRAN to the UE. If the received RRC Connection Reconfiguration message includes the sCellToReleaseList, the UE may perform an SCell release. If the received RRC Connection Reconfiguration message includes the sCellToAddModList, the UE may perform SCell additions or modification.

The parameters related to SCell random access channel may be common to all UEs. For example PRACH configuration (RACH resources, configuration parameters, RAR window) for the SCell may be common to all UEs. RACH resource parameters may include prach-configuration index, and/or prach-frequency offset. SCell RACH common configuration parameters may also include power: power ramping parameter(s) for preamble transmission; and max number of preamble transmission parameter. It is more efficient to use common parameters for RACH configuration, since different UEs will share the same random access channel. Using dedicated parameters for SCell RACH configuration is not preferred since it will increase the size of the radio resources required for random access process, and may reduce spectral efficiency.

eNB may transmit at least one RRC message to configure PCell, SCell(s) and RACH, and TAG configuration parameters. MAC-MainConfig may include a timeAlignmentTimerDedicated IE to indicate time alignment timer value for the pTAG. MAC-MainConfig may further include an IE including a sequence of at least one (sTAG ID, and TAT value) to configure time alignment timer values for sTAGs. In an example, a first RRC message may configure TAT value for pTAG, a second RRC message may configure TAT value for sTAG1, and a third RRC message may configure TAT value for sTAG2. There is no need to include all the TAT configurations in a single RRC message. In an example embodiment they may be included in one or two RRC messages. The IE including a sequence of at least one (sTAG ID, and TAT) value may also be used to update the TAT value of an existing sTAG to an updated TAT value. The at least one RRC message may also include sCellToAddModList including at least one SCell configuration parameters. The radioResourceConfigDedicatedSCell (dedicated radio configuration IEs) in sCellToAddModList may include an SCell MAC configuration comprising TAG ID for the corresponding SCell added or modified. The radioResourceConfigDedicatedSCell may also include pathloss reference configuration for an SCell. If TAG ID is not included in SCell configuration, the SCell is assigned to the pTAG. In other word, a TAG ID may not be included in radioResourceConfigDedicatedSCell for SCells assigned to pTAG. The radioResourceConfigCommonSCell (common radio configuration IEs) in sCellToAddModList may include RACH resource configuration parameters, preamble transmission power control parameters, and other preamble transmission parameter(s). At the least one RRC message configures PCell, SCell, RACH resources, and/or SRS transmissions and may assign each SCell to an sTAG (implicitly or explicitly). PCell is always assigned to the pTAG.

According to some of the various aspects of embodiments, a base station may transmit at least one control message to a wireless device in a plurality of wireless devices. The at least one control message is for example, RRC connection reconfiguration message, RRC connection establishment message, RRC connection re-establishment message, and/or other control messages configuring or reconfiguring radio interface, and/or the like. The at least one control message may be configured to cause, in the wireless device, configuration of at least:

a) a plurality of cells. Each cell may comprise a downlink carrier and zero or one uplink carrier. The configuration may assign a cell group index to a cell in the plurality of cells. The cell group index may identify one of a plurality of cell groups. A cell group in the plurality of cell groups may comprise a subset of the plurality of cells. The subset may comprise a reference cell with a reference downlink carrier and a reference uplink carrier. Uplink transmissions by the wireless device in the cell group may employ a synchronization signal transmitted on the reference downlink carrier as timing reference.

b) a plurality of MAC dedicated parameters comprising a sequence of at least one element. An element in the sequence may comprises a time alignment timer value and a secondary time alignment group index. pTAG time alignment timer value may be included as a dedicated IE in MAC main configuration parameter (a dedicated IE). Each time alignment timer value being selected, by the base station, from a finite set of predetermined values. The time alignment timer value in the sequence may be associated with a cell group index that is specified in the same element. In an example embodiment, the element may also comprise the list of cell indexes associated with the time alignment group index.

c) a time alignment timer for each cell group in the plurality of cell groups.

The base station may transmit a plurality of timing advance commands. Each timing advance command may comprise: a time adjustment value, and a cell group index. A time alignment timer may start or may restart when the wireless device receives a timing advance command to adjust uplink transmission timing on a cell group identified by the cell group index. The cell group may be considered out-of-sync, by the wireless device, when the associated time alignment timer expires or is not running. The cell group may be considered in-sync when the associated time alignment timer is running.

The timing advance command may causes substantial alignment of reception timing of uplink signals in frames and subframes of all activated uplink carriers in the cell group at the base station. The time alignment timer value may be configured as one of a finite set of predetermined values. For example, the finite set of predetermined values may be eight. Each time alignment timer value may be encoded employing three bits. TAG TAT may be a dedicated time alignment timer value and is transmitted by the base station to the wireless device. TAG TAT may be configured to cause configuration of time alignment timer value for each time alignment group. The IE TAG TAT may be used to control how long the UE is considered uplink time aligned. It corresponds to the timer for time alignment for each cell group. Its value may be in number of sub-frames. For example, value sf500 corresponds to 500 sub-frames, sf750 corresponds to 750 sub-frames and so on. An uplink time alignment is common for all serving cells belonging to the same cell group. In an example embodiment, the IE TAG TAT may be defined as: TAG TAT::=SEQUENCE{TAG ID, ENUMERATED {sf500, sf750, sf1280, sf1920, sf2560, sf5120, sf10240, infinity}. Time alignment timer for pTAG may be indicated in a separate IE and may not be included in the sequence.

In an example, TimeAlignmentTimerDedicated IE may be sf500, and then TAG TAT may be {1, sf500; 2, sf2560; 3, sf500}. In the example, time alignment timer for the pTAG is configured separately and is not included in the sequence. In the examples, TAG0 (pTAG) time alignment timer value is 500 subframes (500 m-sec), TAG1 (sTAG) time alignment timer value is 500 subframes, TAG2 time alignment timer value is 2560 subframes, and TAG3 time alignment timer value is 500 subframes. This is for example purposes only. In this example a TAG may take one of 8 predefined values. In a different embodiment, the enumerated values could take other values. The size of the sequence is 3 in the first example and 4 in the second example. In another example embodiment, the size could be 2, 3, equal to the size of configured TAGs in the wireless device, and/or the like.

Figure 9:
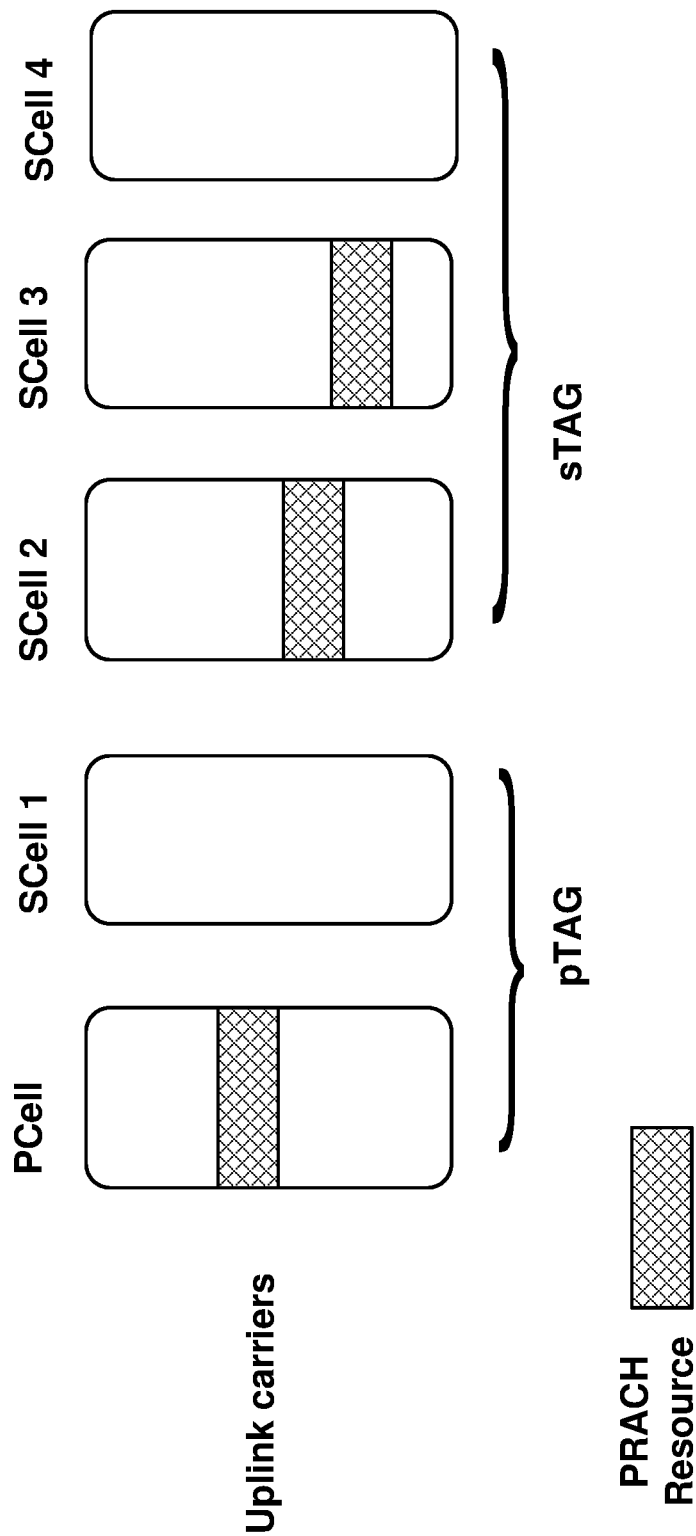
FIG. 9 is an example physical random access channel (PRACH) configuration in a primary TAG (pTAG) and a secondary TAG (sTAG) as per an aspect of an embodiment of the present invention.
Figure 10:
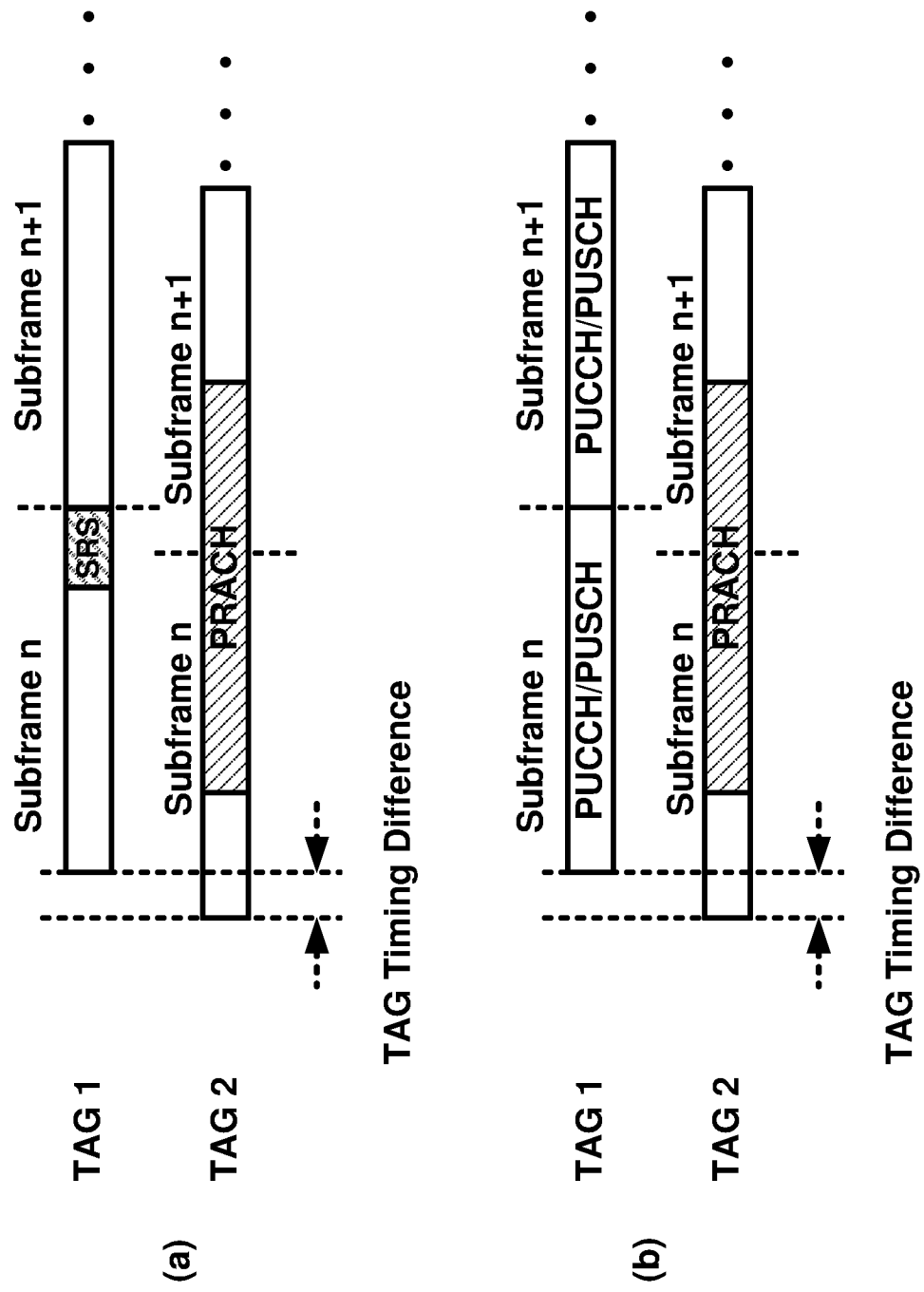
FIG. 10 is a diagram showing example parallel transmission of a random access preamble with SRS, PUCCH, or PUSCH signals as per an aspect of an embodiment of the present invention.

FIG. 9 is an example physical random access channel (PRACH) configuration in a primary TAG (pTAG) and a secondary TAG (sTAG) as per an aspect of an embodiment of the present invention. As shown in the example, PRACH resources are configured for the PCell in pTAG and SCell2 and SCell3 in sTAG. SCell1 and SCell4 are not configured with PRACH resources. This is an example and other configurations are also possible. In an example embodiment, no SCell in pTAG is configured with PRACH resources. In another example embodiment, PRACH resources for an SCell in pTAG may be configured, but eNB is not configured to trigger a preamble transmission on PRACH resources of an SCell in pTAG. Basically, PRACH resources in SCells in pTAG cannot be used for preamble transmissions by a UE.

During the connection establishment process, an eNB may transmit a first control message to a wireless device (UE) on a primary downlink carrier of a PCell to establish a first signaling bearer with the UE on the primary cell. The UE may transmit radio capability parameters from to the base station. The radio capability parameters may be transmitted on the first signaling bearer on a primary uplink carrier of the primary cell. In this process a wireless device (UE) may transfer UE radio access capability information from the UE to E-UTRAN (e.g. base station). If the UE has changed its radio access capabilities, the UE may request higher layers to initiate the necessary procedures that would result in the update of UE radio access capabilities, e.g., using a new RRC connection. In an example, a base station may initiate the procedure to a UE in RRC_CONNECTED when it needs (additional) UE radio access capability information.

According to some of the various aspects of embodiments, radio capability parameters may include a parameter indicating support for multiple time alignment (MTA). Support for MTA may be considered an optional feature in release 11, and an eNB may not know if a UE supports MTA capabilities until it receives a UE capability message from the UE indicating that the UE supports MTA feature. Before eNB configures pTAG and sTAG(s), eNB may receive and process UE capability regarding UE multiple time alignment capabilities. Supporting MTA capability may require that UE includes new hardware and/or software features that provide such a capability. Multiple time alignment capability may be an optional capability for Rel-11 UE and its support may depend on UE's hardware, DSP and software designs. A UE may send at least one time alignment capability parameter to the eNB. eNB may configure UE's sTAG(s) and pTAG within the UE capability. For example, a UE may indicate how many sTAGs it may support. eNB may configure UE sTAG(s) based, at least in part, on the number of supported sTAGs in a UE. In another example, UE may explicitly or implicitly indicate if it supports inter-band or intra-band multiple TA, or both. In an example embodiment, support for MTA may be provided per band combination for one or more band combinations supported by a wireless device.

According to some of the various aspects of embodiments, multiple-TAG capability may be explicitly or implicitly communicated to eNB. In an example embodiment, inter-band and/or intra-band carrier aggregation may be configured with multiple TAGs. UE may send multiple TAG capability based on each supported band combinations. UEs that could be configured with inter-band carrier aggregation may need MTA (multiple time alignment or multiple-TAG) configuration. Carriers in a band may experience a different delay compared with a different band and a band may need its own TAG configuration. A TAG configuration for carriers for a band may be required. In a multiple band UE, multiple TAGs may be configured, for example one TAG per band. UE may comprise a plurality of RF chains to support inter-band carrier aggregation. A UE may support multiple TAGs if the UE support inter-band carrier aggregation.

UE transceiver architectures may support non-contiguous and/or contiguous carrier aggregation in intra-band. UE may support multiple TAGs in partial or all supportable intra-band carrier aggregation. Support for multiple TAG may depend on UE architecture, and some UEs may not support intra-band multiple TAG configurations in one or more bands depending on UEs transceiver structure. In an example embodiment, a UE may communicate its multiple TAG capability to the eNB for intra-band communication. A UE may transmit the MTA capability information for contiguous intra-band CA and/or non-contiguous intra-band carrier aggregation. In another example embodiment, a UE may also communicate UE inter-band and/or intra-band TAG capability to the eNB.

According to some of the various aspects of embodiments, UE may indicate its MTA capability in information elements (IEs) for each band combination including inter-band and intra-band combinations. In an example embodiment, MTA capability for intra-band and/or inter-band may be communicated employing at least one radio parameter. MTA capability IE may be ordered (indexed) according to a band combination index determining the order of a band combination in a sequence of one or more band combinations. The eNB may employ an internally stored look-up table to interpret the index of MTA capability and a band combination. UE may transmit MTA capability including a sequence of MTA capability to the eNB. The eNB may use a set of configuration options (for example in a look-up table, information list for band combinations, and/or the like format) to identify the band combination corresponding to an MTA capability (supported/not-supported) in a first sequence of one or more MTA capabilities. The eNB may receive the indexed list of MTA capability(ies) and determine the MTA capabilities of the wireless device.

In an example embodiment, an information element in the form of a first sequence of one or more radio configuration parameters may be introduced. Each of the radio configuration parameters may comprise a Multiple Timing Advance IE. The Multiple Timing Advance IE, for example, could be a binary variable indicating that Multiple Timing Advance capability is supported or not supported.

The first sequence comprising The Multiple Timing Advance IE may Indicate whether the wireless device supports multiple timing advances for each band combination listed in a second sequence of supported Band Combinations. If the band combination comprised of more than one band entry (i.e., inter-band or intra-band non-contiguous band combination), the Multiple Timing Advance IE field indicates whether different timing advances on different band entries are supported or not supported. If the band combination comprised of one band entry (i.e., intra-band contiguous band combination), the Multiple Timing Advance IE field indicates whether different timing advances across component carriers of the band entry are supported. The first sequence including MTA capability IEs may include the same number of entries listed and in the same order as in the second sequence of Band Combination Parameters.

In an example embodiment, both inter-band and intra-band CA (carrier aggregation) may support multiple time alignment configurations. For example, carriers in the same TAG may be in the same or different bands. In another example, carriers in the same band may belong to same or different TAGs. In another example, a UE may report its multiple time alignment capability based on supported band combinations.

Support for multiple TAG configurations may imply that at least one of the following features is supported by the UE: a) Parallel transmission of a preamble on an uplink carrier (PRACH) and PUSCH on at least one other carrier; b) Parallel transmission of a preamble on an uplink carrier (SCell PRACH) and PUCCH (e.g. on at least one other carrier, for example, the PCell); c) Parallel transmission of preamble on an uplink carrier, PUCCH (for example on PCell, if preamble is on an SCell), and PUSCH on at least one other carrier. This feature may be supported if parallel transmission of PUCCH and PUSCH is supported by the UE. d) Processing MAC TA CE commands including TAG ID. The UE may apply the TA value to the proper TAG according to TAG ID in the MAC TA CE. e) Running RA process on an SCell belong to an sTAG. This feature may require transmission of RA preamble on an uplink carrier belonging to an SCell of an sTAG. f) Maintaining more than one time alignment timer in the UE. g) Grouping carriers into multiple TAGs, wherein a TAG timing is managed based, at least in part, on a different timing reference SCell and TAs associated with a TAG. A UE may need to synchronize and track synchronization signals of multiple downlink carriers, one reference cell synchronization signal for a TAG. A TAG may have its own timing reference SCell, which is different than the timing reference cell of another TAG.

In an example embodiment, some limitations may apply. For example, the preamble transmission in the above items may refer to preamble transmission on an SCell uplink carrier and may not include preamble on a PCell.

In an example embodiment, parallel transmission of preamble with other signals such as uplink data (on PUSCH), uplink control (on PUCCH) and/or sounding reference signal (SRS) may be supported if uplink data, uplink control, and/or SRS control (the signals that are scheduled for uplink transmission with the uplink preamble) are transmitted on a different TAG compared with the TAG that is used for preamble transmission.

In an example embodiment, a UE supporting multiple time alignment feature may support one or more of the above features. For example, the supported feature may be based, at least in part, on the parameters of the UE capability message and other predetermined parameters (explicitly or implicitly determined by signaling messages or technology specifications) and/or other signaling messages.

In an example embodiment, a UE supporting multiple time alignment feature may support all the features itemized in bullets (above). A UE that does not support multiple time alignment feature may support none of the above features.

In another example embodiment, a UE supporting multiple time alignment feature may support all the above features. A UE that does not support multiple time alignment feature may not support all-of-the-above features.

Figure 11:
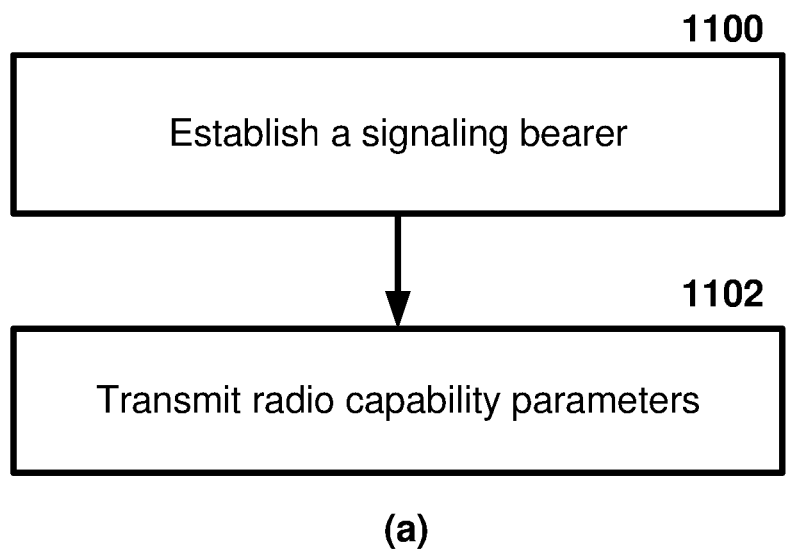
FIG. 11 is an example flow diagram illustrating a mechanism to exchange radio capability parameters as per an aspect of an embodiment of the present invention.
Figure 11:
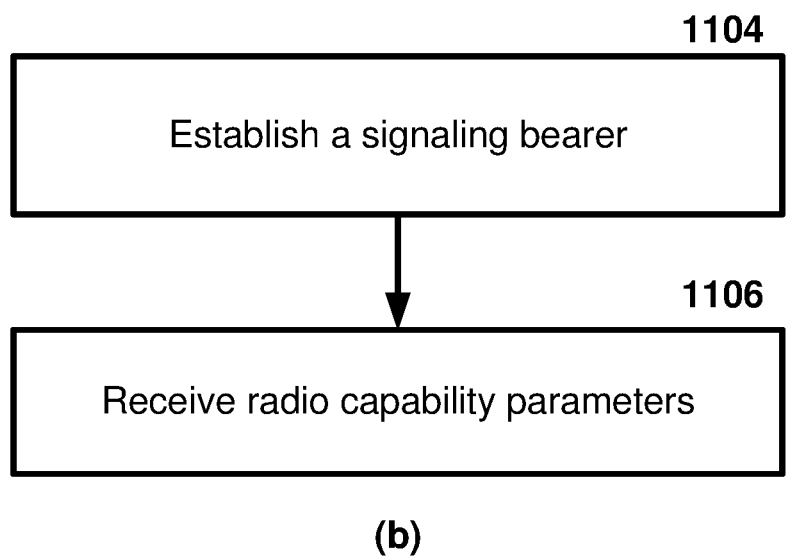

FIG. 11 is an example flow diagram illustrating a mechanism to exchange radio capability parameters as per an aspect of an embodiment of the present invention. According to some of the various embodiments, a first signaling bearer may be established between a wireless device and a base station on a primary cell at block 1100. The establishing may comprise the wireless device receiving a first control message from the base station on the primary cell in a plurality of cells. The plurality of cells may comprise the primary cell and at least one secondary cell. The first control message may be, for example, a radio resource control connection establishment message, a radio resource control connection set up message, radio resource control connection reconfiguration message and/or the like.

According to some of the various embodiments, the wireless device may initiate the establishing by transmitting a random access preamble to the base station. The base station may respond by transmitting a random access response comprising the preamble ID and an uplink grant. The establishing may further comprise the wireless device transmitting a radio resource connection request message to the base station. The wireless device may transmit the radio resource connection request in uplink radio resources identified in an uplink grant of a random access response message received from the base station. The base station and wireless device may further communicate messages, for example, for authentication, security, configuration changes, and/or the like.

According to some of the various embodiments, at block 1102, the wireless device may transmit a plurality of radio capability parameters to the base station. In an example embodiment, the plurality of radio capability parameters may be transmitted on the first signaling bearer on the primary cell. The plurality of radio capability parameters may comprise at least one parameter indicating whether the wireless device supports a plurality of timing advance groups. The wireless device may support the plurality of timing advance groups for at least one band combination. The parameter(s) may further indicate whether the wireless device supports a plurality of timing advance groups for each of one or more band combinations supported by the wireless device.

According to some of the various embodiments, if the at least one parameter indicates the wireless device supports the plurality of timing advance groups, the wireless device may support (capable of performing the task when needed) transmission of a random access preamble on at least one of the secondary cell(s) in a secondary cell group. If the at least one parameter indicates the wireless device supports the plurality of timing advance groups, the wireless device may support parallel transmission of: a random access preamble on an uplink carrier on one of the secondary cell(s) in the secondary cell group; and uplink data on at least one other uplink carrier of other cell(s) in the plurality of cells. If the at least one parameter indicates the wireless device supports the plurality of timing advance groups, the wireless device may support parallel transmission of: a random access preamble on an uplink carrier on one of the secondary cell(s) in the secondary cell group; and control data on an uplink physical control channel on at least one other uplink carrier of other cell(s) in the plurality of cells. According to some of the various embodiments, the other cell(s) in the plurality of cells may not comprise the one of the secondary cell(s) in the secondary cell group.

If the at least one parameter indicates the wireless device supports the plurality of timing advance groups, the wireless device may apply each of a plurality of MAC timing advance commands comprising a timing advance group index to uplink transmission timing of a cell group identified by the timing advance group index. If the at least one parameter indicates the wireless device supports the plurality of timing advance groups, the wireless device may be capable of maintaining a plurality of timing advance timers. If the at least one parameter indicates the wireless device supports a plurality of timing advance groups, the wireless device may support configuration of the plurality of timing advance groups. Each of the plurality of timing advance groups may comprise a distinct subset of the plurality of cells. Each cell is associated to only one timing advance group. Uplink transmissions on each timing advance group may employ a synchronization signal on a downlink carrier of one active cell in the distinct subset as a timing reference. Each of a plurality of MAC timing advance commands may comprise a timing advance value and a TAG index (TAG-ID).

According to some of the various embodiments, the wireless device may further support parallel transmission of: a random access preamble on an uplink carrier on one of the secondary cell(s) in the secondary cell group; and an uplink sounding reference signal on other uplink carrier(s) of other cell(s) in the plurality of cells.

According to some of the various embodiments, the wireless device may comprise communication interface(s), processor(s), and memory. The memory may store instructions. The processor(s) may execute the instructions to cause actions described herein.

According to some of the various embodiments, at block 1100, a wireless device may establish a first signaling bearer between a wireless device and a base station on a primary cell in a plurality of cells. The plurality of cells may comprise the primary cell and secondary cell(s).

According to some of the various embodiments, at block 1102, a plurality of radio capability parameters may be transmitted to the base station on the first signaling bearer on the primary cell. The plurality of radio capability parameters may comprise parameter(s) indicating whether the wireless device supports a plurality of timing advance groups.

According to some of the various embodiments, if parameter(s) indicate the wireless device supports the plurality of timing advance groups, the wireless device may supports all of a multitude of features. One of the features may comprise transmitting a random access preamble on at least one of the at least one secondary cell(s) in a secondary cell group. Another of the features may comprise parallel transmission of: a random access preamble on an uplink carrier on one of secondary cell(s) in the secondary cell group; and uplink data on at least one other uplink carrier of at least one other cell in the plurality of cells. Another of the features may comprise parallel transmission of a random access preamble on an uplink carrier on one of the at least one secondary cell in the secondary cell group; and control data on an uplink physical control channel on at least one other uplink carrier of other cell(s) in the plurality of cells. Another of the features may comprise applying each of a plurality of MAC timing advance commands comprising a timing advance group index to uplink transmission timing of a cell group identified by the timing advance group index. Another of the features may comprise maintaining a plurality of timing advance timers. Another of the features may comprise configuring the plurality of timing advance groups. Each of the plurality of timing advance groups may comprise a distinct subset of the plurality of cells. Uplink transmissions on each timing advance group may employ a synchronization signal on a downlink carrier of one active cell in the distinct subset as a timing reference. The plurality of timing advance timers may correspond to a timing advance group in the plurality of timing advance groups. The configuring of the plurality of timing advance groups may comprise assigning each cell in the plurality of cells to a timing advance group in the plurality of timing advance groups.

According to some of the various embodiments, the random access preamble may be transmitted in response to receiving a control command from the base station. The control command may comprise an identifier of the random access preamble.

According to some of the various embodiments, each of a plurality of MAC timing advance commands may comprise a timing advance value.

FIG. 11 is an example flow diagram illustrating a mechanism to exchange radio capability parameters as per an aspect of an embodiment of the present invention.

According to some of the various embodiments, at 1104, a first signaling bearer may be established between a base station and a wireless device on a primary cell. The establishing may comprise the base station transmitting a first control message to the wireless device on the primary cell in a plurality of cells. The plurality of cells may comprise the primary cell and at least one secondary cell.

According to some of the various embodiments, at 1106, the base station may receive a plurality of radio capability parameters from the wireless device. In an example embodiment the plurality of radio capability parameters are received on the first signaling bearer on the primary cell. In another example embodiment, the plurality of radio capability parameters may be received on other signaling or data bearers on the primary or a secondary cell. Many different factors may initiate the transmission of radio capability parameters, for example, establishing the connection, another example is when the capabilities have been change. Other examples may be provide. The plurality of radio capability parameters may comprise at least one parameter indicating whether the wireless device supports a plurality of timing advance groups.

According to some of the various embodiments, second control message(s) may be selectively transmitted to the wireless device by the base station if the second parameter(s) indicate that the wireless device supports the plurality of timing advance groups. The second control message(s) may be configured to cause in the wireless device configuration of secondary cell(s) in the plurality of cells. The control message(s) may be configured to cause in the wireless device assignment of each of the secondary cell(s) to a timing advance group in the plurality of timing advance groups. The plurality of timing advance groups may comprise a primary timing advance group and a secondary timing advance group. The primary timing advance group may comprise a first subset of the plurality of cells. The first subset may comprise the primary cell. Uplink transmissions by the wireless device in the primary timing advance group may employ a first synchronization signal transmitted on the primary cell. The secondary timing advance group may comprise a second subset of the secondary cell(s). The second subset may comprise a reference secondary cell. Uplink transmissions in the secondary timing advance group may employ a second synchronization signal on the reference secondary cell as a secondary timing reference.

According to some of the various embodiments, the parameter(s) may further indicate whether the wireless device supports a plurality of timing advance groups for each of one or more band combinations supported by the wireless device.

According to some of the various embodiments, the second control message(s) may be configured to further cause in the wireless device, configuration of a timing advance timer for each of the plurality of timing advance groups. The timing advance timer may start or restart in response to the wireless device receiving a timing advance command to adjust uplink transmission timing of a commanded timing advance group in the plurality of timing advance groups. The first control message may be a radio resource control connection establishment message. The second control message(s) may be configured to further cause in the wireless device configuration of random access resources on a secondary cell in the secondary timing advance group.

FIG. 11 is an example flow diagram illustrating a mechanism to exchange radio capability parameters as per an aspect of an embodiment of the present invention. According to some of the various embodiments, at 1104, a first signaling bearer may be established between a base station and a wireless device on a primary cell in a plurality of cells. The plurality of cells may comprise the primary cell and at least one secondary cell. The wireless device may initiate the establishing by transmitting a random access preamble to the base station. The establishing may further comprise the wireless device transmitting a radio resource connection request message to the base station. The wireless device may transmit the radio resource connection request in uplink radio resources identified in an uplink grant of a random access response message received from the base station.

According to some of the various embodiments, at 1106, the base station may receive a plurality of radio capability parameters from the wireless device. Other examples may be possible, and various parameters may trigger transmission of radio capability parameters by a wireless device to the base station employing a signaling or data bearer. In an example embodiment, the capability may be received on the first signaling bearer on the primary cell. The plurality of radio capability parameters may comprise a first sequence of one or more radio configuration parameters. A first radio configuration parameter in the first sequence may comprise a first parameter indicating whether multiple timing advance groups may be supported for a first band combination. The first band combination may be in a second sequence of one or more band combinations. The index of the first radio configuration parameter in the first sequence may determine the index of the first band combination in the second sequence.

According to some of the various embodiments, the size of the first sequence may be the same as the size of the second sequence. The index may determine the order of: the first radio configuration parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band.

According to some of the various embodiments, the wireless device may support multiple inter-band timing advance groups if the list of band identifier(s) includes more than one band; and the first parameter indicates that multiple timing advance groups are supported. In yet other embodiments, the wireless device may support multiple intra-band timing advance groups if the list of band identifier(s) includes one band; and the first parameter indicates that multiple timing advance groups are supported.

According to some of the various embodiments, the wireless device may not support multiple timing advance configurations if none of the radio configuration parameters comprise a parameter indicating that multiple timing advance groups are supported.

According to some of the various embodiments, a first signaling bearer may be established between a base station and a wireless device on a primary cell at block 1104. The establishing may comprise the base station transmitting a control message to the wireless device on the primary cell in a plurality of cells. The plurality of cells may comprise the primary cell and secondary cell(s).

According to some of the various embodiments, at block 1106, the base station may receive a plurality of radio capability parameters from the wireless device. In an example, the plurality of radio capability parameters on the first signaling bearer on the primary cell. The plurality of radio capability parameters may comprise a first sequence of one or more radio configuration parameters. A first radio configuration parameter in the first sequence may comprise a first parameter indicating whether multiple timing advance groups are supported for a first band combination. The first band combination may be in a second sequence of one or more band combinations. The index of the first radio configuration parameter in the first sequence may determine the index of the first band combination in the second sequence. The size of the first sequence may be the same as the size of the second sequence.

According to some of the various embodiments, control message(s) may be selectively transmitted to the wireless device by the base station if the first sequence of one or more radio configuration parameters indicates that the wireless device supports the plurality of timing advance groups. The control message(s) may be configured to cause in the wireless device configuration of secondary cell(s) in the plurality of cells. The control message(s) may assign each of the secondary cell(s) to a time advance group in the plurality of timing advance groups. The plurality of timing advance groups may comprise a primary timing advance group and a secondary timing advance group. The primary timing advance group may comprise a first subset of the plurality of cells. The first subset may comprise the primary cell. Uplink transmissions by the wireless device in the primary timing advance group may employ a first synchronization signal transmitted on the primary cell. The secondary timing advance group may comprise a second subset of the at least one secondary cell. The second subset may comprise a reference secondary cell. Uplink transmissions in the secondary timing advance group may employ a second synchronization signal on the reference secondary cell as a secondary timing reference.

According to some of the various embodiments, the control message(s) may be configured to further cause in the wireless device configuration of a timing advance timer for each of the plurality of timing advance groups. The timing advance timer may start or restart in response to the wireless device receiving a timing advance command to adjust uplink transmission timing of a commanded timing advance group in the plurality of timing advance groups. A first control message may be a radio resource configuration connection set up message. Second control message(s) may be configured to further cause in the wireless device configuration of random access resources on a secondary cell in the secondary timing advance group.

According to some of the various embodiments, the wireless device may comprise communication interface(s), processor(s), and memory. The memory may store instructions. The processor(s) may execute the instructions to cause actions described herein.

According to some of the various embodiments, at block 1100, a first signaling bearer may be established between a wireless device and a base station on a primary cell in a plurality of cells. The plurality of cells may comprise the primary cell and secondary cell(s).

According to some of the various embodiments, at block 1102, the wireless device may transmit a plurality of radio capability parameters to the base station on the first signaling bearer on the primary cell. The plurality of radio capability parameters may comprise a first sequence of one or more radio configuration parameters. A first radio configuration parameter in the first sequence may comprise a first parameter indicating whether multiple timing advance groups are supported for a first band combination. The first band combination may be in a second sequence of one or more band combinations. The index of the first radio configuration parameter in the first sequence may determine the index of the first band combination in the second sequence. The size of the first sequence may be the same as the size of the second sequence. The index may determine the order of: the first radio configuration parameter in the first sequence; and the first band combination in the second sequence.

According to some of the various embodiments, the first band combination may be identified by a first band combination parameter. The first band combination parameter may comprise a list of band identifier(s). The wireless device may support multiple inter-band timing advance groups if: the list of band identifier(s) includes more than one band; and the first parameter indicates that multiple timing advance groups are supported. The wireless device may support multiple intra-band timing advance groups if: the list of band identifier(s) includes one band; and the first parameter indicates that multiple timing advance groups is or is not supported.

An example is provided to further explain an embodiment. A wireless device may transmit an RRC message comprising UE capability information. The UE capability information may comprise an information element comprising a wireless device LTE radio capability parameters. The LTE radio capability parameters may comprise a plurality of parameters indicating various capability of the wireless device LTE radio. The plurality of radio capability parameters may comprise a second sequence of one or more band combinations. Each band combination IE parameter in the second sequence of one or more band combinations may comprise a list of one or more band identifier(s). An example band combination IE may be {(band-id1, band-parameters1), (band-id2, band-parameters2), (band-id3, band-parameters3). The example band combination IE comprises a sequence of band identifier(s): band-id1, band-id2, band-id3, and a sequence of band parameters. Band parameters may be uplink parameter(s) and/or downlink parameter(s). Each of the band identifier(s) may be one of a finite set of numbers, for example from a set of (1 . . . 64). Each of the numbers in the set may identify a specific band, for example number 14 may refer to 1950 MHz band-A, 23 may refer to 2100 MHz band-D, 24 may refer to 2100 MHz band-E. If band-id1=14, the band-id2=23, and band-id3=24, the wireless device supports band combination of these three bands. A second band combination in the second sequence may include band-id1=14 and band-id4=43. In the example, the second sequence of one or more band combinations are considered an array of one or more band combination IEs. In the example embodiment, two band combinations are in the second sequence of one or more band combinations.

In the example embodiment, a first sequence of one or more radio configuration parameters for example could be {(TAG-not-supported, other parameters1),(TAG-supported, other parameters2)}. The first radio configuration parameter is TAG-non-supported (with index 1), and the second radio configuration parameter is TAG-supported (with index 2). Index 1 in the first sequence comprise (TAG-non-supported) and corresponds to first index in the second sequence (the first band combination: band-id1=14, the band-id2=23, and band-id3=24). Index 2 in the first sequence comprise (TAG-supported) corresponds to index 2 in the second sequence (the second band combination band-id1 and band-id4). In the example, TAG configuration is not supported for band combination=(band-id1=14, the band-id4=43, and band-id3=24). TAG configuration is supported for band combination=(band-id1=14, the band-id2=43).

The example embodiments provides a solution for network, base station, UE signaling to reduce signaling overhead required for configuring wireless devices in a network. The example embodiments for communication of radio capability parameters provide flexibility in providing TAG capability for one or more band combinations. It reduces the required overhead for communicating this information by indexing TAG capability according to band combination IE. This increases radio efficiency. Furthermore, by including this information in UE signaling parameters, eNB is able to selectively configure multiple UEs for capable UEs without introducing new signaling messages. This improvement would have minimal impact in the UE and eNB messaging system. eNB does is not required to receive this information from UE subscription information in the core, and this simplifies core network signaling and requirements.

According to some of the various embodiments, SCell(s) belonging to an sTAG may need to perform random access process in order to achieve UL synchronization. For example, this may happen when an SCell belonging to an unsynchronized sTAG is activated. The UE may be uplink out-of-synch for that SCell, but is uplink synchronized for the pTAG and other sTAG(s). eNB may trigger RACH on an SCell to let a UE to acquire uplink synchronization. Random access process may also be initiated on a synchronized sTAG, for example, for acquiring uplink timing of an SCell, and/or the like. Random access on an SCell may be initiated while the UE is schedule to transmit other uplink data or control packets. In an example embodiment, a random access on a PCell may be initiated by a UE and/or eNB. A random access on a PCell for example may be initiated by an eNB to acquire uplink timing for a PCell. Random access on a PCell may be initiated while the UE is scheduled to transmit other uplink data and/or control packets.

When random access preamble is transmitted, for example, on an SCell of an sTAG, there is the possibility of transmission of: a) PUSCH, SRS, and/or PUCCH on PCell, and/or b) PUSCH and/or SRS on other serving cells belonging to pTAG and/or other sTAGs. When random access preamble is transmitted, for example, on a PCell of the pTAG, there is the possibility of transmission of PUSCH and/or SRS on other serving cells belonging sTAGs.

According to some of the various embodiments, other uplink transmissions may be possible while RACH (random access channel) transmission is carried out. Possible simultaneous transmission of PRACH (physical random access channel) preamble and other UL channel signals on other serving cells may be considered. UE may support parallel PRACH and PUSCH/PUCCH/SRS transmissions. This issue may not apply to LTE release 10, since no uplink transmission may be allowed when random access preamble is transmitted on a PCell uplink random access resource.

Parallel transmission of other UL packets during the time the random access preamble is sent may require special solution. There could be more than one TA group and hence one TA group may already be in sync while another TA (time alignment) group may not be in-sync. This means that UL transmission may be on-going on other cells while the UE receives a PDCCH order to transmit a preamble on a cell. Parallel transmission of a preamble, and other UL transmissions on cells in other TAGs may happen. Parallel and/or simultaneous transmission in this specification may imply that transmissions are substantially parallel and/or substantially simultaneous, and/or transmissions may overlap during a time period. The overlap time period may be greater than a threshold, for example: zero, half a symbol, a symbol, 30 µs, and/or the like. Parallel and/or simultaneous transmissions may imply that transmissions are in the same subframe, include the same subframe and/or may overlap during a time period. Minor inaccuracies/errors in transmission time within a limited range may be accepted.

According to some of the various embodiments, parallel transmission of a preamble and of other UL data, control packets and/or SRS transmission on cells in other TA groups could have many advantages. The network may not need to coordinate the time when an RA is ordered on a cell of a TAG and with other UL transmissions in other TAGs. This may slightly increase UE complexity and it may make the power handling of the UE a bit more complex, but radio resources may be used more efficiently if parallel transmission is allowed. Supporting parallel transmission of a preamble and transmission of other UL data or control messages may reduce the complexity in an eNB and increase uplink radio efficiency. Allowing parallel PRACH and PUSCH/PUCCH/SRS transmissions may reduce scheduling restrictions in an eNB. In the example embodiment, a limitation applies that when a random access preamble is transmitted in a random access channel of a cell of a given TAG, no other parallel transmission is allowed in the cells belonging to the same TAG. For example, when a preamble is transmitted on an SCell of an sTAG no other PUSCH packet and/or SRS signal may be transmitted in parallel with the preamble in the sTAG.

According to some of the various embodiments, a UE configured with N active carriers and supporting multiple-TAG configuration may transmit some of following signals in parallel: k×PRACH; m×PUCCH; p×PUSCH; q×SRS signals. The values of k, m, p, q depends on UE capability and configuration. In an example, K may be equal to zero or one; m may be equal to zero or one; p may be equal or less than N; and q may be equal or less than N. Transmission rules may be define to constraints some parallel transmissions of the above signals.

In an example embodiment, if a UE is configured to transmit in parallel PUCCH packet and PUSCH packet(s) (some UEs may not be capable of PUSCH and PUCCH transmission) then the following conditions may apply. K may be equal to 1 or zero. Meaning that one random access preamble may be transmitted at a given time. If the random access is transmitted then k=1, and if the random access is not transmitted then k=0. Random access preamble may have a higher power priority compared with other uplink signals transmitted by a UE. If a random access preamble is transmitted in a given TAG with c cells, then up to p=N-c PUSCH can be transmitted in parallel in the uplink on carriers that are active, uplink synchronized, and do not belong to the given TAG. If the preamble is transmitted on the PCell, PUCCH packet may not be transmitted in parallel in PCell. If the preamble is transmitted on an SCell, PUCCH packet may be transmitted in parallel in PCell. SRS transmission may have a lowest priority compared with uplink signals: PRACH, PUCCH, PUSCH. If any of the PUCCH, PUSCH, and PRACH transmissions in a given TAG coincides with an SRS symbol transmission in a symbol of the given TAG, then SRS may be dropped. Therefore, no parallel transmission of SRS is allowed in a symbol of a given TAG, if any other signal is carried in the given TAG. Avoiding parallel transmission of a preamble with any other signal in the same TAG, and avoiding parallel transmission of an SRS signal with any other signal in the same TAG may simplify UE transmission operation. A preamble may have a higher transmission priority compared with other uplink signals (PUCCH/SRS/PUSCH), and therefore may not be dropped because of other parallel transmissions. SRS may have a lower transmission priority compared with other uplink signals (PUCCH/Preamble/PUSCH), and therefore may be dropped because of other parallel transmissions."

In an example embodiment, if a UE is not configured to transmit in parallel PUCCH packet and PUSCH packet(s) then the above conditions may apply except that no parallel PUCCH and PUSCH transmission is allowed in the UE.

In an example embodiment, when there is no SRS transmission, PRACH transmitted in a TAG with c cells, can be transmitted in parallel with one PUCCH and up to (N−c) PUSCH packets. If PRACH preamble is transmitted in pTAG, no parallel transmission of PUCCH packet and the preamble is allowed. In general no uplink signals may be transmitted with preamble in the TAG that is used for preamble transmission. If a UE is not configured with parallel PUCCH and PUSCH channel transmission, then this limitation may be applied.

According to some of the various embodiments, if SRS transmission is configured, then SRS transmission is dropped in a given TAG, if SRS transmission symbol coincides with an uplink transmission symbol (any of the preamble, PUCCH packet, and PUSCH) in the given TAG. Multiple SRS signals may be transmitted in different cells of a given TAG in parallel with each other (assuming no PUCCH, PUSCH, and preamble is transmitted in parallel in the given TAG).

In an example, a shortened format of PUCCH may not coincide with SRS transmission, since a shortened PUCCH packet is not transmitted in the last symbol of a subframe. For example, if UE transmits in parallel an SRS signal, a preamble, and a PUSCH packet, then each of the SRS signal, the preamble, and the PUSCH packet is transmitted on a different cell group. In another example, if a UE transmits in parallel an SRS signal, a preamble, and a PUCCH packet, then PUCCH packet is transmitted on pTAG, preamble is transmitted on a first sTAG, and SRS signal is transmitted on a TAG different from pTAG and the first sTAG. In another example, if UE transmits in parallel an SRS signal and a PUSCH packet, then each of the SRS signal and the PUSCH packet is transmitted on a different cell group. Other examples could be provided based on the rules disclosed in this disclosure.

In another example embodiment, when UE supports simultaneous PUSCH and PUCCH, power scaling may be applied when the UE is in power limited scenario, for example when UE is in poor coverage areas. With the introduction of multiple TA, RACH preamble may be transmitted on an SCell. Hence there will be TTI where RACH preamble transmission or retransmissions may coincide with either PUCCH or PUSCH on PCell/SCell or both. The following simultaneous PRACH on SCell with other UL transmissions may occur in a UE:

UE behaviour may be defined when total power is not sufficient. There may be multiple solutions to address this issue. The priorities for power scaling between different channels may be determined. According to the priorities the powers may be scaled to ensure transmit power is less than or equal to $\hat{P}_{CMAX}(i)$. In case that total transmit power of the UE might exceed the maximum power $\hat{P}_{CMAX}(i)$, the PRACH may be assigned the highest priority. The priority of transmission power for UL channels may be:

PRACH>PUCCH>PUSCH with UCI>PUSCH. (UCI: uplink control information).

According to some of the various aspects of embodiments, the order of priorities may be PRACH, PUCCH, PUSCH with UCI, and then PUSCH (PRACH has the highest priority).

For the case when there is no simultaneous PUSCH with UCI transmission, if the total transmit power of the UE would exceed $\hat{P}_{CMAX}(i)$, then:

$$\hat{P}_{PUCCH}(i)=\min(\hat{P}_{PUCCH}(i),(\hat{P}_{CMAX}(i)-\hat{P}_{PRACH}(i))$$

The UE may scale $\hat{P}_{PUSCH,c}(i)$ for the serving cell c in subframe i such that the condition $$\sum_{c} w(i) \cdot \hat{P}_{PUSCH,c}(i) \leq (\hat{P}_{CMAX}(i) - \hat{P}_{PUCCH}(i) - \hat{P}_{PRACH}(i))$$

is satisfied. In an example implementation, $\hat{P}_{PUCCH}(i)$ may be the linear value of $P_{PUCCH}(i)$, $\hat{P}_{PUSCH,c}(i)$ may be the linear value of $P_{PUSCH,c}(i)$, $\hat{P}_{CMAX}(i)$ may be the linear value of the UE total configured maximum output power $P_{CMAX}$ in subframe i and w(i) may be a scaling factor of $\hat{P}_{PUSCH,c}(i)$ for serving cell c where 0≤w(i)≤1. Other functions in addition to linear value may be supported. For example, average power, and/or the like. In case there is no PUCCH transmission in subframe i $\hat{P}_{PUCCH}(i)=0$. $\hat{P}_{PRACH}(i)$ may be the linear value of $P_{PRACH}(i)$ or could be another function of the preamble transmission power on an uplink SCell. If there is no uplink preamble transmission, then $\hat{P}_{PRACH}(i)$. In an example, w(i) values may be the same across serving cells when w(i)>0 but for certain serving cells w(i) may be zero. $P_{PUSCH,c}(i)$ includes carriers that could transmit uplink PUSCH. For example, if PUSCH transmission on a carrier is not allowed, then PUSCH transmission power for that carrier may not be included in the formula (power=0), since no signal would be transmitted on that carrier. For example, if carrier c is in an sTAG, which is uplink unsynchronized, then no signal would be transmitted on that PUSCH.

If the UE has PUSCH transmission with UCI on serving cell j and PUSCH without UCI in any of the remaining serving cells, and the total transmit power of the UE would exceed $\hat{P}_{CMAX}(i)$ (and no simultaneous PUCCH message is transmitted), then:

$$\hat{P}_{PUSCH,j}(i)=\min(\hat{P}_{PUSCH,j}(i),(\hat{P}_{CMAX}(i)-\hat{P}_{PRACH}(i))$$

The UE may scale $\hat{P}_{PUSCH,c}(i)$ for the serving cells without UCI in subframe i such that the condition $$\sum_{c \neq j} w(i) \cdot \hat{P}_{PUSCH,c}(i) \leq (\hat{P}_{CMAX}(i) - \hat{P}_{PUSCH,j}(i) - \hat{P}_{PRACH}(i))$$

is satisfied where $\hat{P}_{PUSCH,j}(i)$ may be the PUSCH transmit power for the cell with UCI and w(i) may be a scaling factor of $\hat{P}_{PUSCH,c}(i)$ for serving cell c without UCI. In this case, no power scaling may be applied to $\hat{P}_{PUSCH,j}(i)$ unless $$\sum_{c \neq j} w(i) \cdot \hat{P}_{PUSCH,c}(i) = 0$$

and the total transmit power of the UE still would exceed $\hat{P}_{CMAX}(i)$.

If the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUCCH}(i)=\min(\hat{P}_{PUCCH}(i),(\hat{P}_{CMAX}(i)-\hat{P}_{PRACH}(i))$$
and then $$\hat{P}_{PUSCH,j}(i)=\min(\hat{P}_{PUSCH,j}(i),(\hat{P}_{CMAX}(i)-\hat{P}_{PUCCH}(i)-\hat{P}_{PRACH}(i))$$

And then $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i) - \hat{P}_{PRACH}(i))$$

According to some of the various aspects of embodiments, some other power constraints may be applied to limit transmission power for a carrier below a maximum carrier transmission power. For example, when a simultaneous PUCCH and PUSCH on the same carrier is transmitted, the UE may perform a power scaling inside a carrier before applying the above power limitations on the overall transmit power.

Whenever UL SRS coincides with PRACH preamble, PUCCH packet, and/or PUSCH packet in the same symbol, SRS may not be transmitted (may be dropped) by the UE, when there is power constraint in the UE. UE may not scale SRS power when SRS signal is transmitted in parallel with PUCCH packet, PUSCH packet, and/or a preamble. UE may drop all SRSs transmitted in a symbol if the UE is power limited in the uplink for transmission of parallel SRS with PUCCH packet, PUSCH packet, and/or a preamble.

Figure 12:
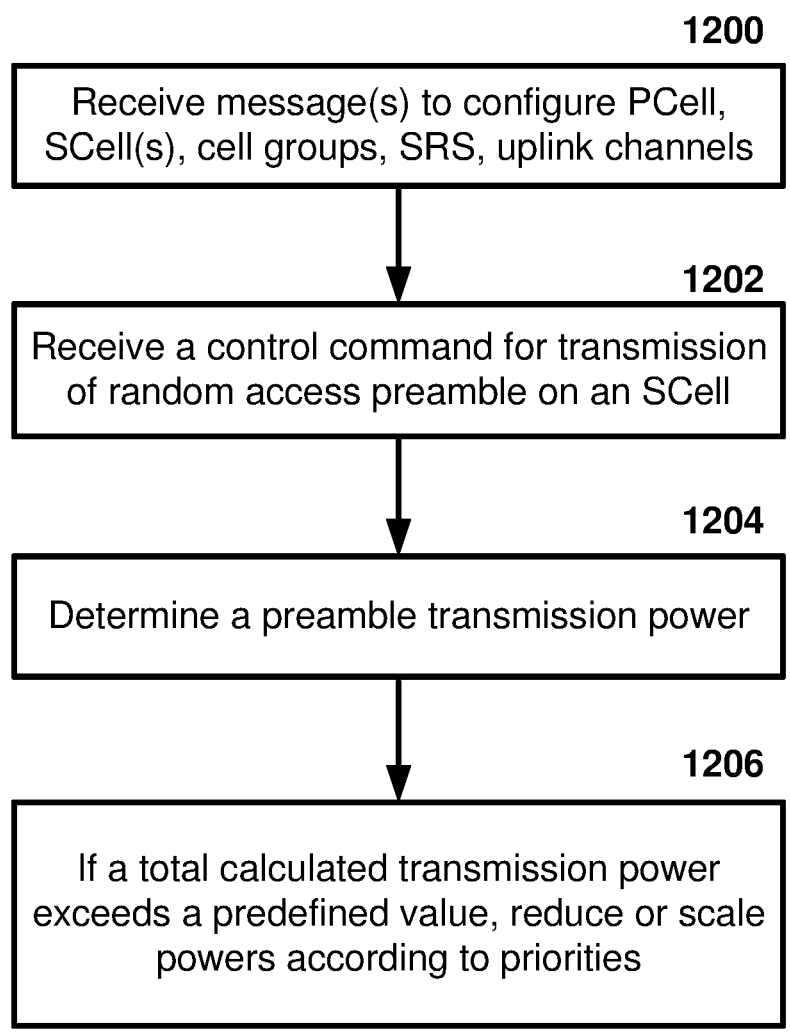
FIG. 12 is an example flow diagram illustrating a process for calculating transmission powers as per an aspect of an embodiment of the present invention.

FIG. 12 is an example flow diagram illustrating a process for calculating transmission powers as per an aspect of an embodiment of the present invention. According to some of the various embodiments, a wireless device may receive control message(s) from a base station 1200. The control message(s) may cause in the wireless device configuration of a plurality of cells comprising a primary cell and secondary cell(s). The control message(s) may cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The subset may comprise the primary cell. The secondary cell group may comprise a second subset of the secondary cell(s). The control message(s) may further causes in the wireless device configuration of a plurality of channel parameters for the following channels: the uplink control channel on the primary cell; the one uplink data channel(s); and an uplink random access channel on the first cell.

According to some of the various embodiments, at block 1202, the wireless device may receive a control command for transmission of a random access preamble on a first cell in the plurality of cells. The random access preamble may be transmitted in parallel with at least one of the following parallel uplink transmissions: a first control packet on an uplink control channel of the primary cell; a second packet comprising uplink control information on an uplink data channel of one of the plurality of cells; and third packet(s) on one uplink data channel(s) of the plurality of cells. The first cell may be the primary cell.

According to some of the various embodiments, the wireless device may determine a preamble transmission power for the random access preamble at block 1204.

According to some of the various embodiments, if a total calculated transmission power exceeds a predefined value, the wireless device may obtain a transmission power of the parallel uplink transmission(s) according to a series of priorities as follows. The random access preamble transmission may have a first priority. The first control packet may have a second priority lower than the first priority. The second packet may have a third priority lower than the second priority. The third packet(s) may have a fourth priority lower than the third priority.

According to some of the various embodiments, at block 1206, the priorities may be employed by the wireless device to reduce or scale linear transmission power of one or more of the parallel transmission(s) such that an updated value of the total calculated transmission power is equal to or less than the predefined value. The total calculated transmission power may be calculated for a subframe.

According to some of the various embodiments, the scaling linear transmission power may comprise scaling linear transmission power by a scaling factor: greater than or equal to zero; and smaller than or equal to one.

According to some of the various embodiments, calculation of the total calculated transmission power may comprise adding all of the following transmission powers: a linear transmission power of the random access preamble; a linear transmission power of the first control packet if the first control packet is transmitted; a linear transmission power of the second packet if the second packet is transmitted; and a linear transmission power of the third packet(s) if the third packet(s) are transmitted. According to some of the various embodiments, if the parallel uplink transmission(s) consists of the first control packet, a calculated linear transmission power of the first control packet may be equal to a minimum of: the linear transmission power of the first control packet; and the predefined value minus the linear transmission power of the random access preamble. Note: the parallel uplink transmission(s) are the signals transmitted in parallel "with" the random access preamble (preamble is inherently not in the parallel uplink transmission(s) but is transmitted in parallel with the parallel uplink transmission(s)). According to some of the various embodiments, if the parallel uplink transmission(s) consists of the second packet, a calculated linear transmission power of the second packet may be equal to a minimum of: the linear transmission power of the second packet; and the predefined value minus the linear transmission power of the random access preamble.

According to some of the various embodiments, if the parallel uplink transmission(s) consist of the first control packet and the second packet: a calculated linear transmission power of the first control packet may be equal to a minimum of: the linear transmission power of the first control packet; and the predefined value minus the linear transmission power of the random access preamble. According to some of the various embodiments, if the parallel uplink transmission(s) consist of the first control packet and the second packet: a calculated linear transmission power of the second control packet may be equal to a minimum of: the linear transmission power of the second control packet; and the predefined value minus a sum of the linear transmission power of the random access preamble and the calculated linear transmission power of the first control packet. According to some of the various embodiments, if the parallel uplink transmission(s) consist of the first control packet and the third packet(s), then: a calculated linear transmission power of the first control packet may be equal to a minimum of: the linear transmission power of the first control packet; and the predefined value minus the linear transmission power of the random access preamble. According to some of the various embodiments, if the parallel uplink transmission(s) consists of the first control packet and the third packet(s), a calculated linear transmission power for each of the third packet(s) may be calculated by scaling the linear transmission power of each of the third packet(s) by a scaling factor such that the total calculated transmission power is equal to or less than the predefined value, the scaling factor being equal to or less than one.

According to some of the various embodiments, a wireless device may receive control message(s) from a base station at 1200. The control message(s) may cause in the wireless device the configuration of a plurality of cells. The plurality of cells may comprise a primary cell and secondary cell(s). The control message(s) may cause in the wireless device the assignment of each of the secondary cell(s) to a cell group in a plurality of cell groups. The plurality of cell groups may comprise a primary cell group and a secondary cell group. The primary cell group may comprise a first subset of the plurality of cells. The subset may comprise the primary cell. The secondary cell group may comprise a second subset of the secondary cell(s).

According to some of the various embodiments, at block 1202, the wireless device may receive a control command for transmission of a random access preamble on a first cell in the plurality of cells. The random access preamble may be transmitted in parallel with at least one of the following parallel uplink transmissions: a first control packet; a second packet; and third packet(s). The first control packet may be on an uplink control channel of the primary cell. The second packet may comprise uplink control information on an uplink data channel of one of the plurality of cells. The third packet(s) may be on uplink data channel(s) of the plurality of cells.

According to some of the various embodiments, at block 1204, the wireless device may determine a transmission power for the random access preamble.

According to some of the various embodiments, at block 1206, if a total calculated transmission power exceeds a predefined value, the wireless device may reduce or scale the linear transmission power of one or more of the parallel uplink transmission(s) according to a predefined rule. The predefined rule may consider a higher priority for the transmission power of the random access preamble compared with a transmission priority of: the first control packet; the second packet; and the third packet(s). The reduction or scaling of the linear transmission power may be performed over a period of one subframe.

According to some of the various embodiments, the calculation of the total calculated transmission power may comprises adding all of the following transmission powers: a linear transmission power of the random access preamble; a linear transmission power of the first control packet if the first control packet is transmitted; a linear transmission power of the second packet if the second packet is transmitted; and a linear transmission power of the third packet(s) if the third packet(s) are transmitted. According to some of the various embodiments, if the parallel uplink transmission(s) consist of the first control packet, a calculated linear transmission power of the first control packet may be equal to a minimum of: the linear transmission power of the first control packet; and the predefined value minus the linear transmission power of the random access preamble. According to some of the various embodiments, if the parallel uplink transmission(s) consist of the second packet, a calculated linear transmission power of the second packet may be equal to a minimum of: the linear transmission power of the second packet; and the predefined value minus the linear transmission power of the random access preamble.

According to some of the various embodiments, the wireless device may comprise communication interface(s), processor(s), and memory. The memory may store instructions. The processor(s) may execute the instructions to cause actions described herein.

According to some of the various embodiments, a wireless device may receive control message(s) from a base station 1200. The control message(s) may cause in the wireless device configuration of a plurality of cells comprising a primary cell and secondary cell(s). The control message(s) may cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The subset may comprise the primary cell. The secondary cell group may comprise a second subset of the secondary cell(s). The control message(s) may further causes in the wireless device configuration of a plurality of channel parameters for the following channels: the uplink control channel on the primary cell; the uplink data channel(s); and an uplink random access channel on the first cell.

According to some of the various embodiments, at block 1202, the wireless device may receive a control command for transmission of a random access preamble on a first cell in the plurality of cells. The random access preamble may be transmitted in parallel with at least one of the following parallel uplink transmissions: a first control packet on an uplink control channel of the primary cell; a second packet comprising uplink control information on an uplink data channel of one of the plurality of cells; and the third packet(s) on the uplink data channel(s) of the plurality of cells. The first cell may be the primary cell.

According to some of the various embodiments, the wireless device may determine a preamble transmission power for the random access preamble at block 1204.

According to some of the various embodiments, at block 1206, if a total calculated transmission power exceeds a predefined value, the wireless device may reduce or scale linear transmission power of one or more of the parallel uplink transmission(s) according to a predefined rule considering a higher priority for the transmission power of the random access preamble compared with a transmission priority of: the first control packet; the second packet; and the third packet(s). The predefined value may be a configured maximum transmission power of the wireless device.

According to some of the various embodiments, a configured sounding reference signal transmission may be dropped if the total calculated transmission power exceeds a predefined value. According to some of the various embodiments, a transmission period of the random access preamble may be more than one subframe. According to some of the various embodiments, a transmission period of the random access preamble may overlap a first subframe and a second subframe.

Figure 13:
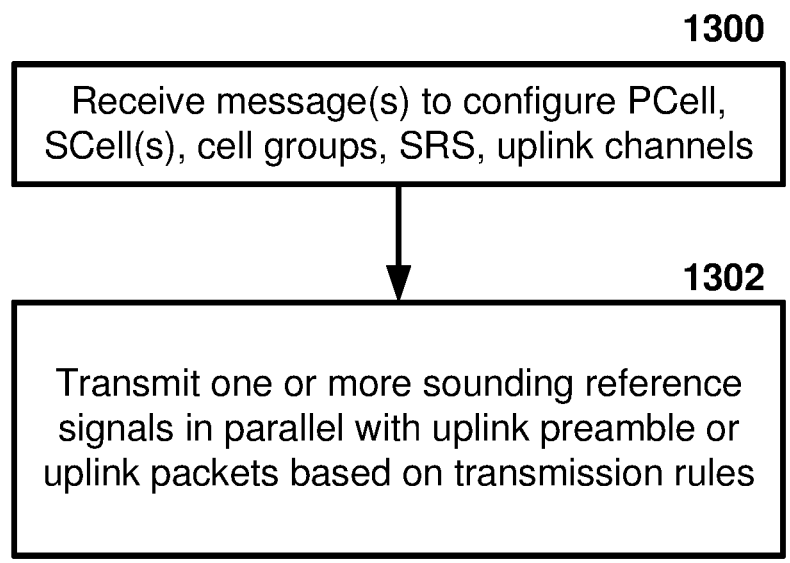
FIG. 13 is an example flow diagram illustrating a process for sounding reference signal transmission as per an aspect of an embodiment of the present invention.

FIG. 13 is an example flow diagram illustrating a process for sounding reference signal transmission as per an aspect of an embodiment of the present invention. According to some of the various embodiments, a wireless device may receive control message(s) from a base station at 1300. The control message(s) may cause in the wireless device the configuration of a plurality of cells. The plurality of cells may comprise a primary cell and secondary cell(s). The control message(s) may cause in the wireless device the assignment of each of the secondary cell(s) to a cell group in a plurality of cell groups. The plurality of cell groups may comprise a primary cell group and a secondary cell group. The primary cell group may comprise a first subset of the plurality of cells. The subset may comprise the primary cell. A secondary cell group may comprise a second subset of the secondary cell(s). The control message(s) may cause in the wireless device configuration of transmissions of sounding reference signals on a first cell in the plurality of cells. The first cell may be assigned to a first cell group in the plurality of cell groups. The control message(s) may cause in the wireless device configuration of random access channel(s). The control message(s) may cause in the wireless device configuration of data channel(s). The first random access preamble may be transmitted on one of the random access channel(s) and the first uplink data packet may be transmitted on one of the data channel(s). The first cell group may be one of: the primary cell group; and the secondary cell group.

According to some of the various embodiments, at block 1302, the wireless device may transmit one or more of the sounding reference signals on the first cell in parallel with the transmission of at least one of: a first random access preamble; and a first uplink data packet. The sounding reference signals may be configured to be transmitted during a time period. The one or more of the sounding reference signals may be transmitted on the last symbol of a plurality of subframes. In an example embodiment, the sounding reference signals may be type zero sounding reference signals and/or type one sounding reference signals.

According to some of the various embodiments, a first sounding reference signal (SRS) may be one of the sounding reference signals. The wireless device may be configured to not transmit the first sounding reference signal on the first cell if the first sounding reference signal transmission and a second random access preamble transmission in the first cell group coincide in the same subframe. The first SRS may be dropped because the first SRS transmission coincides with the second random preamble transmission and both are scheduled for transmission in the same first cell group. The wireless device may be configured to not transmit the first sounding reference signal on the first cell if the wireless device has insufficient power to transmit the first sounding reference signal in parallel with a third random access preamble when the third random access preamble transmission and the first sounding reference signal coincide in the same subframe. SRS signal may have a lower transmission priority compared with any of the PUCCH, random access preamble, PUSCH packet, and then UE does not have insufficient power to transmit SRS with any of these signals, the UE may drop SRS transmission. The wireless device may be configured to not transmit the first sounding reference signal on the first cell if the wireless device has insufficient power to transmit the first sounding reference signal in parallel with a second uplink data packet transmission when the second uplink data packet transmission and the first sounding reference signal coincide in the same subframe. In an example scenario, the first cell group may be out of sync when the second random access preamble is transmitted on the first cell group.

According to some of the various embodiments, transmission of said first SRS signal is dropped if the first sounding reference signal transmission and a third uplink data packet transmission in the first cell group coincide in the same subframe. Transmission of said first SRS signal is dropped if the first sounding reference signal transmission and an uplink physical control packet transmission in the first cell group may coincide in the same subframe. In general, an SRS signal may be dropped if any of PUCCH packet, PUSCH packet, and preamble packet coincides with SRS transmission symbol in the same cell group.

According to some of the various embodiments, the wireless device may give the sounding reference signal transmission power a lower priority compared with: a priority of a transmission power of the third random access preamble; and a priority of a transmission power of the second uplink data packet transmission.

According to some of the various embodiments, the first random access preamble may be transmitted on a second cell of a second cell group. The second cell group may be different from the first cell group. The first uplink data packet may be transmitted on a second cell of a second cell group. The second cell group may be different from the first cell group.

According to some of the various embodiments, a wireless device may receive control message(s) from a base station at block 1300. The control message(s) may cause in the wireless device the configuration of a plurality of cells comprising a primary cell and secondary cell(s). The control message(s) may cause in the wireless device assignment of each of the secondary cell(s) to a cell group in a plurality of cell groups. The control message(s) may cause in the wireless device the configuration of transmissions of sounding reference signals on a first cell in the plurality of cells. The first cell may be assigned to a first cell group in the plurality of cell groups.

Figure 14:
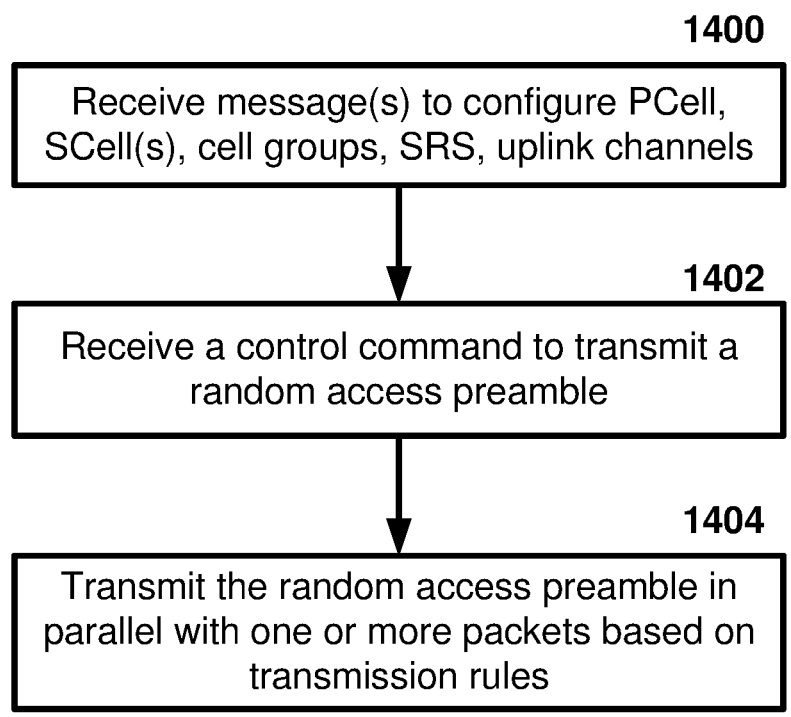
FIG. 14 is an example flow diagram illustrating parallel transmission of a random access preamble with other uplink packets as per an aspect of an embodiment of the present invention.

FIG. 14 is an example flow diagram illustrating parallel transmission of a random access preamble with other uplink packets as per an aspect of an embodiment of the present invention. According to some of the various embodiments, a wireless device may receive control message(s) from a base station at 1400. The control message(s) may cause in the wireless device the configuration of a plurality of cells. The plurality of cells may comprise a primary cell and secondary cell(s). The control message(s) may cause in the wireless device the assignment of each of the secondary cell(s) to a cell group in a plurality of cell groups. The plurality of cell groups may comprise a primary cell group and a secondary cell group. The primary cell group may comprise a first subset of the plurality of cells. The subset may comprise the primary cell. The secondary cell group may comprise a second subset of the secondary cell(s). The control message(s) may cause in the wireless device the configuration of random access channel(s). The control message(s) may cause in the wireless device the configuration of uplink data channel(s) on the plurality of cells. The control message(s) may cause in the wireless device the configuration of an uplink control channel of the primary cell. The control message(s) may further cause in the wireless device the configuration of a plurality of channel parameters for: the uplink control channel on the primary cell; the uplink data channel(s); and an uplink random access channel on the first cell.

According to some of the various embodiments, at block 1402, the wireless device may receive a control command for transmission of a random access preamble on a first cell in the plurality of cells. A fourth packet may be scheduled for parallel uplink transmission with the random access preamble transmission. The fourth packet may be a first control packet on the uplink control channel. The fourth packet may be a second packet. The second packet may comprise uplink control information on an uplink data channel in the uplink channel(s). The fourth packet may be a third packet on an uplink data channel of the plurality of cells. In an example embodiment the first cell may be the primary cell or a secondary cell.

According to some of the various embodiments, at block 1404, the wireless device may transmit the random access preamble on one of the random access channel(s). The wireless device may transmit the fourth packet in parallel with the random access preamble, unless the random access preamble and the fourth packet are scheduled for transmission in the same cell group. It is assumed that the wireless device is capable of transmission of the fourth packet if the random access preamble was not scheduled in the same subframe. It is also assumed that the wireless device has at least some power for transmission of the fourth packet according to a power allocation scheme. Examples of power allocation schemes and power prioritization are disclosed in the embodiment. Therefore, the assumption is that other reasons for dropping transmission of the fourth packet do not exist.

According to some of the various embodiments, the wireless device may reduce or scale the transmission power of the fourth packet such that a total calculated transmission power is equal to or less than a predefined value. The transmission power priorities may be employed by the wireless device to reduce or scale the linear transmission power of the packet such that a total calculated transmission power is equal to or less than a predefined value. The random access preamble transmission may have a higher priority compared with a transmission priority of the packet. The reduction and scaling of the linear transmission power may be performed over a period of one subframe. The first cell group may be out of sync when the random access preamble is transmitted on the first cell group.

According to some of the various embodiments, the transmission period of the random access preamble may be more than one subframe. The transmission period of the random access preamble may overlap a first subframe and a second subframe. According to some of the various embodiments, the wireless device may transmit each of the following in parallel only if they are transmitted on different cell groups: the random access preamble; the first control packet; and a sounding reference signal. According to some of the various embodiments, the wireless device may transmit each of the following in parallel only if they are transmitted on different cell groups: the random access preamble; the third data packet; and a sounding reference signal.

According to some of the various embodiments, a wireless device may receive control message(s) from a base station at 1400. The control message(s) may cause in the wireless device the configuration of a plurality of cells. The plurality of cells may comprise a primary cell and secondary cell(s). The control message(s) may cause in the wireless device the assignment of each of the secondary cell(s) to a cell group in a plurality of cell groups. The plurality of cell groups may comprise a comprise primary cell group and a secondary cell group. The primary cell group may comprise the primary cell. The secondary cell group may comprise a subset of the secondary cell(s).

According to some of the various embodiments, at block 1402, the wireless device may receive a control command for transmission of a random access preamble on a first cell in the plurality of cells. A fourth packet may be scheduled for parallel uplink transmission with the random access preamble transmission. The fourth packet may be a first control packet on the uplink control channel of the primary cell. The fourth packet may be a second packet. The second packet may comprise uplink control information on an uplink data channel of one of the plurality of cells. The fourth packet may be a third packet on an uplink data channel of the plurality of cells.

According to some of the various embodiments, at block 1404, the wireless device may transmit the random access preamble. The wireless device may transmit the fourth packet in parallel with the random access preamble, unless the random access preamble and the fourth packet are scheduled for transmission in the same cell group. A transmission period of the random access preamble may overlap a first subframe and a second subframe.

According to some of the various embodiments, the wireless device may transmit each of the following in parallel only if they are transmitted on different cell groups: the random access preamble; the first control packet; and a sounding reference signal. The wireless device may transmit each of the following in parallel only if they are transmitted on different cell groups: the random access preamble; the third data packet; and a sounding reference signal.

According to some of the various embodiments, the wireless device may comprise communication interface(s), processor(s), and memory. The memory may store instructions. The processor(s) may execute the instructions to cause actions described herein.

According to some of the various aspects of embodiments, the random access procedure may be initiated by a PDCCH order or by the MAC sublayer itself. Random access procedure on an SCell may be initiated by a PDCCH order. If a UE receives a PDCCH transmission consistent with a PDCCH order masked with its C-RNTI (radio network temporary identifier), and for a specific serving cell, the UE may initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from zero and the ra-PRACH-MaskIndex. For the pTAG preamble transmission on PRACH and reception of a PDCCH order may only be supported for PCell.

According to some of the various aspects of embodiments, the procedure may use some of the following information: a) the available set of PRACH resources for the transmission of the random access preamble, prach-ConfigIndex., b) for PCell, the groups of random access preambles and/or the set of available random access preambles in each group, c) for PCell, the preambles that are contained in random access preambles group A and Random Access Preambles group B are calculated, d) the RA response window size ra-ResponseWindowSize, e) the power-ramping factor powerRampingStep, f) the maximum number of preamble transmission preambleTransMax, g) the initial preamble power preambleInitialReceivedTargetPower, h) the preamble format based offset DELTA_PREAMBLE, i) for PCell, the maximum number of Msg3 HARQ transmissions maxHARQ-Msg3Tx, j) for PCell, the Contention Resolution Timer mac-ContentionResolutionTimer. These parameters may be updated from upper layers before each Random Access procedure is initiated.

According to some of the various aspects of embodiments, the Random Access procedure may be performed as follows: Flush the Msg3 buffer; set the PREAMBLE_TRANSMISSION_COUNTER to 1; set the backoff parameter value in the UE to 0 msec; for the RN (relay node), suspend any RN subframe configuration; proceed to the selection of the Random Access Resource. There may be one Random Access procedure ongoing at any point in time. If the UE receives a request for a new Random Access procedure while another is already ongoing, it may be up to UE implementation whether to continue with the ongoing procedure or start with the new procedure.

According to some of the various aspects of embodiments, the Random Access Resource selection procedure may be performed as follows. If ra-PreambleIndex (Random Access Preamble) and ra-PRACH-MaskIndex (PRACH Mask Index) have been explicitly signalled and ra-PreambleIndex is not zero, then the Random Access Preamble and the PRACH Mask Index may be those explicitly signalled. Otherwise, the Random Access Preamble may be selected by the UE.

The UE may determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe). If the transmission mode is TDD and the PRACH Mask Index is equal to zero, then if ra-PreambleIndex was explicitly signalled and it was not 0 (i.e., not selected by MAC), then randomly select, with equal probability, one PRACH from the PRACHs available in the determined subframe. Else, the UE may randomly select, with equal probability, one PRACH from the PRACHs available in the determined subframe and the next two consecutive subframes. If the transmission mode is not TDD or the PRACH Mask Index is not equal to zero, a UE may determine a PRACH within the determined subframe in accordance with the requirements of the PRACH Mask Index. Then the UE may proceed to the transmission of the Random Access Preamble.

PRACH mask index values may range for example from 0 to 16. PRACH mask index value may determine the allowed PRACH resource index that may be used for transmission. For example, PRACH mask index 0 may mean that all PRACH resource indexes are allowed; or PRACH mask index 1 may mean that PRACH resource index 0 may be used. PRACH mask index may have different meaning in TDD and FDD systems The random-access procedure may be performed by UE setting PREAMBLE_RECEIVED_TARGET_POWER to preambleInitialReceivedTargetPower+DELTA_PREAMBLE+(PREAMBLE_TRANSMISSION_COUNTER−1)*powerRampingStep. The UE may instruct the physical layer to transmit a preamble using the selected PRACH, corresponding RA-RNTI, preamble index and PREAMBLE_RECEIVED_TARGET_POWER.

According to some of the various aspects of embodiments, once the random access preamble is transmitted and regardless of the possible occurrence of a measurement gap, the UE may monitor the PDCCH of the PCell for random access response(s) identified by the RA-RNTI (random access radio network identifier) a specific RA-RNTI defined below, in the random access response (RAR) window which may start at the subframe that contains the end of the preamble transmission plus three subframes and has length ra-ResponseWindowSize subframes. The specific RA-RNTI associated with the PRACH in which the Random Access Preamble is transmitted, is computed as: RA-RNTI=1+t_id+ 10*f_id. Where t_id is the index of the first subframe of the specified PRACH ($0 \leq t\_id < 10$), and fid is the index of the specified PRACH within that subframe, in ascending order of frequency domain ($0 \leq f\_id < 6$). The UE may stop monitoring for RAR(s) after successful reception of a RAR containing random access preamble identifiers that matches the transmitted random access preamble.

According to some of the various aspects of embodiments, if a downlink assignment for this TTI (transmission time interval) has been received on the PDCCH for the RA-RNTI and the received TB (transport block) is successfully decoded, the UE may regardless of the possible occurrence of a measurement gap: if the RAR contains a backoff indicator (BI) subheader, set the backoff parameter value in the UE employing the BI field of the backoff indicator subheader, else, set the backoff parameter value in the UE to zero msec. If the RAR contains a random access preamble identifier corresponding to the transmitted random access preamble, the UE may consider this RAR reception successful and apply the following actions for the serving cell where the random access preamble was transmitted: process the received riming advance command for the cell group in which the preamble was transmitted, indicate the preambleInitialReceivedTargetPower and the amount of power ramping applied to the latest preamble transmission to lower layers (i.e., (PREAMBLE_TRANSMISSION_COUNTER− 1)*powerRampingStep); process the received uplink grant value and indicate it to the lower layers; the uplink grant is applicable to uplink of the cell in which the preamble was transmitted. If ra-PreambleIndex was explicitly signalled and it was not zero (e.g., not selected by MAC), consider the random access procedure successfully completed. Otherwise, if the Random Access Preamble was selected by UE MAC, set the Temporary C-RNTI to the value received in the RAR message. When an uplink transmission is required, e.g., for contention resolution, the eNB may not provide a grant smaller than 56 bits in the Random Access Response.

According to some of the various aspects of embodiments, if no RAR is received within the RAR window, or if none of all received RAR contains a random access preamble identifier corresponding to the transmitted random access preamble, the random access response reception may considered not successful. If RAR is not received, UE may increment PREAMBLE_TRANSMISSION_COUNTER by 1. If PREAMBLE_TRANSMISSION_COUNTER= preambleTransMax+1 and random access preamble is transmitted on the PCell, then UE may indicate a random access problem to upper layers (RRC). This may result in radio link failure. If PREAMBLE_TRANSMISSION_COUNTER= preambleTransMax+1 and the random access preamble is transmitted on an SCell, then UE may consider the random access procedure unsuccessfully completed. UE may stay in RRC connected mode and keep the RRC connection active even though a random access procedure unsuccessfully completed on a secondary TAG. According to some of the various aspects of embodiments, at completion of the random access procedure, the UE may discard explicitly signalled ra-PreambleIndex and ra-PRACH-MaskIndex, if any;

and flush the HARQ buffer used for transmission of the MAC PDU in the Msg3 buffer. In addition, the RN may resume the suspended RN subframe configuration, if any.

According to some of the various aspects of embodiments, The UE may have a configurable timer timeAlignmentTimer per TAG. The timeAlignmentTimer is used to control how long the UE considers the Serving Cells belonging to the associated TAG to be uplink time aligned (in-sync). When a Timing Advance Command MAC control element is received, the UE may apply the riming advance command for the indicated TAG, and start or restart the timeAlignmentTimer associated with the indicated TAG. When a timing advance command is received in a RAR message for a serving cell belonging to a TAG and if the random access preamble was not selected by UE MAC, the UE may apply the timing advance command for this TAG, and may start or restart the timeAlignmentTimer associated with this TAG. When a timeAlignmentTimer associated with the pTAG expires, the UE may: flush all HARQ buffers for all serving cells; notify RRC to release PUCCH/SRS for all serving cells; clear any configured downlink assignments and uplink grants; and consider all running timeAlignment-Timers as expired. When a timeAlignmentTimer associated with an sTAG expires, then for all Serving Cells belonging to this TAG, the UE may flush all HARQ buffers; and notify RRC to release SRS. The UE may not perform any uplink transmission on a serving Cell except the random access preamble transmission when the timeAlignmentTimer associated with the TAG to which this serving cell belongs is not running. When the timeAlignmentTimer associated with the pTAG is not running, the UE may not perform any uplink transmission on any serving cell except the random access preamble transmission on the PCell. A UE stores or maintains N_TA (current timing advance value of an sTAG) upon expiry of associated timeAlignmentTimer. The UE may apply a received timing advance command MAC control element and starts associated timeAlignmentTimer. Transmission of the uplink radio frame number i from the UE may start $(N_{TA}+N_{TA\ offset}) \times T_s$ seconds before the start of the corresponding downlink radio frame at the UE, where $0 \leq N_{TA} \leq 20512$. In an example implementation, $N_{TA\ offset}=0$ for frame structure type 1 (FDD) and $N_{TA\ offset}=624$ for frame structure type 2 (TDD).

According to some of the various aspects of embodiments, upon reception of a timing advance command for a TAG containing the primary cell, the UE may adjust uplink transmission timing for PUCCH/PUSCH/SRS of the primary cell based on the received timing advance command. The UL transmission timing for PUSCH/SRS of a secondary cell may be the same as the primary cell if the secondary cell and the primary cell belong to the same TAG. Upon reception of a timing advance command for a TAG not containing the primary cell, the UE may adjust uplink transmission timing for PUSCH/SRS of secondary cells in the TAG based on the received timing advance command where the UL transmission timing for PUSCH/SRS is the same for all the secondary cells in the TAG.

The timing advance command for a TAG may indicates the change of the uplink timing relative to the current uplink timing for the TAG as multiples of 16 ($T_s$: sampling time unit). The start timing of the random access preamble may obtained employing a downlink synchronization time in the same TAG. In case of random access response, an 11-bit timing advance command, TA, for a TAG may indicate $N_{TA}$ values by index values of TA=0, 1, 2, . . . , 1282, where an amount of the time alignment for the TAG may be given by $N_{TA}=TA\times16$. In other cases, a 6-bit timing advance command, TA, for a TAG may indicate adjustment of the current $N_{TA}$ value, $N_{TA,old}$, to the new $N_{TA}$ value, $N_{TA,new}$, by index values of TA=0, 1, 2, . . . , 63, where $N_{TA,new}=N_{TA,old}+(TA-31)\times16$. Here, adjustment of $N_{TA}$ value by a positive or a negative amount indicates advancing or delaying the uplink transmission timing for the TAG by a given amount respectively. For a timing advance command received on subframe n, the corresponding adjustment of the uplink transmission timing may apply from the beginning of subframe n+6. For serving cells in the same TAG, when the UE's uplink PUCCH/PUSCH/SRS transmissions in subframe n and subframe n+1 are overlapped due to the timing adjustment, the UE may complete transmission of subframe n and not transmit the overlapped part of subframe n+1. If the received downlink timing changes and is not compensated or is only partly compensated by the uplink timing adjustment without timing advance command, the UE may change $N_{TA}$ accordingly.

Downlink frames and subframes of downlink carriers are time aligned (by the base station) in carrier aggregation and multiple TAG configuration. Time alignment errors may be tolerated to some extent. For example, for intra-band contiguous carrier aggregation, time alignment error may not exceed 130 ns. In another example, for intra-band non-contiguous carrier aggregation, time alignment error may not exceed 260 ns. In another example, for inter-band carrier aggregation, time alignment error may not exceed 1.3 µs.

The UE may have capability to follow the frame timing change of the connected base station. The uplink frame transmission may take place $(N_{TA}+N_{TA\ offset})\times T_s$ before the reception of the first detected path (in time) of the corresponding downlink frame from the reference cell. The UE may be configured with a pTAG containing the PCell. The pTAG may also contain one or more SCells, if configured. The UE may also be configured with one or more sTAGs, in which case the pTAG may contain one PCell and the sTAG may contain at least one SCell with configured uplink. In pTAG, UE may use the PCell as the reference cell for deriving the UE transmit timing for cells in the pTAG. The UE may employ a synchronization signal on the reference cell to drive downlink timing. When a UE is configured with an sTAG, the UE may use an activated SCell from the sTAG for deriving the UE transmit timing for cell in the sTAG.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identity(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various embodiments, physical downlink control channel(s) may carry transport format, scheduling assignments, uplink power control, and other control information. PDCCH may support multiple formats. Multiple PDCCH packets may be transmitted in a subframe. According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. PDCCH channel(s) may carry a plurality of downlink control packets in subframe(s). Enhance PDCCH may be implemented in a cell as an option to carrier control information. According to some of the various embodiments, PHICH may carry the hybrid-ARQ (automatic repeat request) ACK/NACK.

Other arrangements for PCFICH, PHICH, PDCCH, enhanced PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a primary carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s), radio resource control messages, and data traffic may be scheduled for transmission in PDSCH.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier (if the carrier is uplink time aligned), CQI (channel quality indicator)/PMI (precoding matrix indicator)/RI (ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer or PHY layer.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method comprising:
    transmitting, by a wireless device, a transport block via a cell of a first cell group using an adjusted transmission power that satisfies an allowable transmission power associated with transmission of the transport block;
    transmitting a first random access preamble (RAP), via a cell of a second cell group, that overlaps with the transmission of the transport block;
    transmitting a second RAP via a cell of the second cell group; and
    transmitting a sounding reference signal (SRS), wherein the transmitting the SRS is:
        via a cell of the first cell group in parallel with transmission of the second RAP;
        based on a calculated transmission power associated with transmission of the SRS not exceeding an allowable transmission power associated with the transmission of the SRS; and
        based on the first cell group being in-sync.

2. The method of claim 1, wherein for any overlapped portion of the transport block and the first RAP, a total transmission power of the wireless device does not exceed the allowable transmission power associated with the transmission of the transport block.

3. The method of claim 1, wherein the transmitting the first RAP comprises transmitting the first RAP during a first time period, and transmitting the second RAP comprises transmitting the second RAP during a second time period.

4. The method of claim 1, wherein the first RAP and the second RAP are different RAPs.

5. The method of claim 1, wherein the adjusted transmission power of the transmission of the transport block is scaled by a scaling factor that is greater than zero and smaller than or equal to one.

6. The method of claim 1, wherein the calculated transmission power is calculated for a subframe.

7. The method of claim 1, wherein the SRS is a type zero SRS.

8. The method of claim 1, wherein the adjusted transmission power of the transmission of the transport block is adjusted over a period of one subframe.

9. The method of claim 1, wherein the second cell group is out-of-sync when at least one of the first RAP or the second RAP is transmitted.

10. The method of claim 1, wherein:
    uplink transmission timing associated with the first cell group is based on a first reference cell of the first cell group; and uplink transmission timing associated with the second cell group is based on a second reference cell of the second cell group.

11. The method of claim 1, further comprising determining a transmission power for a transmission of at least one of the first RAP or the second RAP before transmitting the at least one of the first RAP or the second RAP.

12. The method of claim 1, wherein the calculated transmission power is calculated for a subframe and the adjusted transmission power of the transmission of the transport block is adjusted over a period of one subframe.

13. The method of claim 1, wherein the transmitting the SRS is further based on:
the SRS not being configured for transmission in parallel with and in a same cell as transmission of one or more other signals.

14. A wireless device comprising:
one or more processors; and
memory storing instructions that, when executed by the one or more processors, cause the wireless device to:
transmit a transport block via a cell of a first cell group using an adjusted transmission power that satisfies an allowable transmission power associated with transmission of the transport block;
transmit a first random access preamble (RAP), via a cell of a second cell group, that overlaps with the transmission of the transport block;
transmit a second RAP via a cell of the second cell group; and
transmit a sounding reference signal (SRS), wherein transmitting the SRS is:
via a cell of the first cell group in parallel with transmission of the second RAP;
based on a calculated transmission power associated with transmission of the SRS not exceeding an allowable transmission power associated with the transmission of the SRS; and
based on the first cell group being in-sync.

15. The wireless device of claim 14, wherein for any overlapped portion of the transport block and the first RAP, a total transmission power of the wireless device does not exceed the allowable transmission power associated with the transmission of the transport block.

16. The wireless device of claim 14, wherein the instructions, when executed by the one or more processors, cause the wireless device to transmit the first RAP during a first time period, and to transmit the second RAP during a second time period.

17. The wireless device of claim 14, wherein the first RAP and the second RAP are different RAPs.

18. The wireless device of claim 14, wherein the adjusted transmission power of the transmission of the transport block is scaled by a scaling factor that is greater than zero and smaller than or equal to one.

19. The wireless device of claim 14, wherein the calculated transmission power is calculated for a subframe.

20. The wireless device of claim 14, wherein the SRS is a type zero SRS.

21. The wireless device of claim 14, wherein the adjusted transmission power of the transmission of the transport block is adjusted over a period of one subframe.

22. The wireless device of claim 14, wherein the second cell group is out-of-sync when at least one of the first RAP or the second RAP is transmitted.

23. The wireless device of claim 14, wherein:
uplink transmission timing associated with the first cell group is based on a first reference cell of the first cell group; and
uplink transmission timing associated with the second cell group is based on a second reference cell of the second cell group.

24. The wireless device of claim 14, wherein the instructions, when executed by the one or more processors, further cause the wireless device to determine a transmission power for a transmission of at least one of the first RAP or the second RAP before transmitting the at least one of the first RAP or the second RAP.

25. The wireless device of claim 14, wherein the calculated transmission power is calculated for a subframe and the adjusted transmission power of the transmission of the transport block is adjusted over a period of one subframe.

26. The wireless device of claim 14, wherein the instructions, when executed by the one or more processors, cause the wireless device to transmit the SRS further based on:
the SRS not being configured for transmission in parallel with and in a same cell as transmission of one or more other signals.

27. A non-transitory computer-readable medium storing instructions that, when executed, configure a wireless device to:
transmit a transport block via a cell of a first cell group using an adjusted transmission power that satisfies an allowable transmission power associated with transmission of the transport block;
transmit a first random access preamble (RAP), via a cell of a second cell group, that overlaps with the transmission of the transport block;
transmit a second RAP via a cell of the second cell group; and
transmit a sounding reference signal (SRS), wherein transmitting the SRS is:
via a cell of the first cell group in parallel with transmission of the second RAP;
based on a calculated transmission power associated with transmission of the SRS not exceeding an allowable transmission power associated with the transmission of the SRS; and
based on the first cell group being in-sync.

28. The non-transitory computer-readable medium of claim 27, wherein for any overlapped portion of the transport block and the first RAP, a total transmission power of the wireless device does not exceed the allowable transmission power associated with the transmission of the transport block.

29. The non-transitory computer-readable medium of claim 27, wherein the instructions, when executed, configure the wireless device to transmit the first RAP during a first time period, and to transmit the second RAP during a second time period.

30. The non-transitory computer-readable medium of claim 27, wherein the first RAP and the second RAP are different RAPs.

31. The non-transitory computer-readable medium of claim 27, wherein the adjusted transmission power of the transmission of the transport block is scaled by a scaling factor that is greater than zero and smaller than or equal to one.

32. The non-transitory computer-readable medium of claim 27, wherein the calculated transmission power is calculated for a subframe.

33. The non-transitory computer-readable medium of claim 27, wherein the SRS is a type zero SRS.

34. The non-transitory computer-readable medium of claim 27, wherein the adjusted transmission power of the transmission of the transport block is adjusted over a period of one subframe.

35. The non-transitory computer-readable medium of claim 27, wherein the second cell group is out-of-sync when at least one of the first RAP or the second RAP is transmitted.

36. The non-transitory computer-readable medium of claim 27, wherein:
uplink transmission timing associated with the first cell group is based on a first reference cell of the first cell group; and
uplink transmission timing associated with the second cell group is based on a second reference cell of the second cell group.

37. The non-transitory computer-readable medium of claim 27, wherein the instructions, when executed, further configure the wireless device to determine a transmission power for a transmission of at least one of the first RAP or the second RAP before transmitting the at least one of the first RAP or the second RAP.

38. The non-transitory computer-readable medium of claim 27, wherein the calculated transmission power is calculated for a subframe and the adjusted transmission power of the transmission of the transport block is adjusted over a period of one subframe.

39. The non-transitory computer-readable medium of claim 27, wherein the instructions, when executed, configure the wireless device to transmit the SRS further based on:
the SRS not being configured for transmission in parallel with and in a same cell as transmission of one or more other signals.

40. A system comprising:
a wireless device; and
a base station,
wherein the base station is configured to:
transmit one or more configuration parameters of a plurality of cells grouped into a plurality of cell groups, and
wherein the wireless device is configured to:
transmit a transport block, via a cell of a first cell group of the plurality of cell groups, using an adjusted transmission power that satisfies an allowable transmission power associated with transmission of the transport block;
transmit a first random access preamble (RAP), via a cell of a second cell group, that overlaps with the transmission of the transport block;
transmit a second RAP via a cell of the second cell group; and
transmit a sounding reference signal (SRS), wherein transmitting the SRS is:
via a cell of the first cell group in parallel with transmission of the second RAP;
based on a calculated transmission power associated with transmission of the SRS not exceeding an allowable transmission power associated with the transmission of the SRS; and
based on the first cell group being in-sync.

41. The system of claim 40, wherein for any overlapped portion of the transport block and the first RAP, a total transmission power of the wireless device does not exceed the allowable transmission power associated with the transmission of the transport block.

42. The system of claim 40, wherein the wireless device is configured to transmit the first RAP during a first time period, and to transmit the second RAP during a second time period.

43. The system of claim 40, wherein the first RAP and the second RAP are different RAPs.

44. The system of claim 40, wherein the adjusted transmission power of the transmission of the transport block is scaled by a scaling factor that is greater than zero and smaller than or equal to one.

45. The system of claim 40, wherein the calculated transmission power is calculated for a subframe.

46. The system of claim 40, wherein the SRS is a type zero SRS.

47. The system of claim 40, wherein the adjusted transmission power of the transmission of the transport block is adjusted over a period of one subframe.

48. The system of claim 40, wherein the second cell group is out-of-sync when at least one of the first RAP or the second RAP is transmitted.

49. The system of claim 40, wherein:
uplink transmission timing associated with the first cell group is based on a first reference cell of the first cell group; and
uplink transmission timing associated with the second cell group is based on a second reference cell of the second cell group.

50. The system of claim 40, wherein the wireless device is configured to determine a transmission power for a transmission of at least one of the first RAP or the second RAP before transmitting the at least one of the first RAP or the second RAP.

51. The system of claim 40, wherein the calculated transmission power is calculated for a subframe and the adjusted transmission power of the transmission of the transport block is adjusted over a period of one subframe.

52. The system of claim 40, wherein the wireless device is configured to transmit the SRS further based on:
the SRS not being configured for transmission in parallel with and in a same cell as transmission of one or more other signals.

* * * * *